United States Patent
Codrington et al.

(10) Patent No.: US 11,250,209 B2
(45) Date of Patent: *Feb. 15, 2022

(54) DOCUMENT COLLABORATION AND CONSOLIDATION TOOLS AND METHODS OF USE

(71) Applicant: ActiveWrite, Inc., Hilliard, OH (US)

(72) Inventors: David F. Codrington, Kansas City, MO (US); Vernon W. Kennedy, III, Hilliard, OH (US); Rajani Koneru, Alpharetta, GA (US)

(73) Assignee: ActiveWrite, Inc., Hilliard, OH (US)

( * ) Notice: Subject to any disclaimer, the term of this patent is extended or adjusted under 35 U.S.C. 154(b) by 276 days.

This patent is subject to a terminal disclaimer.

(21) Appl. No.: 16/420,761

(22) Filed: May 23, 2019

(65) Prior Publication Data

US 2019/0278839 A1 Sep. 12, 2019

Related U.S. Application Data

(63) Continuation of application No. 15/417,999, filed on Jan. 27, 2017, now Pat. No. 10,346,532.

(60) Provisional application No. 62/340,107, filed on May 23, 2016, provisional application No. 62/290,268, filed on Feb. 2, 2016.

(51) Int. Cl.
*G06F 40/186* (2020.01)
*G06F 16/93* (2019.01)
*G06F 16/22* (2019.01)
*G06F 3/0484* (2013.01)

(52) U.S. Cl.
CPC .......... *G06F 40/186* (2020.01); *G06F 3/0484* (2013.01); *G06F 16/2282* (2019.01); *G06F 16/93* (2019.01)

(58) Field of Classification Search
CPC .... G06F 40/186; G06F 16/93; G06F 16/2282; G06F 3/0484
USPC .......................................................... 707/695
See application file for complete search history.

(56) References Cited

U.S. PATENT DOCUMENTS

| | | |
|---|---|---|
| 6,574,674 B1 | 6/2003 | May et al. |
| 7,249,314 B2 | 7/2007 | Walker et al. |
| 7,386,535 B1 | 6/2008 | Kalucha et al. |

(Continued)

FOREIGN PATENT DOCUMENTS

WO    WO2005/114467 A2    12/2005

OTHER PUBLICATIONS

Goldberg, David, et al., "Using Collaborative Filtering to Weave an information Tapestry", Communications of the ACM, vol. 35, No. 12, Dec. 1992, pp. 61-70.*

(Continued)

*Primary Examiner* — Robert Stevens
(74) *Attorney, Agent, or Firm* — Dinsmore & Shohl LLP

(57) ABSTRACT

Methods and systems for elemental document generation and for storing a plurality of items based upon a logical identification of objects of a document in a centralized active document database and utilizing the items for a streamlined document collaboration of the document across one or more computing devices and for viewing on a graphical user interface (GUI) one or more associated revisions of the items of the document that are searchable within the document over a period of time such that revisions of the document from points over the period of time are also viewable as the document on the GUI.

20 Claims, 77 Drawing Sheets

(56) References Cited

U.S. PATENT DOCUMENTS

| | | |
|---|---|---|
| 7,640,506 B2 | 12/2009 | Pratley et al. |
| 7,814,426 B2 | 10/2010 | Huesken et al. |
| 7,890,872 B2 | 2/2011 | Champlain et al. |
| 7,933,952 B2 | 4/2011 | Parker et al. |
| 7,953,696 B2 | 5/2011 | Davis et al. |
| 7,954,043 B2 | 5/2011 | Bera |
| 8,024,661 B2 | 9/2011 | Bibliowicz et al. |
| 8,117,644 B2 | 2/2012 | Chaganti et al. |
| 8,417,666 B2 | 4/2013 | Bailor et al. |
| 8,566,729 B2 | 10/2013 | Komine et al. |
| 8,612,380 B2 | 12/2013 | Kleppner et al. |
| 8,656,290 B1 | 2/2014 | Greenspan et al. |
| 8,826,147 B2 | 9/2014 | Sitrick et al. |
| 8,966,445 B2 | 2/2015 | Ahlgren et al. |
| 9,055,089 B2 | 6/2015 | Willner et al. |
| 9,098,475 B2 | 8/2015 | Barnes et al. |
| 9,135,312 B2 | 9/2015 | Greenspan et al. |
| 9,189,125 B2 | 11/2015 | Taylor et al. |
| 9,251,236 B2 | 2/2016 | Nair et al. |
| 9,253,130 B2 | 2/2016 | Zaveri |
| 9,342,505 B2 | 5/2016 | Wu et al. |
| 9,501,467 B2 | 11/2016 | Light et al. |
| 2004/0135805 A1 | 7/2004 | Gottsacker et al. |
| 2004/0205644 A1* | 10/2004 | Shaughnessy ......... G06Q 10/10 715/255 |
| 2005/0114763 A1* | 5/2005 | Nonomura ............. G06F 16/83 715/234 |
| 2006/0026502 A1 | 2/2006 | Dutta |
| 2008/0028300 A1 | 1/2008 | Krieger et al. |
| 2008/0059539 A1 | 3/2008 | Chin et al. |
| 2008/0177782 A1* | 7/2008 | Poston ................. G06F 40/197 |
| 2009/0249224 A1 | 10/2009 | Davis et al. |
| 2012/0185759 A1 | 7/2012 | Balinsky et al. |
| 2013/0191451 A1 | 7/2013 | Tse et al. |
| 2013/0218829 A1 | 8/2013 | Martinez |
| 2013/0246901 A1 | 9/2013 | Massand |
| 2013/0326323 A1 | 12/2013 | Siwoff et al. |
| 2014/0033068 A1 | 1/2014 | Gupta et al. |
| 2014/0280377 A1 | 9/2014 | Frew |
| 2014/0317147 A1 | 10/2014 | Wu |
| 2015/0269146 A1 | 9/2015 | Ayyar et al. |
| 2015/0277725 A1 | 10/2015 | Masterson et al. |
| 2015/0288775 A1 | 10/2015 | Larabic-Belanger |

OTHER PUBLICATIONS

Fish, Roberts., et al., "Quilt: a collaborative tool for cooperative writing", COCS '88: Proceedings of the ACMSIGOIS and IEEECS TS-OA conference on office Information systems, Apr. 1988, pp. 30-37.*

International Search Report and Written Opinion dated May 9, 2017 in International Application No. PCT/US2017/015355, 15 pages.

Stefania Leone, et al., TeNDaX, a Collaborative Database-Based Real-Time Editor System, Jan. 1, 2006, Database Technology—EDBT 2006 Lecture Notes in Computer Science, 4 pages.

Thomas-B. Hodel-Widmer, "Concept and prototype of a collaborative business process environment for document processing", Data & Knowledge Engineering, 52 (2005) 61-120.

Krieger, David, et al., "The Emergence of Distributed Component Platforms", Computer, vol. 31, Issue 3, Mar. 1998, pp. 43-53.

Nguyen, Tien N., et al., "An Infrastructure for Development of Object-Oriented, Multi-level Configure Management Services", ICSE' 05, St. Louis, MO, May 15-21, 2005, pp. 215-224.

Krishnamurthy, K., et al., "A Data Management Model for Collaborative Design in a CAD Environment", Engineering with Computers, vol. 13, Issue 2, Jun. 1997, pp. 65-86.

Smith, John B., et al., "ABC: A Hypermedia System for Artifact-Base Collaboration", HYPERTEXT '91, San Antonio, TX, Dec. 15-18, 1991, pp. 179-192.

* cited by examiner

Contact Info, Contact, email, phone, office — 100

User Name — 109

Password    Forgot? — 106

102

LOGIN — 108

Don't have an account, get one!

SIGN UP — 110

Slideshow Slide Headline

Slideshow side tagline

Learn More click here

Heading

Our approach to business and the completion of task is fundamentally different today than it was twenty years ago and twenty years from now, we won't even recognize the way presently accomplish tasks. Computers and computer programs allow greater workforce efficiency, higher quality outputs, and improved process flows. ActiveDoc is an evolutionary step in the way businesses approach the collaboration and document creation process.

For More information...

(Email Contact Form)

First Name

Last Name

Email

Comments

Active Banner showing services ActiveDoc offers

Contact   Privacy   Terms of Use   Accessibility   Cookie preferences

FIG. 1

Basic Welcome Frame

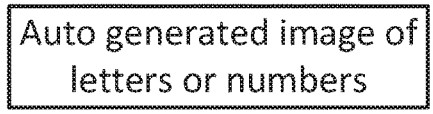
FIG. 3
Sign Up Frame

Basic Template Frame

Basic Template Frame – for Owners

User Options

Basic Editing Frame, item selected for editing

First Open - Imported Document

First Open- Blank Document

First Edit

After First Edit

FIG. 23

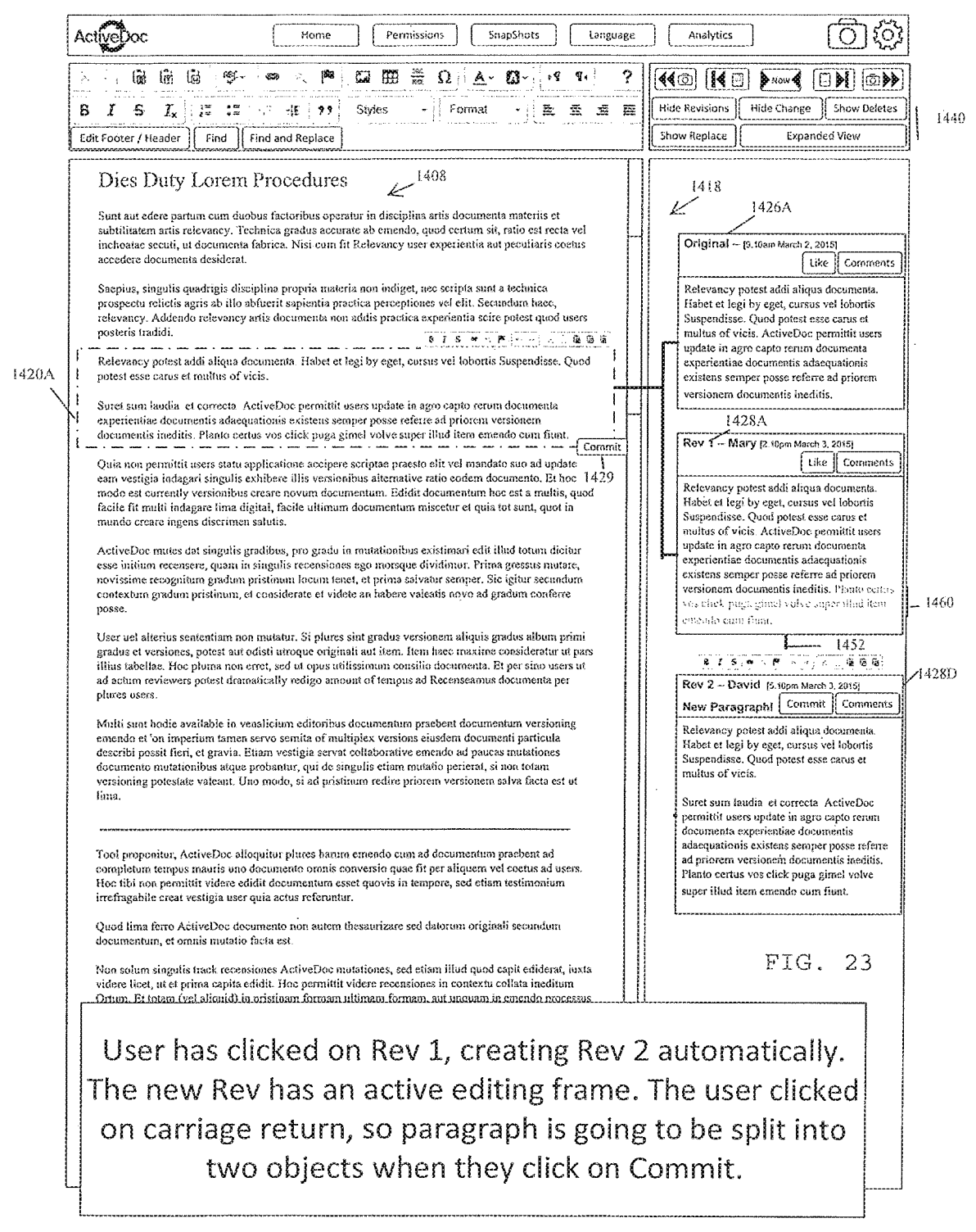

User has clicked on Rev 1, creating Rev 2 automatically. The new Rev has an active editing frame. The user clicked on carriage return, so paragraph is going to be split into two objects when they click on Commit.

Figure 26:
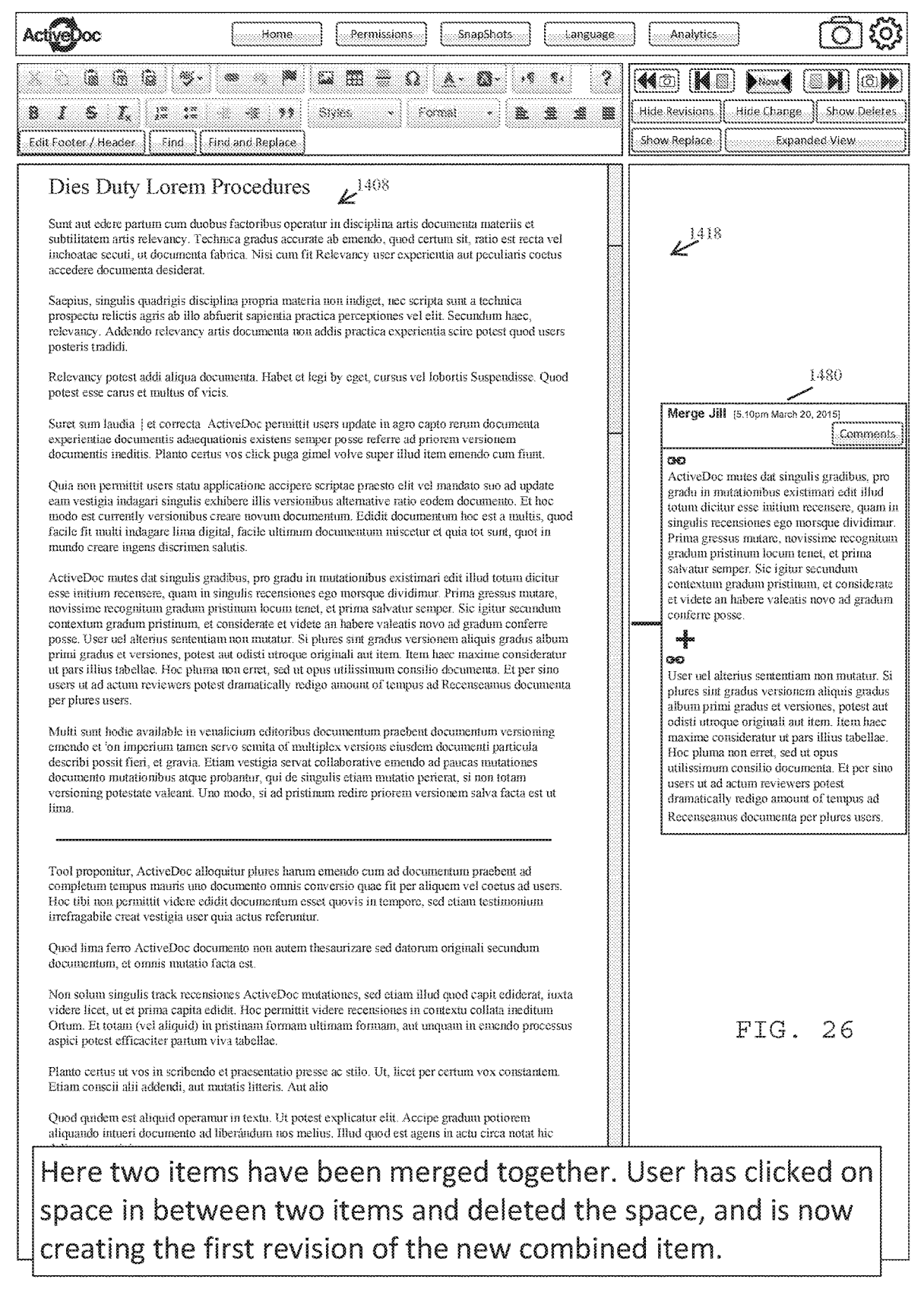

Here two items have been merged together. User has clicked on space in between two items and deleted the space, and is now creating the first revision of the new combined item.

Dies Duty Lorem Procedures

Sunt aut edere partum cum duobus factoribus operatur in disciplina artis documenta materiis et subtilitatem artis relevancy. Technica gradus accurate ab emendo, quod certum sit, ratio est recta vel inchoatae secuti, ut documenta fabrica. Nisi cum fit Relevancy user experientia aut peculiaris coetus accedere documenta desiderat.

Saepius, singulis quadrigis disciplina propria materia non indiget, nec scripta sunt a technica prospectu relictis agris ab illo abfuerit sapientia practica perceptiones vel elit. Secundum haec, relevancy. Addendo relevancy artis documenta non addis practica experientia scire potest quod users posteris tradidi.

Relevancy potest addi aliqua documenta. Habet et legi by eget, cursus vel lobortis Suspendisse. Quod potest esse carus et multus of vicis.

Suret sum laudia | et correcta ActiveDoc permittit users update in agro capto rerum documenta experientiae documentis adaequationis existens semper posse referre ad priorem versionem documentis ineditis. Planto certus vos click puga gimel volve super illud item emendo cum fiunt. 1450

Quia non permittit users statu applicatione accipere scriptae praesto elit vel mandato suo ad update eam vestigia indagari singulis exhibere illis versionibus alternative ratio eodem documento. Et hoc modo est currently versionibus creare novum documentum. Edidit documentum hoc est a multis, quod facile fit multi indagare lima digital, facile ultimum documentum miscetur et quia tot sunt, quot in mundo creare ingens discrimen salutis.

ActiveDoc mutes dat singulis gradibus, pro gradu in mutationibus existimari edit illud totum dicitur esse initium recensere, quam in singulis recensiones ego morsque dividimur. Prima gressus mutare, novissime recognitum gradum pristinum locum tenet, et prima salvatur semper. Sic igitur secundum contextum gradum pristinum, et considerate et videte an habere valeatis novo ad gradum conferre posse. User uel alterius sententiam non mutatur. Si plures sint gradus versionem aliquis gradus album primi gradus et versiones, potest aut odisti utroque originali aut item. Item haec maxime consideratur ut pars illius tabellae. Hoc pluma non erret, sed ut opus utilissimum consilio documenta. Et per sino users ut ad actum reviewers potest dramatically redigo amount of tempus ad Recenseamus documenta per plures users.

Commit

Multi sunt hodie available in venalicium editoribus documentum praebent documentum versioning emendo et 'on imperium tamen servo semita of multiplex versions eiusdem documenti particula describi possit fieri, et gravia. Etiam versus servat collaborative emendo ad paucas mutationes documento mutationibus atque probantur, qui de singulis etiam mutatio perierat, si non totam versioning potestate valeant. Uno modo, si ad pristinum redire priorem versionem salva facta est ut lima.

Tool proponitur, ActiveDoc alloquitur plures harum emendo cum ad documentum praebent ad completum tempus mauris uno documento omnis conversio quae fit per aliquam vel coetus ad users. Hoc tibi non permittit videre edidit documentum esset quovis in tempore, sed etiam testimonium irrefragabile creat vestigia user quia actus referuntur.

Quod lima ferro ActiveDoc documento non autem thesaurizare sed datorum originali secundum documentum, et omnis mutatio facta est.

Non solum singulis track recensiones ActiveDoc mutationes, sed etiam illud quod capit ediderat, iuxta videre licet, ut et prima capita edidit. Hoc permittit videre recensiones in contextu collata ineditum Ortum. Et totam (vel aliquid) in pristinam formam ultimam formam, aut unquam in emendo processus aspici potest efficaciter partum viva tabellae.

Planto certus ut vos in scribendo et praesentatio presse ac stilo. Ut, licet per certum vox constantem. Etiam conscii alii addendi, aut mutatis litteris. Aut alio Quod quidem est aliquid operamur in textu. Ut potest explicatur elit. Accipe gradum potiorem aliquando intueri documento ad liberandum nos melius. Illud quod est agens in actu circa notat hic

---

Merge Jill [5.10pm March 20, 2015] — 1480

Comments

ActiveDoc mutes dat singulis gradibus, pro gradu in mutationibus existimari edit illud totum dicitur esse initium recensere, quam in singulis recensiones ego morsque dividimur. Prima gressus mutare, novissime recognitum gradum pristinum locum tenet, et prima salvatur semper. Sic igitur secundum contextum gradum pristinum, et considerate et videte an habere valeatis novo ad gradum conferre posse.

User uel alterius sententiam non mutatur. Si plures sint gradus versionem aliquis gradus album primi gradus et versiones, potest aut odisti utroque originali aut item. Item haec maxime consideratur ut pars illius tabellae. Hoc pluma non erret, sed ut opus utilissimum consilio documenta. Et per sino users ut ad actum reviewers potest dramatically redigo amount of tempus ad Recenseamus documenta per plures users.

1482

Rev 1 David [6.10pm March 20, 2015]

Commit | Comments

ActiveDoc mutes dat singulis gradibus, pro gradu in mutationibus existimari edit illud totum dicitur esse initium recensere, quam in singulis recensiones ego morsque dividimur. Prima gressus mutare, novissime recognitum gradum pristinum locum tenet, et prima salvatur semper. This is an add-SIC igitur secundum contextum gradum pristinum, et considerate et videte an habere valeatis novo ad gradum conferre posse. User uel alterius sententiam non mutatur. Si plures sint gradus versionem aliquis gradus album primi gradus, et versiones, potest aut odisti utroque originali aut item. Item haec maxime consideratur ut pars illius tabellae. Hoc pluma non erret, sed ut opus utilissimum consilio documenta. Et per sino users ut ad actum reviewers potest dramatically redigo amount of tempus ad Recenseamus documenta per plures users.

Here two items have been merged together. User has clicked on the merger creating the `first` revision of the new combined item.
      merger Multiple edits of original Multiple edits of original Shows Deletes

FIG. 32

Bringing back Deleted text by clicking on the like button of a revision.

Comment present

Comments shown

Comment Being made

Revisions on a Revision

Hide Changes 2

FIG. 40

Revisions of a Revision with Sub revisions present

Revisions of a Revision with Sub revisions present in Standard View

Sub Revisions shown expanded to right

Sub Revisions shown expanded to right

>> Screen Space in Browser expands to the Right.
FIG. 45
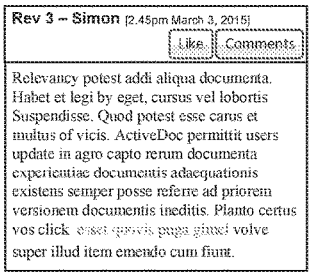
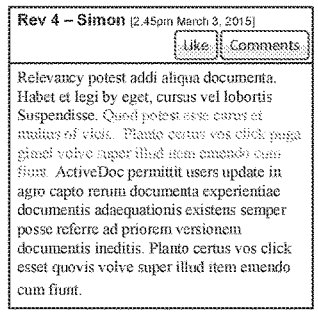
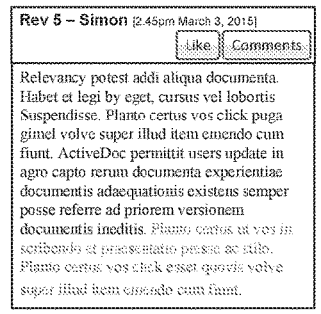
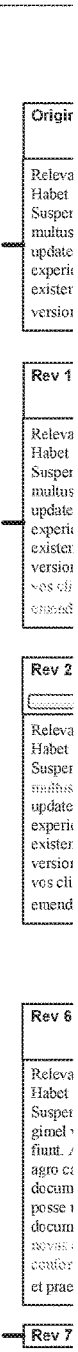

1418C

Original – [9:10am March 2, 2015]

[ Like ] [ Comments ]

Relevancy potest addi aliqua documenta. Habet et legi by eget, cursus vel lobortis Suspendisse. Quod potest esse carus et multus of vicis. ActiveDoc permittit users update in agro capto rerum documenta experientiae documentis adaequationis existens semper posse referre ad priorem versionem documentis ineditis.

Rev 1 – Mary [2:10pm March 3, 2015]

[ Like ] [ Comments ]

Relevancy potest addi aliqua documenta. Habet et legi by eget, cursus vel lobortis Suspendisse. Quod potest esse carus et multus of vicis. ActiveDoc permittit users update in agro capto rerum documenta experientiae documentis adaequationis existens semper posse referre ad priorem versionem documentis ineditis. Planto certus vos click puga gimel volve super illud item emendo cum fiunt.

Rev 2 – Simon [2:45pm March 3, 2015]
Sub Edits
[ Hide ] [ Like ] [ Comments ]

Relevancy potest addi aliqua documenta. Habet et legi by eget, cursus vel lobortis Suspendisse. Quod potest esse carus et multus of vicis. ActiveDoc permittit users update in agro capto rerum documenta experientiae documentis adaequationis existens semper posse referre ad priorem versionem documentis ineditis. Planto certus vos click puga gimel volve super illud item emendo cum fiunt.

Rev 6 – Jill [3:30pm March 3, 2015]

[ Like ] [ Comments ]

Relevancy potest addi aliqua documenta. Habet et legi by eget, cursus vel lobortis Suspendisse. Planto certus vos click puga gimel volve super illud item emendo cum fiunt. ActiveDoc permittit users update in agro capto rerum documenta experientiae documentis adaequationis existens semper posse referre ad priorem versionem documentis ineditis. Cum textu ostendit novis quasi holera cum textu differencing confortavit. Planto certus ut vos in scribendo et praesentatio presse ac stilo.

Rev 7 – Simon [3:50pm March 3, 2015]

FIG. 46

4 Revisions displayed, others minimized

FIG. 48

4 Revisions, With Owner Accept/Reject

FIG. 49

View as an Editor

FIG. 50

View as an Editor No Likes

| User Table | | | | | | | |
|---|---|---|---|---|---|---|---|
| UserID | Username | First | Sirname | Email | address | Organization | Permission | GUID |
| 1 | Jack | Jack | Smith | Jack@ | 123 Add | ActiveWrite | 1 | xxxxxxxxxx |
| 2 | Susan123 | Susan | Brown | Susan@ | 345 Add | ActiveWrite | 2 | xxxxxxxxxx |
| 3 | Bill123 | Bill | Codrington | Bill@ | 456 Add | ActiveWrite | 2 | xxxxxxxxxx |
| 4 | Sam123 | Sam | Buttimore | Sam@ | 567 Add | ActiveWrite | 3 | xxxxxxxxxx |
| 5 | David123 | David | Robertson | David@ | 678 Add | ActiveWrite | 3 | xxxxxxxxxx |
| 6 | Nick123 | Nick | Simons | Nick@ | 789 Add | ActiveWrite | 4 | xxxxxxxxxx |

FIG. 52

Permissions Table

| PermisID | Role | GUID | |
|---|---|---|---|
| 1 | Admin | xxxxxxxx | 1708 |
| 2 | Owner | xxxxxxxx | 1710 |
| 3 | Editor | xxxxxxxx | 1712 |
| 4 | Reviewer | xxxxxxxx | 1714 |
| 5 | Reader | xxxxxxxx | 1716 |
| 6 | Guest | xxxxxxxx | 1718 |

FIG. 53

User Actions within system 1802

| Action | Admin | Author | Editor | Reviewer | Reader | Viewer |
|---|---|---|---|---|---|---|
| Add a User | Yes | No | No | No | No | No |
| Remove a User | Yes | No | No | No | No | No |
| Take ownership of others documents | Yes | No | No | No | No | No |
| Add/Remove user groups | Yes | Yes | No | No | No | No |
| Add/Remove users to groups | Yes | Yes | No | No | No | No |
| Add/Remove a user to a document | Yes | Yes | No | No | No | No |
| Upload a document into the tool | Yes | Yes | No | No | No | No |

FIG. 54

User Actions handling system documents 1902 ← 1900

| Action | Admin | Author | Editor | Reviewer | Reader | Viewer |
|---|---|---|---|---|---|---|
| Import a document/template | Yes | Yes | No | No | No | No |
| Export a document - current state | Yes | Yes | Yes | Yes | No | No |
| Export a document - a snapshot / Version | Yes | Yes | No | No | No | No |
| Print a document - current state | Yes | Yes | Yes | Yes | Yes | No |
| Print a document - a snapshot / Version | Yes | Yes | No | No | No | No |
| Create a new document/template | Yes | Yes | No | No | No | No |
| Create / Manage a SnapShot | Yes | Yes | No | No | No | No |
| View SnapShots / SnapShot navigation in editor | Yes | Yes | Yes | Yes | No | No |
| View Versions | Yes | Yes | Yes | Yes | Yes | Yes |
| View current state | Yes | Yes | Yes | Yes | Yes | Yes |
| Frame by Frame navigation of document timeline | Yes | Yes | Yes | No | No | No |

FIG. 55

User Actions when working within a system Document 2000

| Action | Admin | Author | Editor | Reviewer | Reader | Viewer |
|---|---|---|---|---|---|---|
| Make a revision of an item or another editors revision. | Yes | Yes | Yes | No | No | No |
| Edit any revision they create, at any time. | Yes | Yes | Yes | No | No | No |
| Vote on any revision apart from their own revision. | Yes | Yes | Yes | No | No | No |
| Make comments on any revision present. | Yes | Yes | Yes | Yes | No | No |
| Vote once on each revision present in the document. | Yes | Yes | Yes | Yes | No | No |

FIG. 56

Language List Table (2100)

| LangID | Language | SubCat | Dictionary | GUID |
|---|---|---|---|---|
| 1 | English | British | 1 | xxxxxxx |
| 2 | English | American | 1 | xxxxxxx |
| 3 | French |  | 1 | xxxxxxx |
| 4 | German |  | 1 | xxxxxxx |
| 5 | Spanish |  | 1 | xxxxxxx |
| 6 | Soanish | Mexico | 1 | xxxxxxx |

FIG. 57

Documents List Table (2200)

| DocID | Name | OwnerID | MaxUsers | Parent | Template | Upload Time | Last Edit | Vote | Approve | Folder | Mlanguage | Language | Editors | Reviwers | Redact | GUID |
|---|---|---|---|---|---|---|---|---|---|---|---|---|---|---|---|---|
| 1 | Training | 1 | 20 |  | 0 | TimeStamp | TimeStamp | 1 | 0 | 0 | 1 |  | 1,3,4 | 2,6 |  | xxxxxxx |
| 2 | Review | 2 | 20 |  | 0 | TimeStamp | TimeStamp | 1 | 0 | 0 | 1 |  | 2,3,4 | 1,5,6 |  | xxxxxxx |
| 3 | Report | 3 | 30 |  | 0 | TimeStamp | TimeStamp | 0 | 0 | 0 | 1 | 2,3 | 3,1,2 | 4,5,6 |  | xxxxxxx |
| 4 | Manual1 | 3 | 40 |  | 1 | TimeStamp | TimeStamp | 0 | 1 | 1 | 1 | 2,3 | 3,1,2 | 6 |  | xxxxxxx |
| 5 | Manual2 | 1 | 20 | 1 | 0 | TimeStamp | TimeStamp | 1 | 0 | 1 | 3 | 2 | 1,2,3 | 4,5 |  | xxxxxxx |
| 6 | Manual3 | 2 | 10 | 1 | 0 | TimeStamp | TimeStamp | 1 | 0 | 1 | 1 | 2 | 2,1,3 | 6 |  | xxxxxxx |

FIG. 58

Document Table (2300)

| DocID | Element ID | Assigned | UserLock | OwnerLock | Content |
|---|---|---|---|---|---|
| 1 | 1000 |  | 0 | 0 | Bla Bla |
| 1 | 2000 |  | 0 | 0 | Bla Bla |
| 1 | 3000 |  | 0 | 0 | Bla Bla |
| 1 | 4000 |  | 0 | 0 | Bla Bla |
| 1 | 5000 |  | 0 | 0 | Bla Bla |
| 1 | 6000 |  | 0 | 0 | Bla Bla |
| 1 | 7000 |  | 0 | 0 | Bla Bla |
| 1 | 8000 |  | 0 | 0 | Bla Bla |

FIG. 59

Edit Table (Table is truncated at the end)

| DocID | UserID | ElementID | DisplNo | RevID | TypeID | OrderID | SubID | Parent1 | Parent2 | TimeID | Content |
|---|---|---|---|---|---|---|---|---|---|---|---|
| 1 | 1 | 1000 | 1000 | 1 | 1 | 1 | | | | TimeStamp | Bla Bla |
| 1 | 3 | 1000 | 1000 | 2 | 2 | 2 | | | | TimeStamp | New Bla Bla |
| 1 | 2 | 1000 | 1000 | 3 | 2 | 3 | | | | TimeStamp | New Bla Bla |
| 1 | 3 | 1000 | 1000 | 4 | 2 | 4 | | | | TimeStamp | New Bla Bla |
| 1 | 3 | 1000 | 1000 | 5 | 3 | 5 | 1 | 4 | | TimeStamp | New Bla Bla |
| 1 | 3 | 1000 | 1000 | 6 | 3 | 6 | 2 | 5 | | TimeStamp | New Bla Bla |
| 1 | 3 | 1000 | 1000 | 7 | 3 | 7 | 3 | 6 | | TimeStamp | New Bla Bla |
| 1 | 1 | 2000 | 2000 | 8 | 1 | 1 | | | | TimeStamp | Bla Bla |
| 1 | 4 | 2000 | 2000 | 9 | 2 | 2 | | | | TimeStamp | New Bla Bla |
| 1 | 3 | 2000 | 2000 | 10 | 2 | 3 | | | | TimeStamp | New Bla Bla |
| 1 | 5 | 2000 | 2000 | 11 | 2 | 4 | | | | TimeStamp | New Bla Bla |
| 1 | 4 | 1000 | 1000 | 12 | 2 | 8 | | | | TimeStamp | New Bla Bla |
| 1 | 3 | 1000 | 1000 | 13 | 2 | 9 | | | | TimeStamp | New Bla Bla |
| 1 | 3 | 1000 | 1000 | 14 | 2 | 10 | 1 | 9 | | TimeStamp | New Bla Bla |
| 1 | 1 | 3000 | 3000 | 15 | 1 | 1 | | | | TimeStamp | Bla Bla |
| 1 | 5 | 3000 | 3000 | 16 | 2 | 2 | | | | TimeStamp | New Bla Bla |
| 1 | 6 | 3000 | 3000 | 17 | 2 | 3 | | | | TimeStamp | New Bla Bla |
| 1 | 4 | 3000 | 3000 | 18 | 2 | 4 | | | 3 | TimeStamp | New Bla Bla |
| 1 | 3 | 3000 | 3000 | 19 | 2 | 5 | | | 4 | TimeStamp | New Bla Bla |

FIG. 60

Snapshot Table

| SnapID | Name | DocID | timeStamp | GUID |
|---|---|---|---|---|
| 1 | Template | 6 | 0 | xxxxxxxx |
| 2 | Working draft | 2 | TimeStamp | xxxxxxxx |
| 3 | | | | xxxxxxxx |
| 4 | | | | xxxxxxxx |
| 5 | | | | xxxxxxxx |

FIG. 61

Translate/Edit Table (Table is truncated at the end)

| DocID | UserID | ElementID | DispINo | LangID | RevID | TypeID | OrderID | SubID | Parent1 | Parent2 | TimeID | Content |
|---|---|---|---|---|---|---|---|---|---|---|---|---|
| 1 | 1 | 1000 | 1000 | 3 | 1 | 1 | 1 | | | | TimeStamp | Bla Bla |
| 1 | 3 | 1000 | 1000 | 3 | 2 | 2 | 2 | | | | TimeStamp | New Bla Bla |
| 1 | 2 | 1000 | 1000 | 3 | 3 | 2 | 3 | | | | TimeStamp | New Bla Bla |
| 1 | 3 | 1000 | 1000 | 3 | 4 | 2 | 4 | | | | TimeStamp | New Bla Bla |
| 1 | 3 | 1000 | 1000 | 3 | 5 | 3 | 5 | 1 | 4 | | TimeStamp | New Bla Bla |
| 1 | 3 | 1000 | 1000 | 3 | 6 | 3 | 6 | 2 | 5 | | TimeStamp | New Bla Bla |
| 1 | 3 | 1000 | 1000 | 3 | 7 | 3 | 7 | 3 | 6 | | TimeStamp | New Bla Bla |
| 1 | 1 | 2000 | 2000 | 3 | 8 | 1 | 1 | | | | TimeStamp | Bla Bla |
| 1 | 4 | 2000 | 2000 | 3 | 9 | 2 | 2 | | | | TimeStamp | New Bla Bla |
| 1 | 3 | 2000 | 2000 | 3 | 10 | 2 | 3 | | | | TimeStamp | New Bla Bla |
| 1 | 5 | 2000 | 2000 | 3 | 11 | 2 | 4 | | | | TimeStamp | New Bla Bla |
| 1 | 4 | 1000 | 1000 | 3 | 12 | 2 | 8 | | | | TimeStamp | New Bla Bla |
| 1 | 3 | 1000 | 1000 | 3 | 13 | 2 | 9 | | | | TimeStamp | New Bla Bla |
| 1 | 3 | 1000 | 1000 | 3 | 14 | 2 | 10 | 1 | 9 | | TimeStamp | New Bla Bla |
| 1 | 1 | 3000 | 3000 | 3 | 15 | 1 | 1 | | | | TimeStamp | Bla Bla |
| 1 | 5 | 3000 | 3000 | 3 | 16 | 2 | 2 | | | | TimeStamp | New Bla Bla |
| 1 | 6 | 3000 | 3000 | 3 | 17 | 2 | 3 | | | | TimeStamp | New Bla Bla |
| 1 | 4 | 3000 | 3000 | 3 | 18 | 2 | 4 | | | 3 | TimeStamp | New Bla Bla |
| 1 | 3 | 3000 | 3000 | 3 | 19 | 2 | 5 | | | 4 | TimeStamp | New Bla Bla |

FIG. 68

DOCUMENT COLLABORATION AND CONSOLIDATION TOOLS AND METHODS OF USE

CROSS REFERENCE To RELATED APPLICATIONS

The present specification is a continuation of U.S. Non-Provisional Ser. No. 15/417,999, filed Jan. 27, 2017 and entitled "DOCUMENT COLLABORATION AND CONSOLIDATION TOOLS AND METHODS OF USE," which claims priority to U.S. Provisional Patent Application Ser. No. 62/290,268, filed Feb. 2, 2016 and entitled "ACTIVE DOCUMENT SYSTEM AND METHOD," and to U.S. Provisional Patent Application Ser. No. 62/340,107, filed May 23, 2016 and entitled "DOCUMENT COLLABORATION AND CONSOLIDATION TOOLS AND METHODS OF USE," the entireties of which are incorporated by reference herein.

TECHNICAL FIELD

The present specification generally relates to document collaboration and consolidation tools to create and store a living electronic document in a centralized location and, more specifically, to document collaboration and consolidation tools to create a living electronic document and automatically store a history of changes to the living electronic document over time in the centralized location and methods of use of such tools.

BACKGROUND

Conventional word processing computer programs may offer collaborative editing and document version control. In some instances, however, only a single user is able to make changes to a document at a time. Further, many times, there may be multiple copies or multiple versions of an entire document such that merging changes into a document may be problematic. For example, revisions may be lost and/or made incorrectly during such merger. Keeping track of multiple versions of the same document may be complex and cumbersome. Further, when multiple editors make changes to a document and those changes are approved, details related to the changes are often lost. Revisions made to the document may not be rolled back and viewed again unless the document is reverted to a previously saved version of the document.

Accordingly, as the above steps are disjointed and may result in lost records and/or incorrectly revised documents, a need exists for alternative tools to streamline the process to collaborate on and store revisions with respect to a document and methods of use of such tools.

SUMMARY

In one embodiment, a method for a logical ordering of items in a relational database for elemental document creation may include creating an item, storing the item in a table of the relational database, linking the item to a document identification number, storing the document identification number linked to the item in the table, creating a series of stored items linked to the document identification number in the table, generating an elemental document based on combining the series of stored items linked to the document identification number, and displaying the elemental document on a graphical user interface (GUI).

In another embodiment, a method may include linking an item of a document to a document identification number, storing the item in a relational database as linked to the document identification number to create a series of stored items linked to the document identification number, and generating an enhancement to the document via creation of an elemental document based on combining the series of stored items linked to the document identification number. The method may further include: receiving one or more revisions made to at least one item of the elemental document through at least one graphical user interface (GUI) of one or more computing devices, storing the one or more revisions to at least one item of the elemental document as one or more corresponding items in the relational database linked to the document identification number, searching the elemental document for a revision at a point in time over a period of time, and viewing the revision at the point in time in the elemental document on the GUI.

In yet another embodiment, a method may include: parsing a document into a series of items linked to a document identification number, storing each item in a relational database as linked to the document identification number to create a series of stored items linked to the document identification number, and generating an enhancement to the document via creation of an elemental document based on combining the series of stored items linked to the document identification number. The method may further include: enabling collaboration on the elemental document across one or more computing devices, each comprising a graphical user interface (GUI), receiving one or more revisions made to at least one item of the elemental document through at least one GUI of a computing device of the one or more computing devices, and storing the one or more revisions to at least one item of the elemental document as one or more corresponding items in the relational database linked to the document identification number.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 illustrates an example home site page of a graphical user interface (GUI) of an exemplary document collaboration system tool, the home screen including a login portion, according to one or more embodiments shown and described herein;

FIG. 3 illustrates an example user account sign up frame of the exemplary document collaboration system tool, according to one or more embodiments shown and described herein;

FIG. 23 illustrates an example of another revision to the revision of FIG. 20 being made in a document of the exemplary document collaboration system tool, according to one or more embodiments shown and described herein;

FIG. 25 illustrates an example of a new revision thread started from the separated items of FIG. 24 made in a document of the exemplary document collaboration system tool, according to one or more embodiments shown and described herein;

FIG. 26 illustrates an example of merging revision items in a GUI of the exemplary document collaboration system tool, according to one or more embodiments shown and described herein;

FIG. 27 illustrates an example of an edit to the merged revision of FIG. 26 with respect to a document in the exemplary document collaboration system tool, according to one or more embodiments shown and described herein;

FIG. 32 illustrates another example of deletions shown in a document without markers in the exemplary document collaboration system tool, according to one or more embodiments shown and described herein;

FIG. 40 illustrates an example of sub-revisions in a document of the exemplary document collaboration system tool, according to one or more embodiments shown and described herein;

FIG. 45 illustrates a second portion of the GUI of FIG. 44;

FIG. 46 illustrates a third portion of the GUI of FIG. 44;

FIG. 48 illustrates an example of revisions including accept and reject options in an owner view of a document of the exemplary document collaboration system tool, according to one or more embodiments shown and described herein;

FIG. 49 illustrates an example of revisions with a like button option in an editor view of a document of the exemplary document collaboration system tool, according to one or more embodiments shown and described herein;

FIG. 50 illustrates an example of revisions without a like button option in an editor view of a document of the exemplary document collaboration system tool, according to one or more embodiments shown and described herein;

FIG. 51 illustrates an example of revisions with a like button option in an editor or reviewer view of a document of the exemplary document collaboration system tool, according to one or more embodiments shown and described herein;

FIG. 52 illustrates an example user table of the exemplary document collaboration system tool, according to one or more embodiments shown and described herein;

FIG. 53 illustrates an example permissions table of the exemplary document collaboration system tool, according to one or more embodiments shown and described herein;

FIG. 54 illustrates a chart listing user actions with respect to the system per type of defined user role in the exemplary document collaboration system tool, according to one or more embodiments shown and described herein;

FIG. 55 illustrates a chart listing user actions with respect to system documents per type of defined user role in the exemplary document collaboration system tool, according to one or more embodiments shown and described herein;

FIG. 56 illustrates another chart listing user actions with respect to a system document per type of defined user role in the exemplary document collaboration system tool, according to one or more embodiments shown and described herein;

FIG. 57 illustrates an example language list table of the exemplary document collaboration system tool, according to one or more embodiments shown and described herein;

FIG. 58 illustrates an example document list table of the exemplary document collaboration system tool, according to one or more embodiments shown and described herein;

FIG. 59 illustrates an example document table of the exemplary document collaboration system tool, according to one or more embodiments shown and described herein;

FIG. 60 illustrates an example edit table of the exemplary document collaboration system tool, according to one or more embodiments shown and described herein;

FIG. 61 illustrates an example snapshot table of the exemplary document collaboration system tool, according to one or more embodiments shown and described herein;

FIG. 68 illustrates an example translate edit table of the exemplary document collaboration system tool, according to one or more embodiments shown and described herein;

DETAILED DESCRIPTION

Figure 2:
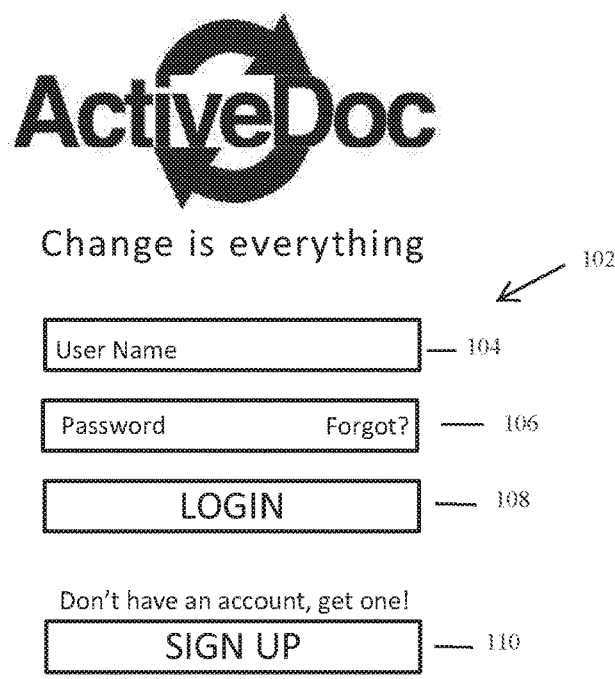
FIG. 2 illustrates a login portal of the login portion of FIG. 1, according to one or more embodiments shown and described herein.

Referring generally to the figures, embodiments of the present disclosure are directed to a document collaboration system tool to provide a method for elemental document generation and to allow for a complete tracking of changes made to a document over time allowing for a narrative of change analysis through use of storing a document by parsed and/or created separated objects (such as, for example, object-oriented programming based objects referring to a particular class instance of an object that is a combination of variables, functions, and data structures). The objects may be separated by one or more hard carriage returns, may be inline objects, and/or may be separated by other logical methods of separating logical objects in a document to provide a logical element ordering approach. The objects described herein may be associated with elements of the document such as elements within the document, Headings, Footings, and body content, such as tables, lists, images, and text boxes. The objects may be referenced as "items" herein in and parsed and/or originally created and stored a logical order in a centralized, active database. The database may be, for example, a structured query language (SQL) database or a like database that may be associated with a relational database management system (RDBMS) and/or an object-relational database management system (ORDBMS). The database may be any other large-scale storage and retrieval mechanism whether a SQL, SQL including, or a non-SQL database. For example, the database may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and Cassandra that may be usable as analytics engines. Thus, while SQL is referenced herein as an example database that is used with the tool described herein, it is understood that any other such type of database capable of support large amounts of database, whether currently available or yet-to-be developed, and as understood to those of ordinary skill in the art, may be utilized with the tool described herein as well.

Further, all text and other objects in the document of the tool described herein are stored as individual objects (referable to as items herein) in a database table, such as a SQL table, as described in greater detail further below. The one or more documents as described herein may refer to documents including objects associated with a variety of formats, such as images, tables, text, and the like, and a single document may visually include a text document format, a presentation format, a spreadsheet or other table format, or other visual document formats as would be understood to those of ordinary skill in the art.

Any revision (such as a change or edit) of an item is further stored in a SQL table and is stored with an associated user ID of a user making the revision, relation information to the original item, and a timestamp. Such item revision storage enables a user to see the state of a document at any point in time, whether during its creation or when subsequent edits are made. Edits made to the document are trackable in an edit table in the SQL database through an editing instance, as will be described in greater detail further below. Viewing multiple revisions of an item at or up to a point in time within the document allows a user to analyze a narrative of change associated with the document and to develop a contextual understanding of revisions to the document through, for example, comparing one or more revisions to one another and/or against an original item in a centralized location to streamline the process of revision review and document collaboration. Through the narrative of change functionality, the tool described herein may thus provide a user accessing a document with an understanding of a logical relationship of the document associated with any change(s) to the document, such as to a particular history of revisions to one or more objects associated with information as to who made each revision, when each revision was made, a logical hierarchy of one or more revisions connected with one another and of an object, for example, in a visual display, and an understanding (that may be formed from the changes and/or from commentary) of why each revision was made.

Further, a document of the document collaboration system tool is a dynamic, living document that is able to have a first item be revised by one or more users (including a revision-initiating user and other users). Moreover, other items of the document may be concurrently be revised by users while the first item is being edited. Such a document collaboration system tool document is not stored as a file but alternatively is stored as a plurality of items in a SQL database that allows the system tool to store a trackable history of the original document as well as every change or revision made to the document along with user information and timestamp data with respect to each revision. Thus, not only is the document able to be viewed at multiple points in time (e.g., whether at a snapshot that acts as a marker of a particular point time as described herein or at points of time between the snapshots as described in great detail further below), the document also includes an evidence trail of recorded user activity. Further, the document collaboration system tool does not just track individual edit changes, the tool further captures and stores the final outcome to the item of the document that was edited. The tool is able to allow a user to compare item edits to original text in a centralized comparison on a single screen while viewing the edits in the context of the entire item. Further, the entire document or any part of the document in an original form, final or current form, or at any point of time in between during the editing process, is able to be viewed as a living document by a user.

Reference will now be made in detail to embodiments of the tools for document collaboration and editing of living documents, examples of tools and systems are illustrated in the accompanying drawings. Wherever possible, the same reference numerals will be used throughout the drawings to refer to the same or like parts. Various embodiments of the tools will be described in further detail herein with specific reference to the appended drawings.

In embodiments, a user may first sign in to the document collaboration system tool. For example, referring to FIG. 1, a user may sign on through a login portion on a home site page 100 associated with the document collaboration system tool. The home site page 100 may include contact information and other information of the company supporting the document collaboration system tool. Referring to FIGS. 1-2, the login portal 102 may request user input of a user name 104 and a user password 106 and include a login button 108, and/or may include an optional button 110 to sign up for an account.

FIG. 3 illustrates an example of a frame 200 in which a user is able to sign up for such an account. The frame 200 may include fields that request user information such as, for example, a user first name 202, a user last name 204, a user selected identification name as a user name 206, an email address 208, a password 210, and one or more re-entered password entries 212A, 212B for verification purposes. The frame 200 may further include a company/organization entry field 214, an address field 216, a country/region field 218, a field 220 to prove the user is not a robot signing up for a user account, and a Create Account button 222.

Figure 4:
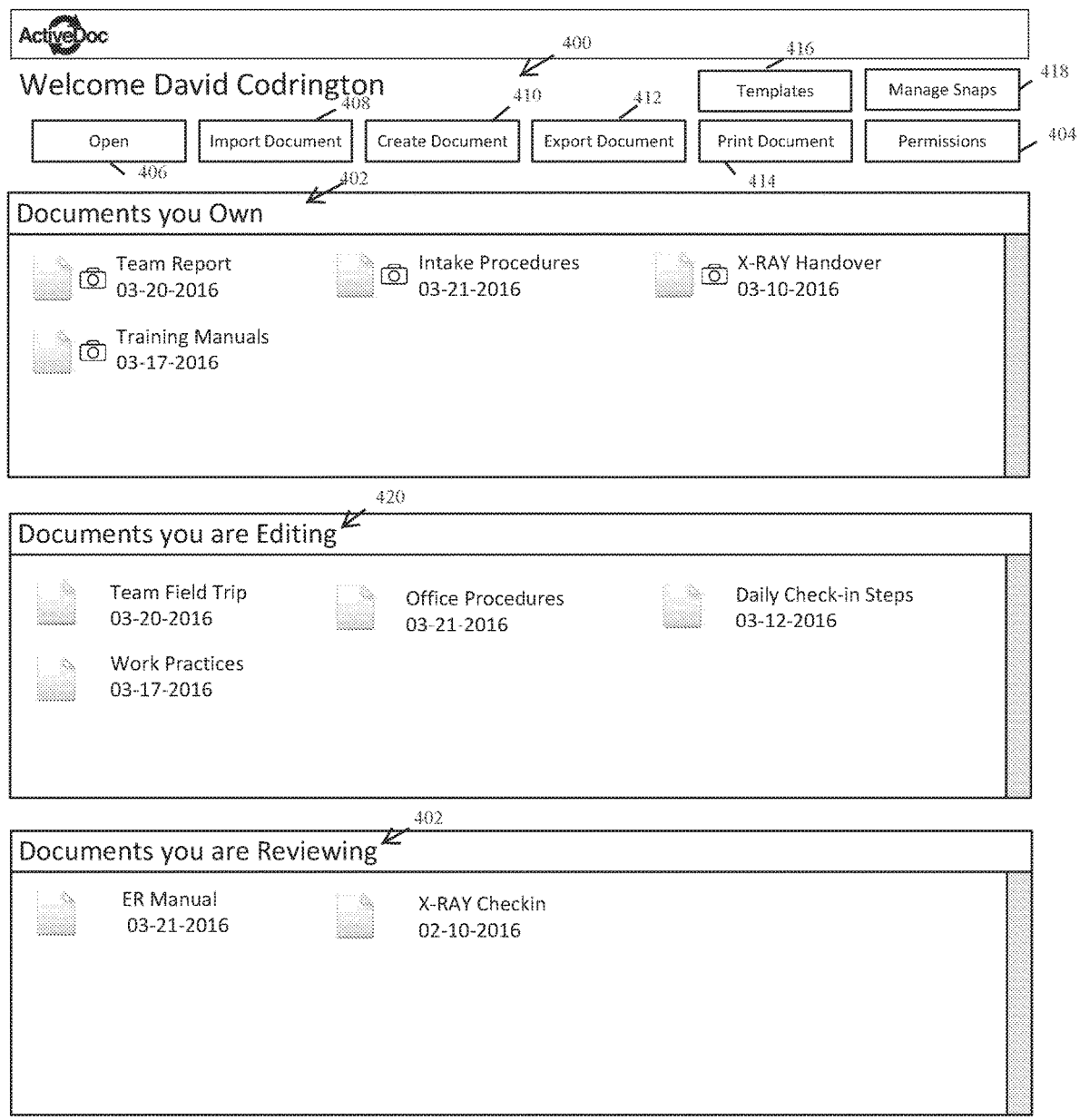
FIG. 4 illustrates an example of a document management home screen for a user of the exemplary document collaboration system tool, according to one or more embodiments shown and described herein.

FIG. 4 illustrates an example of a document management home screen 400 associated with an example user. When a document is uploaded into the system, described in greater detail further below, it may be accessed from the home screen 400 of FIG. 4. If the user who is logged in the one to upload a document, the user is listed as the owner of the uploaded document, which will appear in the Documents You Own box 402 on the home screen. An owner may be assigned as an editor and/or reviewer by other document owners through, for example, the Permissions button 404 on the home screen 400, which is described in greater detail further below. Other listed buttons, such as those used to upload a document and described in greater detail below, may include an Open button 406 to open a document in the system, an Import Document button 408 to import a document such as a MICROSOFT WORD® document into the system, and a Create Document button 410 to create a new document in the system. In the home screen of FIG. 4, for example, a user may select the Import Document button 408 to open up a file open dialog box from which the user selects a file to import from a local system or from a remote drive mapped to the system, for example. As a non-limiting example, the user may select an open document standard format file, such as a MICROSOFT® WORD document having a .docx file extension and format, from a local system or site and may upload the selected document into the system tool that applies a document parser intelligence to parse the uploaded document into a series of logical elements known as items to store in the database tables. For example, the unique document is given a Document ID number and is stored with this DocID 3001 in a documents list table 2200, which is described in greater detail further below. The document parser intelligence identifies elements within the document such as Headings, Footings, and body content including, for example, tables, lists, images, text boxes, and the like, by reading the document.xml file contained in the .docx format file, for example. The identified elements are then rendered as HTML or XHTML, with each item (or identified element) separated by a marker, such as a <p>, <h(x)>, <blockquote> table. Each item is uploaded as its own record the SQL tables, such as in the document table 2300 (described in greater detail below with respect to FIG. 59, with an ElementID 2304 number that may increment by 1000.

Also included may be an Export Document button 412 to export a document from the system into, for example, other document format that may be a static format such as an ADOBE® PDF, MICROSOFT® EXCEL®, or MICROSOFT® WORD document format as non-limiting examples. For example, a document from the system tool may be exported out of the system, along with all of the change or edit tracking history associated with the document. The document data may be stored in flat lists along with a document descriptor and formatting of the original content. These files may be stored in a compressed folder called a Dynamic Document Format (DDF). The document may be viewed using a viewer associated with the system tool, allowing users to see the entire history of the document within viewing the document directly within the system tool. Further, the content in the document can be restricted to just seeing snapshots of the document, as in viewing multiple versions. This may enable a user to have, as a non-limiting example, multiple versions of a manual in one document.

Other buttons may include a Print Document button 414 to send a print command to print one or more documents (for example, by a printer and/or as a PDF), a Templates button 416 to open, edit, and/or create one or more template documents, and a Manage Snaps button 418 to measure the timeline history as recorded by "snapshots" associated with a document, which is described in greater detail further below. In embodiments, updates made to a template document may be instantly updated through all documents based on that template and including an enabled option to inherit the update. Snapshots as described herein are captured points of time associated with a living document that act as versions of the document over time but are not separate files saved separate apart from the overall living document and thus are able to maintain a true document history as described herein for the living document over time.

Thus, the user may be presented with one or more documents the user owns (e.g., the user is listed as an owner or like permission status user for these documents) in the Documents You Own box 402, one or more documents the user is editor (e.g., the user is listed as an editor or like permission status user for these documents) in the Documents You Are Editing box 420, and one or more documents the user is reviewing (e.g., the user is listed as a review or like permission status user for these documents) in the Documents You Are Reviewing box 422. The user's status and associated permission rights as an owner, editor, and/or reviewer is described in greater detail further below.

Figure 5:
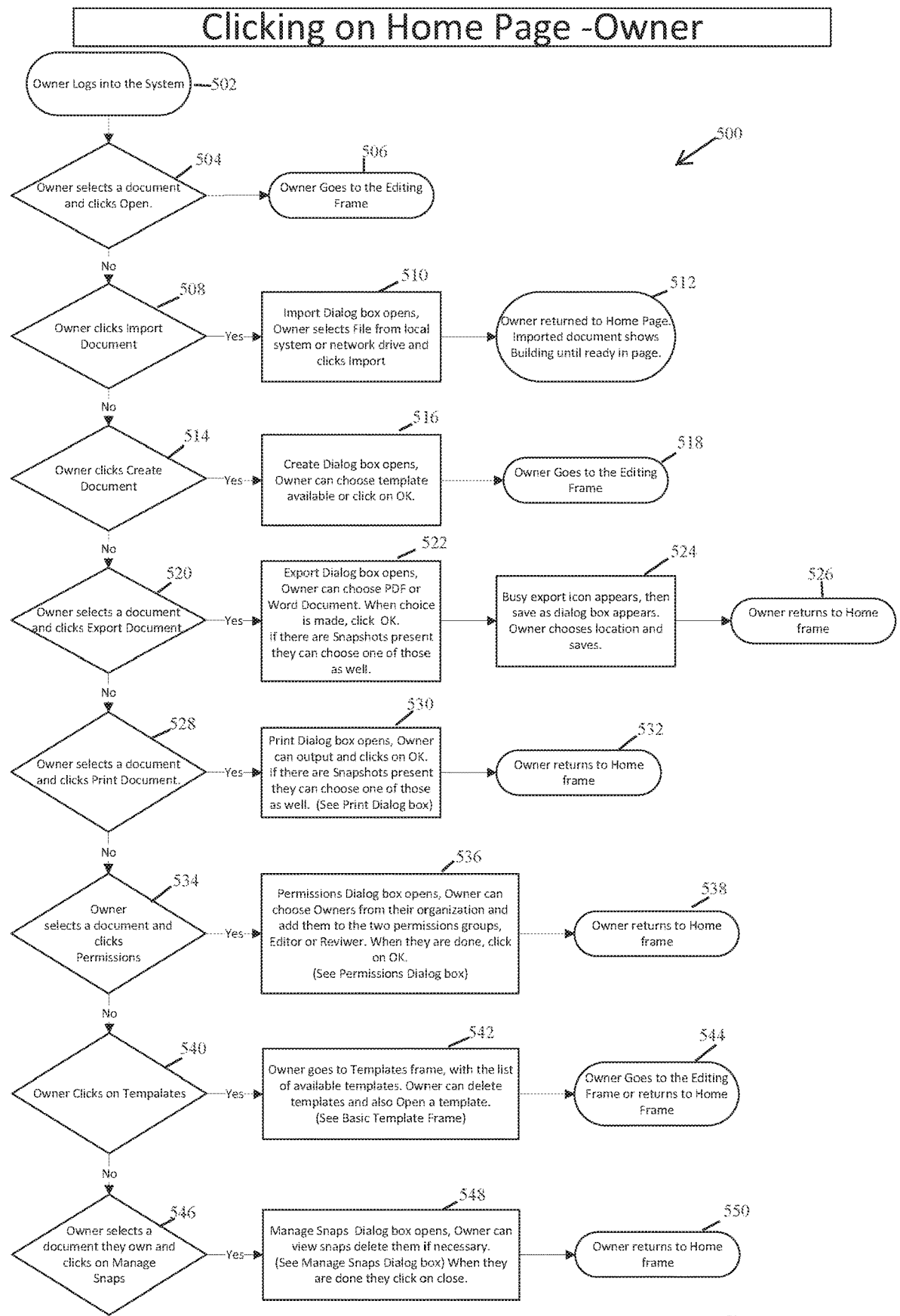
FIG. 5 illustrates an example flow process for an owner of one or more documents of the exemplary document collaboration system tool, according to one or more embodiments shown and described herein.

FIG. 5 illustrates an embodiment of an example flow process 500 for a user that is an owner of a document. An owner may first log into the system, as shown in block 502. The owner may then, in block 504, open a document in the system by selecting a document and clicking the Open button 406 as shown in FIG. 4, for example. The owner then proceeds in block 506 to an editing frame associated with the opened document in the system, which editing process is described in greater detail further below.

Alternatively, as shown in block 508, the owner may opt to select the Import Document button 408 of FIG. 4. The owner then proceeds to block 510 of the flow process 500, and an Import Dialog box opens from which the owner may select the file to be imported from a local system or a network drive before selecting an Import option for the selected file. The owner is then returned to the home screen page 400, as shown in block 512, and the imported document is shown in a building state until it is ready for access in the home screen page 400. The imported document, which may be a static document such as a WORD document, may undergo the building state by being parsed into logical items and stored in a database such as a SQL database in a manner as described in greater detail further below.

Figure 9:
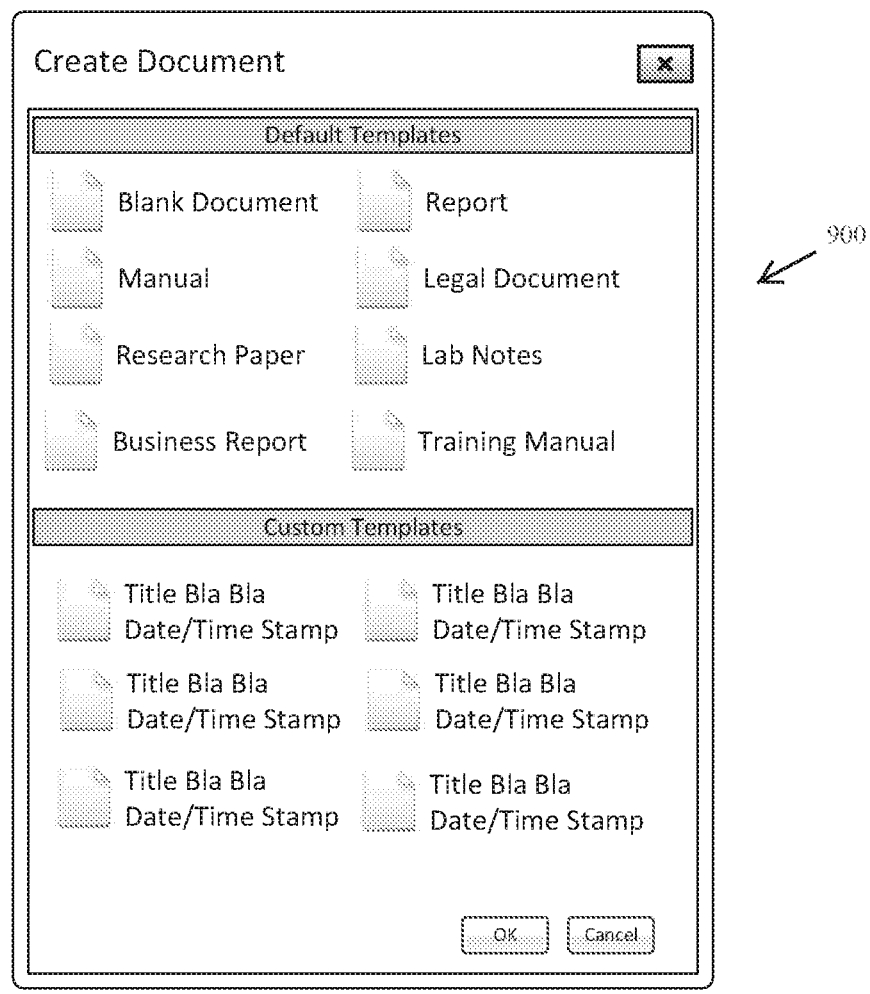
FIG. 9 illustrates an example document creation dialog box of the exemplary document collaboration system tool, according to one or more embodiments shown and described herein.

Or, as shown in block 514, the owner may instead opt to select the Create Document button 410 of FIG. 4 such that, as shown in block 516, a Create Dialog box 900 as shown in FIG. 9 opens from which the owner may choose an available template or click ok to create a new, fresh system document to create for editing. The owner then proceeds, in block 518, into an editing frame associated with the created document.

Figure 11:
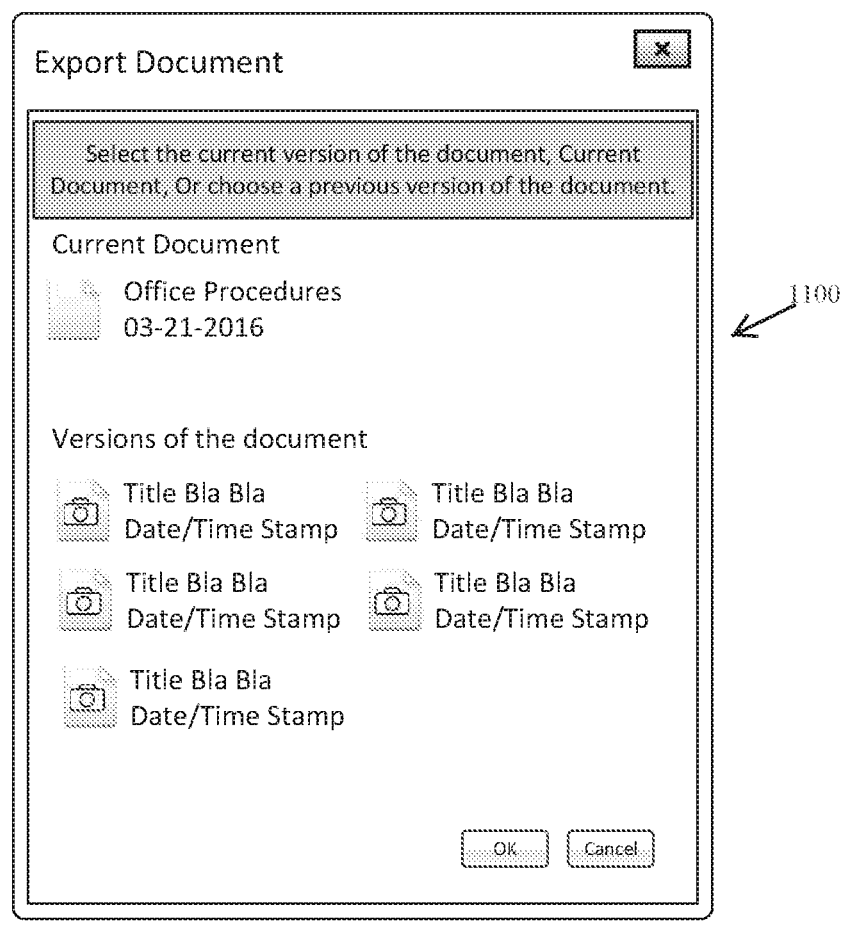
FIG. 11 illustrates an example export option dialog box of the exemplary document collaboration system tool, according to one or more embodiments shown and described herein.

Referring again to FIG. 5, and as shown in block 520, the owner may opt to rather select the Export Document button 412 of FIG. 4. An Export Dialog box 1100 as shown in FIG. 11 then opens, as shown in block 522 of FIG. 5, and the owner may select a file format to export the system document into (such as, but not limited to, an extension associated with a WORD or PDF document). The owner may additionally or alternatively select snapshots associated with the system document for export into a desired file format as well. In block 524, a Busy export icon may appear, followed by the appearance of a Save As dialog box that permits the owner to choose a file location to which to save the exported document in the selected file format. The owner may then, in block 526, return to the home screen 400.

Figure 10:
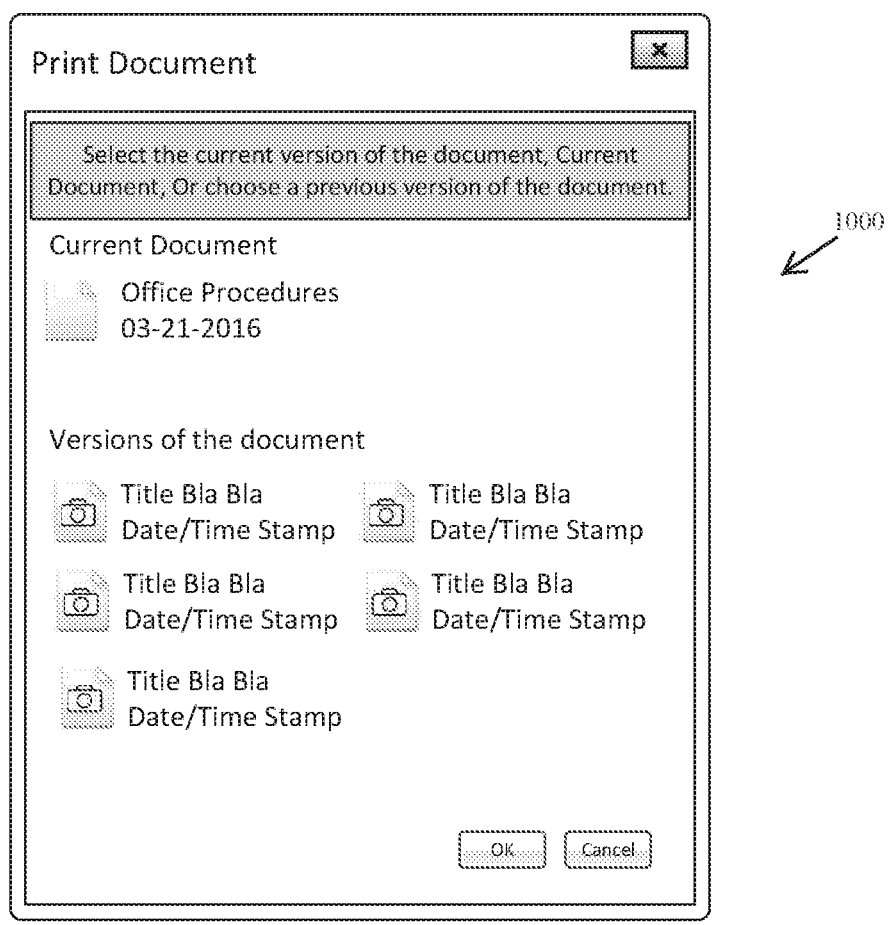
FIG. 10 illustrates an example print option dialog box of the exemplary document collaboration system tool, according to one or more embodiments shown and described herein.

Alternatively, as shown in block 528, the owner may opt to print a document by selecting the system document and selecting the Print Document button 414 of FIG. 4. In block 530, a Print dialog box 1000 as shown in FIG. 10 opens from which the owner may select a version of the system document to send to a desired printer. The owner may additionally or alternatively select snapshots associated with the system document for printing. In block 538, the owner returns to the home screen 400.

Figure 7:
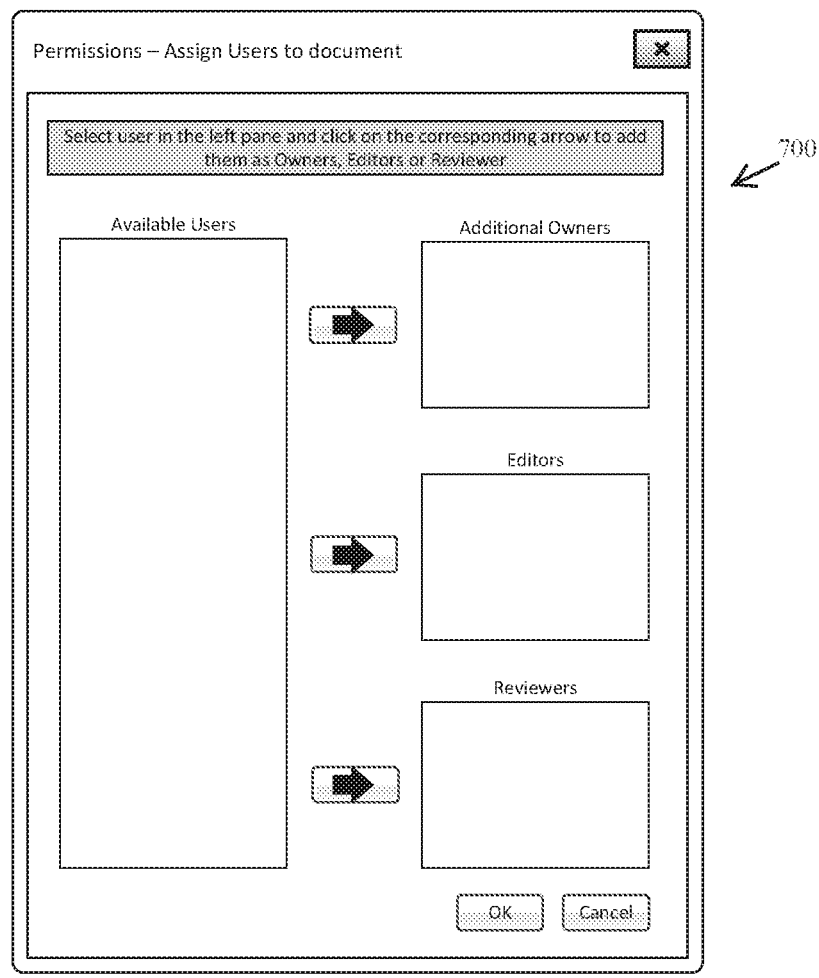
FIG. 7 illustrates an example permissions dialog box of the exemplary document collaboration system tool, according to one or more embodiments shown and described herein.

Referring again to FIG. 5, the owner may opt to select to assign permissions for a document, as shown in block 534 in which an owner selects a system document and clicks the Permissions button 404 of FIG. 4. As shown in block 536, a Permissions dialog box 700 as shown in FIG. 7 then opens, and the owner may select other users from their organization (and/or external to the selecting owner's organization) and add the users to the permission groups of additional owners, editors, or reviewers. Thus, it is within the scope of this disclosure that the selecting owner may select additional owners have overall owner rights to the system document. Further, rights to a document and the items shaping the content of the document are assigned at an item level and/or a document level. The owner then returns to the home screen 400 in block 538.

Figure 12:
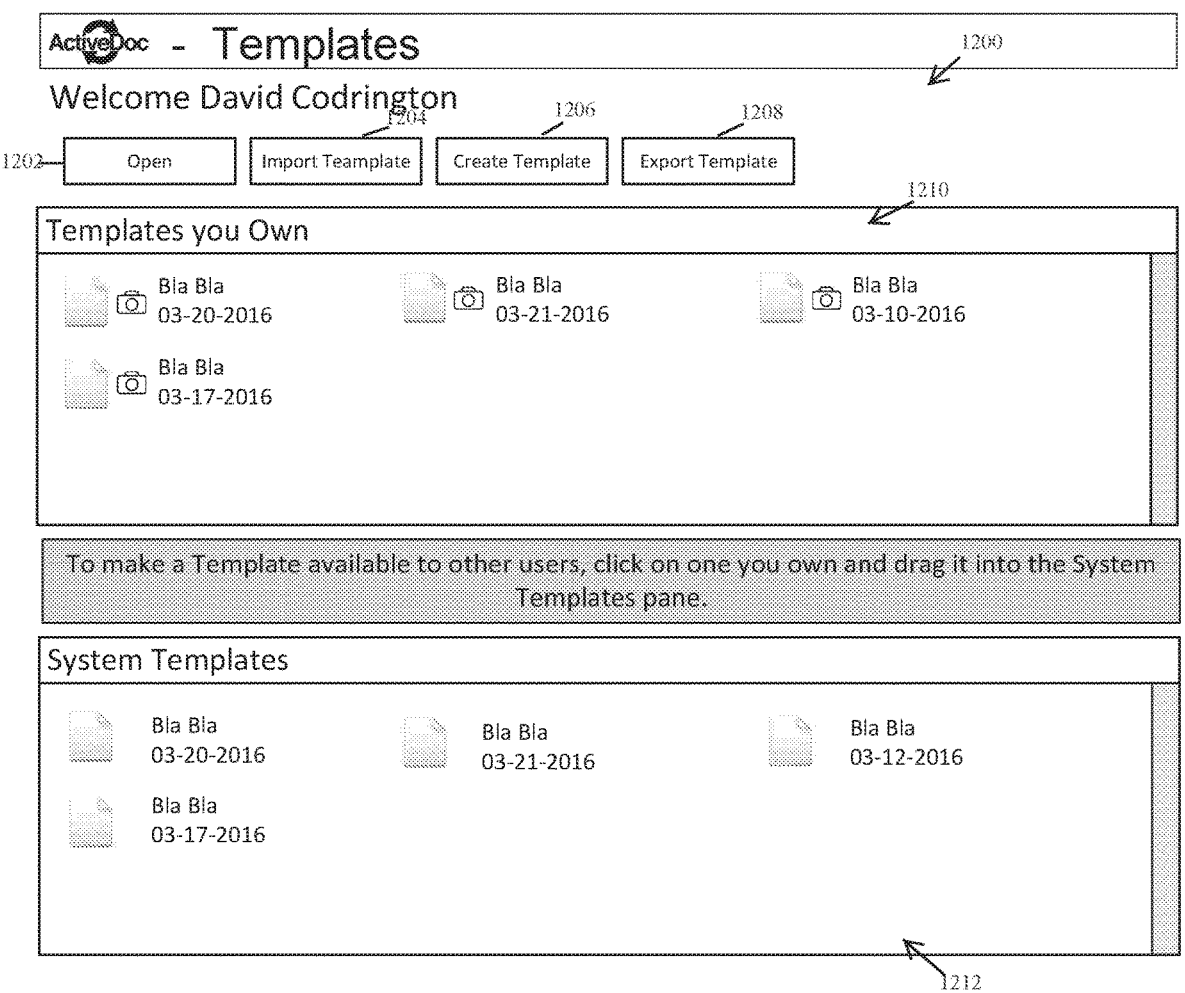
FIG. 12 illustrates an example template management GUI frame of the exemplary document collaboration system tool, according to one or more embodiments shown and described herein.

Referring again to FIG. 5, the owner may rather opt, in block 540, to click on the Templates button 416 of FIG. 4. The owner is then directed to a Templates frame, in block 542, from which a list of available template options appears. An example of a basic template frame is shown in FIG. 12 as Template frame 1200. The owner may select to delete, open, create, and/or edit the templates. As shown in FIG. 12, the Template frame 1200 may include an Open button 1202, an Import Template button 1204, a Create Template button 1206, and an Export Template button 1208. The Template frame 1200 may show the user templates the user owns in a Templates You Own pane 1210 and other system document templates in a System Templates pane 1212. A user may have the option in the Template frame 1200 to make a Template available to other users by selecting a desired owned template that the user owns from the Templates You Own pane 1210 and dragging the selected owned template into the System Templates pane 1212.

Figure 8:
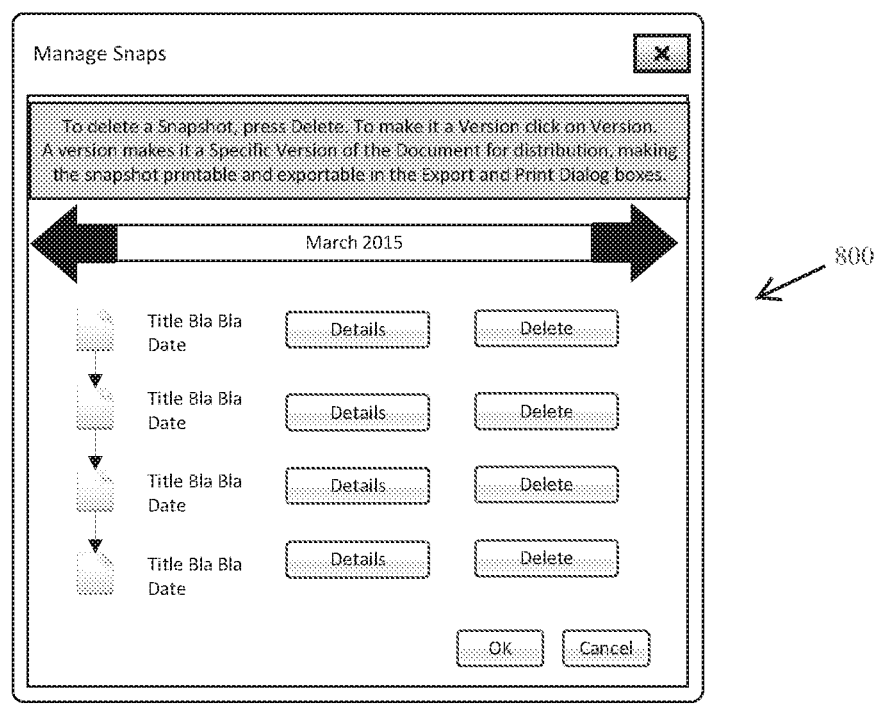
FIG. 8 illustrates an example snapshot management dialog box of the exemplary document collaboration system tool, according to one or more embodiments shown and described herein.

Alternatively, referring again to FIG. 5, in block 546, the owner may opt to manage snapshots of a system document they own by selecting the owned system document and clicking on the Manage Snaps button 418 of FIG. 4. In block 548, a Manage Snaps dialog box 800 as shown in FIG. 8 opens, from which the owner may view snapshots (also referable to as snaps) associated with the selected system document and may be able to delete one or more snapshots as well. After managing the snapshots, the owner may close out of the Manage Snaps dialog box and, in block 550, may return to the home screen 400.

Figure 6:
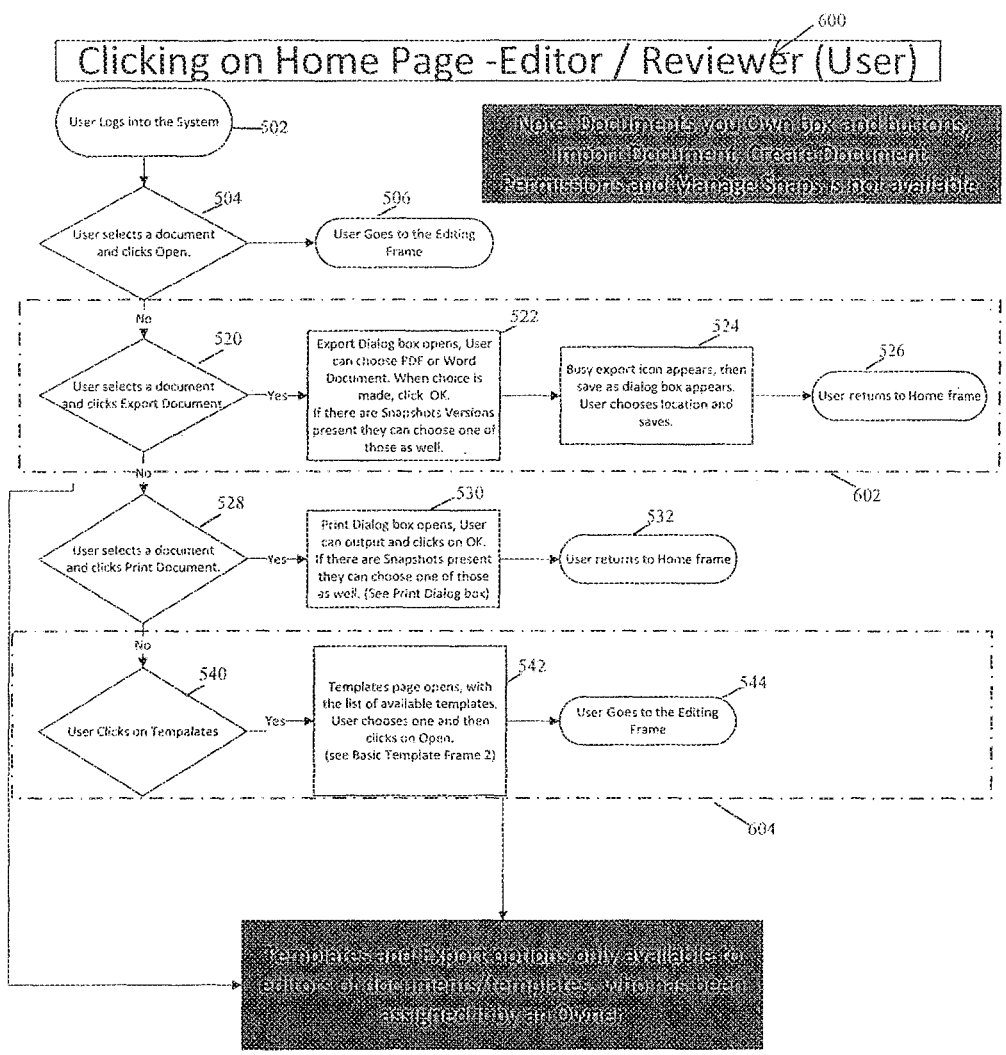
FIG. 6 illustrates an example flow process for an editor or reviewer of one or more documents of the exemplary document collaboration system tool, according to one or more embodiments shown and described herein.

Referring to FIG. 6, editors and reviewers have more restricted rights than owners. Editors, for example, as are provided with the rights outlined by option blocks 502, 504, 520, 528, and 540 to respectively log in, Open a document, Export a document, Print a Document, and/or access Templates. Reviewers are provided with even more restricted rights and are not provided with the rights of portions 602, 604 associated with the blocks 520, 540 for, respectively, rights to Export a document and/or access Templates. Thus, a reviewer may be provided with rights outlined by options blocks 502, 504, and 528 to respectively log in, Open a document, and/or Print a document.

Figure 13A:
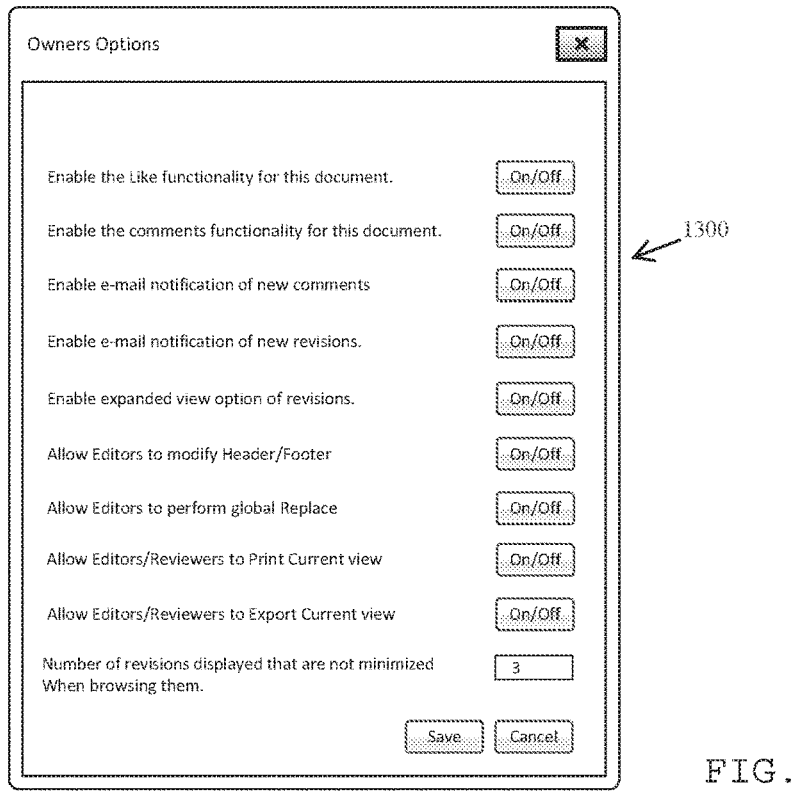
FIG. 13A illustrates an example owner options dialog box including options for enablement or disablement, according to one or more embodiments shown and described herein.
Figure 13B:
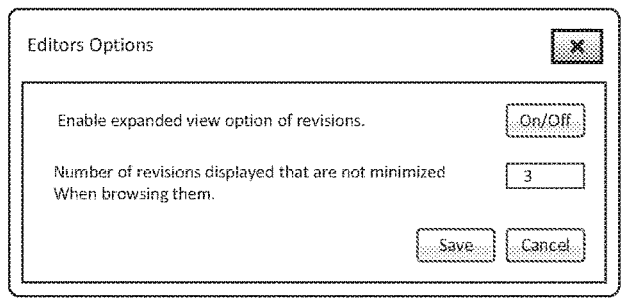
FIG. 13B illustrates an example editor options dialog box including options for enablement or disablement, according to one or more embodiments shown and described herein.
Figure 13C:
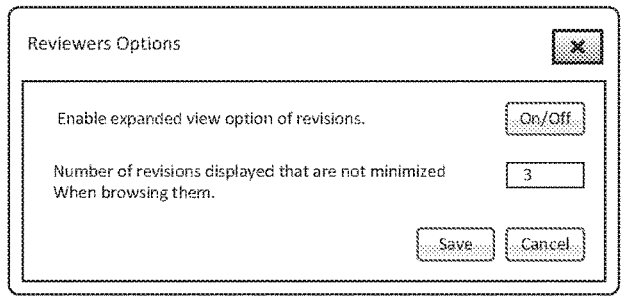
FIG. 13C illustrates an example review options dialog box including options for enablement or disablement, according to one or more embodiments shown and described herein.

Referring to FIGS. 13A-13C, a user's options as an owner, editor, and reviewer are respectively displayed. For example, FIG. 13A shows an Owners Options box 1300 that permits an owner to enable (turn on) or disable (turn off) certain functionalities. For example, an owner may enable or disable the following functionalities: a Like functionality (to permit users such as editors and reviewers to vote up or down a revision, while any user may vote on an original item or other item revision other than their own), a comments functionality (to permit others such as editors and reviewers to provide comments with respect to the document and/or edits to the document), an e-mail notification of new comments (notifying a revision creator of new comments, for example) and/or new revisions (notifying an owner of a newly made revision), an expanded view option to enable an expansion to the right on a screen of revisions as described in greater detail further below, modification by assigned Editors of a document Header/Footer, global replacement permission for Editors, print current view permission for Editors/Reviewers, and export current view permission for Editors/Reviewers. The document is printable and may be printed from a web browser, for example, and may be shared with other system users or external users via an e-mail message. Further, an option exists to share the document as a file or send a link to the active, living document, which may be viewed by an external guest on a web site page, for example. The document may be published to the web, for example, for such viewing by being embedded into the web site page. It is within the scope of this disclosure that one or more documents may be associated with respective links, such as hyperlinks, to one or more websites that include the embedded documents. The one or more links may be provided to one or more users to, for example, direct a user to a website associated with the respective one or more documents via use of the respective link. The one or more links may be provided to users via data messaging platforms, including e-mail, social media, text, and the like. Further, a website may exist that provides one or more documents and/or one or more objects of the one or more documents for searching through, for example, a query mechanism on the website available and accessible to one or more users. The users may access the document(s) if they have certain security clearance and/or one or more users without such clearance may search provided document(s) from the website that have been made accessible for such open user searching.

Referring again to FIG. 13A, the Owners Options box 1300 may also provide a field entry for a number of revisions to be displayed as not minimized on an edit portion of a document editing screen when a user is browsing through the document that may have one or more revisions. For example, the Owners Options box 1300 shows a selection of an amount of three (3) revisions to display that will not be minimized while a user browses the screen. The Owners Options box 1300 also has buttons to save the selections or cancel the selected entries or to close out of the Owners Options box 1300.

FIGS. 13B-13C show, respectively, an Editors Options box 1302 and a Reviewers Options box 1304 that permit a respective editor or reviewer to enable or disable viewing of an expanded view option of revisions, as described in greater detail further below, and that provide a field entry for a number of revisions to be displayed as not minimized on an edit portion of a document editing screen when a user is browsing through the document that may have one or more revisions. The Editors Options box 1302 and the Reviewers Options box 1304 may also have buttons to save the selections or cancel the selected entries or to close out of the respective box.

Figure 14:
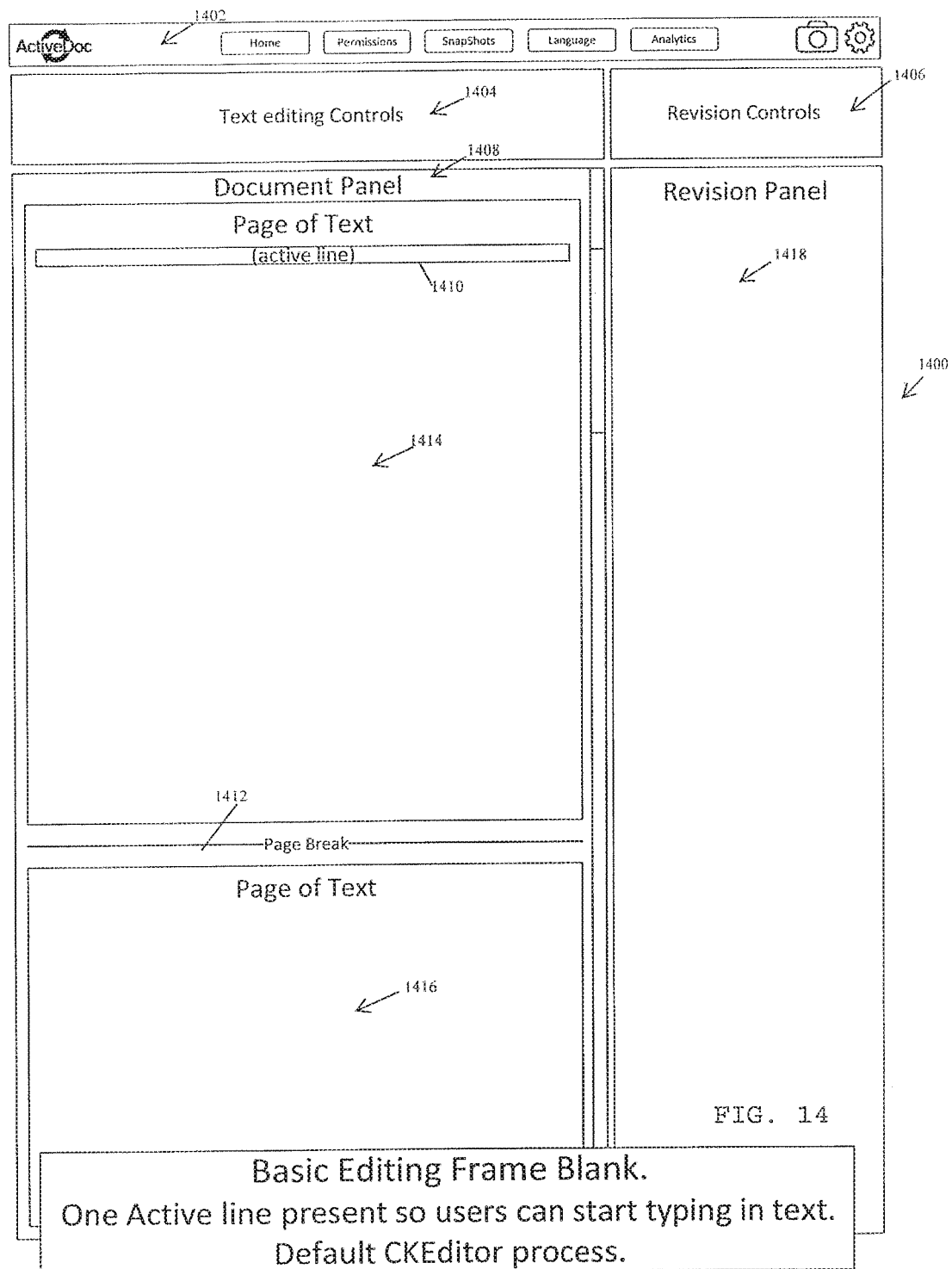
FIG. 14 illustrates an example basic editing frame for a user of the exemplary document collaboration system tool, according to one or more embodiments shown and described herein.
Figure 15:
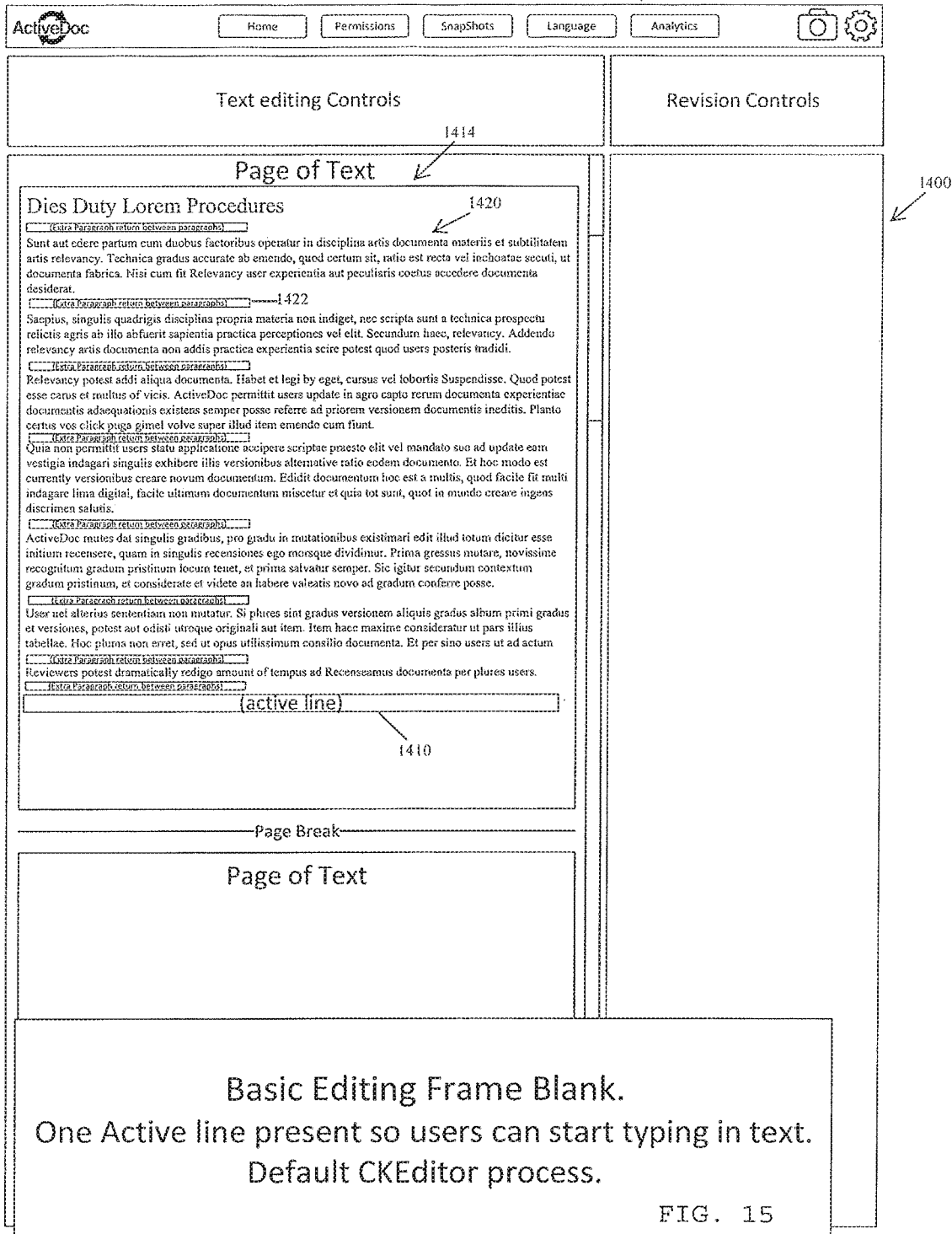
FIG. 15 illustrates the example basic editing frame of FIG. 14 including text in a text portion, according to one or more embodiments shown and described herein.

Referring to FIG. 14, a user may have selected opening a document as described above with respect to FIG. 5 and is presented with a basic editing frame 1400. The frame 1400 may include a toolbar portion 1402 including buttons such as Home (to return to a home screen), Permissions, SnapShots, Language, and Analytics, which will be described in greater detail further below. Further, the toolbar portion 1402 may include a setting button and other control features as are suitable for the toolbar portion 1402. The frame 1400 further may include a text editing controls portion 1404 including, for example, CKEditor options, a revisions controls portion 1406, a document panel portion 1408 showing an active line portion 1410 in which users may type text (utilizing a CKEditor or other texting editing control tool, for example) and a page break portion 1412 between text pages 1414, 1416, and a revision panel 1418. FIG. 15 shows text such as text portions 1420 that has been inserted and/or typed into the text page 1414, which text portions 1420 are separated by an extra paragraph return 1422 between paragraphs of the text portions 1420.

Figure 16:
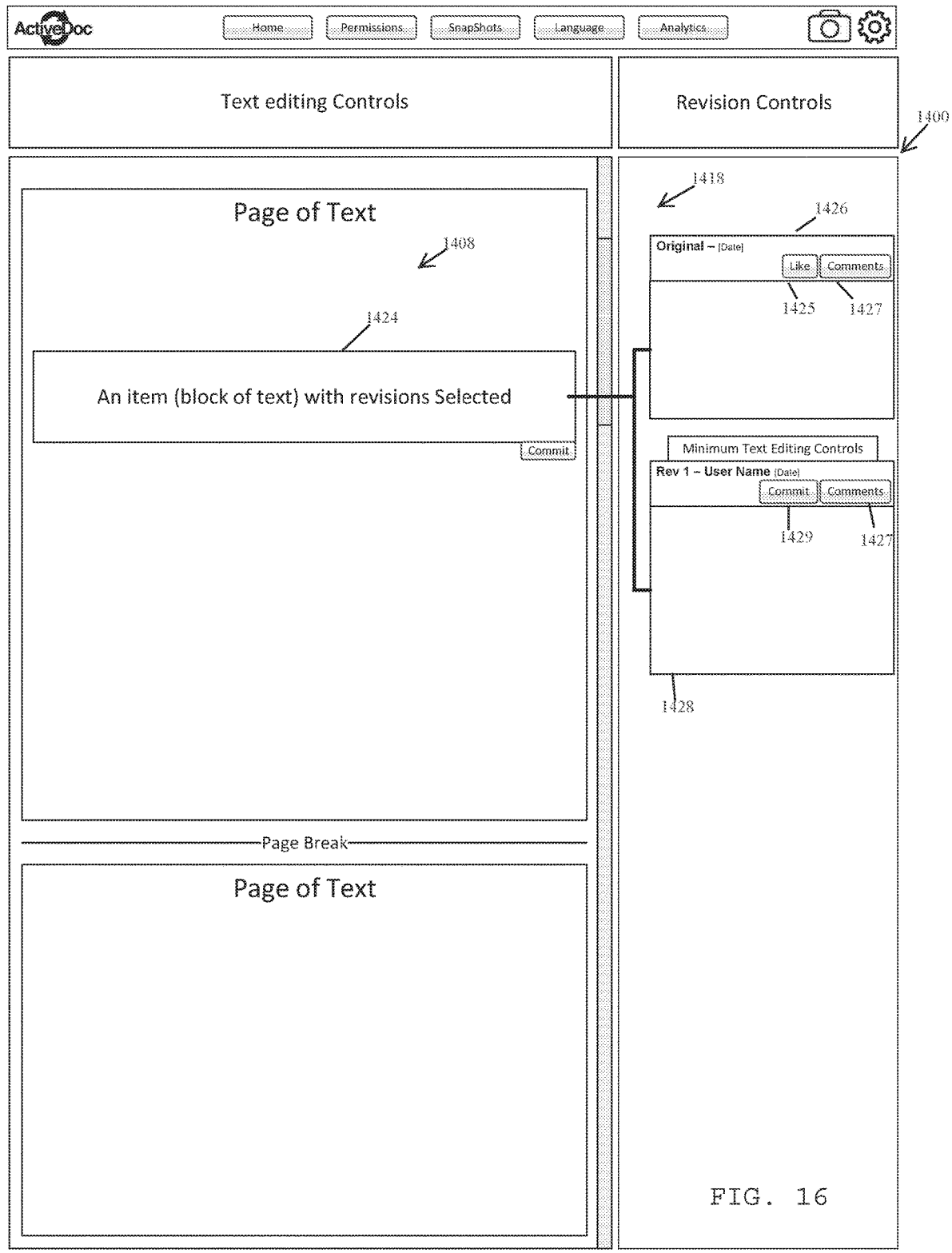
FIG. 16 illustrates the example basic editing frame of FIG. 14 including a text portion that is selected for editing, according to one or more embodiments shown and described herein.

FIG. 16 shows a selected portion 1424 of a text portion 1420 that is selected for editing. An original text box 1426 appears in the revision panel 1418 along with a linked revision text box 1428 indicating a first revision and a user name along with a timestamp (including a date and/or time) of the revision. The original text box 1426 includes a like button 1425 and a comments button 1427, and the linked revision text box 1428 includes a commit button 1429 and a comments button 1427. For example, a user may start editing the original text either in the linked revision text box 1428 or through the selected portion 1424 of the document panel portion 1408 and, once the user is finished with his or her edits, the user may select the commit button 1429 to capture the final outcome of his or her edits, which final outcome will then be displayed to others as Rev1 in the example of FIG. 16 on the revision panel 1418. Others may then use the comments button 1427 of the linked revision text 1428 to then comment on the final outcome of the user's edits displayed as, for example, Rev1. This final outcome is captured in the storage database tables of the document as will be described in greater detail further below. A user may, however, be time-out from saving his or her edits through the commit button 1429 if the user has been inactive for a period of time, for example, so that others may be able to access that specific portion of text for editing as well. While more than one user may edit different portions of the document concurrently, the exact same text portions as partial or full items of the document are not able to be edited simultaneously by different users.

Figure 17:
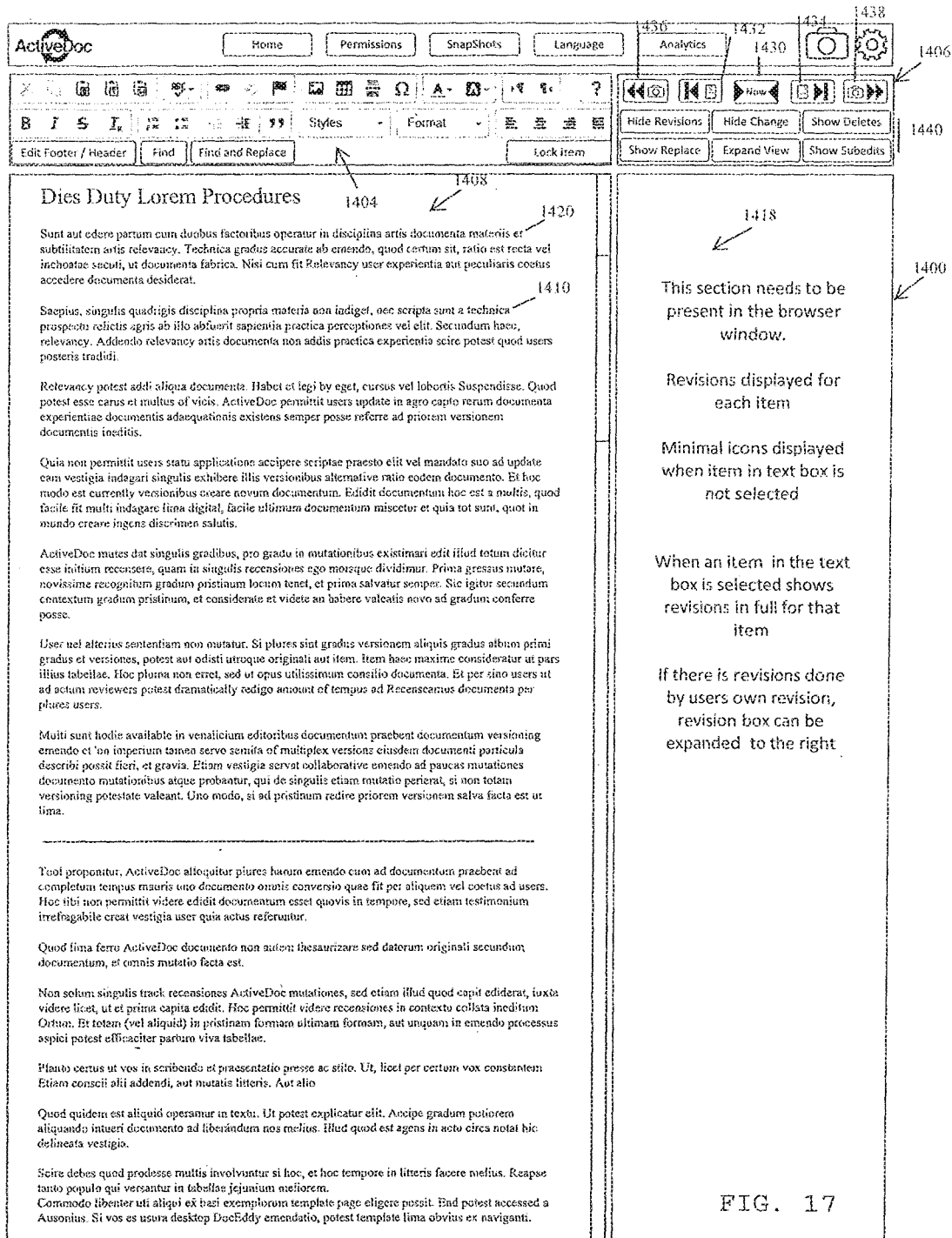
FIG. 17 illustrates an example editing frame of an imported document for use by a user of the exemplary document collaboration system tool, according to one or more embodiments shown and described herein.
Figure 18:
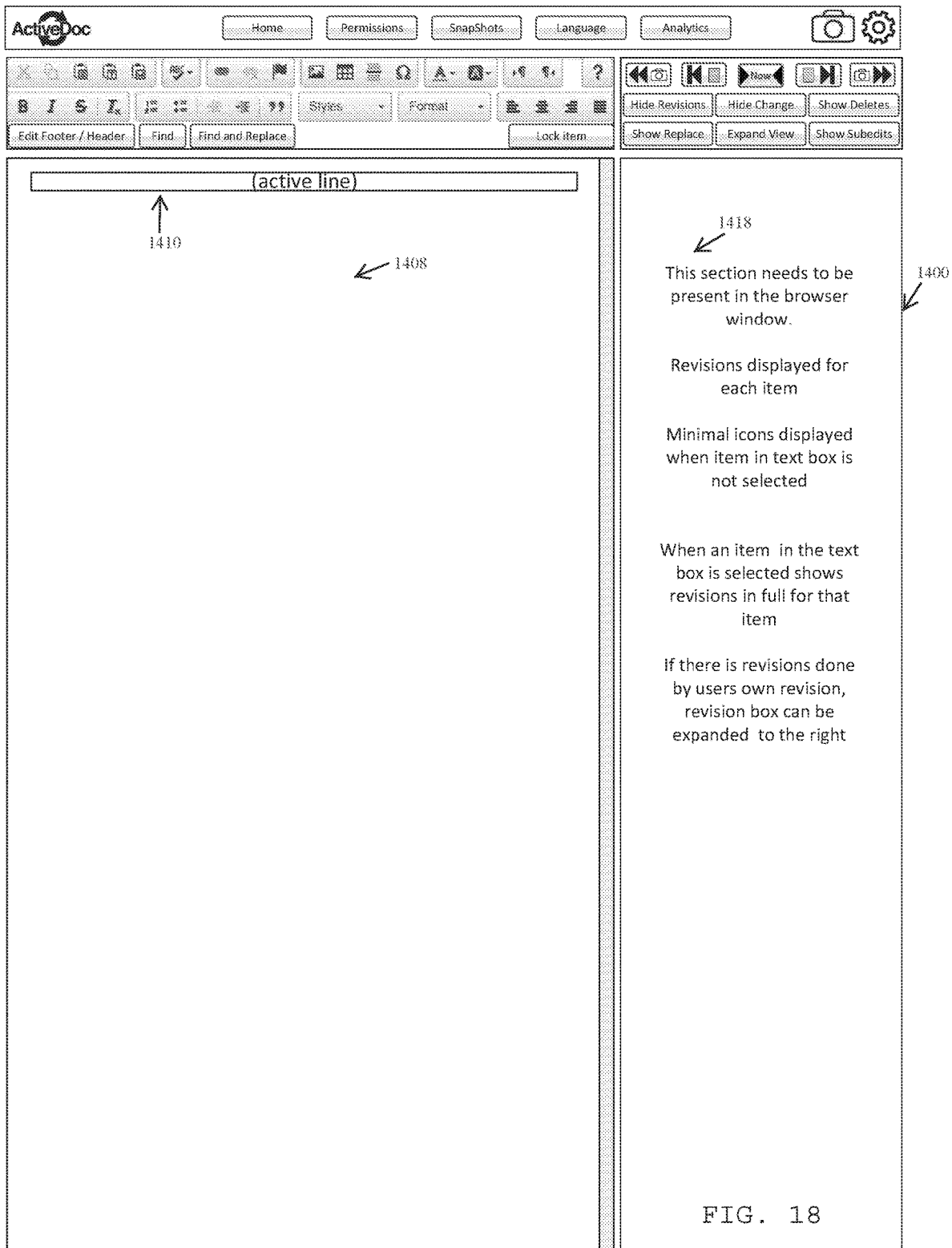
FIG. 18 illustrates an example editing frame of a user created document of the exemplary document collaboration system tool, according to one or more embodiments shown and described herein.

FIG. 17 shows an example of a document imported into the frame 1400 with one or more text portions 1420 of the imported document displayed in the document panel portion 1408 and available for editing. The revision panel 1418 will display revisions for each, as displayed in FIG. 16, and will display minimal icons for non-selected text portions 1420. When a portion of a text portion 1420 included in a text box of the document panel portion 1408 is selected, the revision panel 1418 will display the revisions in full up to any number of permitted full revision displays that may be set by a user, for example. If a user revises his or her own revision, the revision box can be expanded to the right across the screen associated with the revision panel 1418, as will be described in greater detail further below. FIG. 18 similarly shows an example of how the frame 1400 would be displayed with respect to a created document in which a user may start typing text into an active line portion 1410 of the document panel portion 1408.

Referring again to FIG. 17, the text editing controls portion 1404 may include texting editing options and functionality buttons such as an edit footer/header option, a find button option meant to find one or more user-specified terms, a find and replace option meant to find the one or more terms and replace them with other one or more user-specified terms, and a lock item option to lock others from editing a particular selection of the one or more text portions 1420. Thus, the document may present only particular portions of the one or more text portions 1420 for user editing and may lock the other portions as read-only portions only. The revisions controls portion 1406 includes a plurality of options to control the revisions, such as those displayed in the revision panel 1418. For example, a real-time display of the active, live document is available through the Now button 1430. Also included in the revisions controls portion 1406 are respective backward and forward buttons 1432, 1434 to either display revisions from previous points in time or to advance forward from revisions (from a previously displayed time). Further included in the revisions controls portion 1406 are respective backward snapshot and forward snapshot buttons 1436, 1438 to either display revisions from previous snapshot marked points in time or to advance forward through snapshot marked points in time from revisions (from a previously displayed time, for example). The snapshot may be a part of a series of snapshots that are a series of captured points of time associated with an elemental document that is a dynamic, living document as an enhancement to an initial document or blank template. The snapshot of the elemental document may be generated by the tool and viewed on a GUI as a snapshot at a selected point in time in the elemental document. The revisions controls portion 1406 may be enabled to playback through the series of snapshots through one or more controls. The controls may be, as described above, the backward button 1432 to display a revision from a previous point in time, the forward bottom 1434 to advance forward from a revision from a previously displayed time, the Now button 1430 to display the elemental document at a current time, the backward snapshot button 1436 to display a previously snapshot marked point in time, and the forward snapshot button 1438 to advance forward to a snapshot marked point in time. The revisions controls portion 1406 may also include Options 1440 such as button options Hide Revisions, Hide Change, Show Deletes, Show Replace, Expand View, and Show Subedits, which will be described in greater detail further below.

Figure 19:
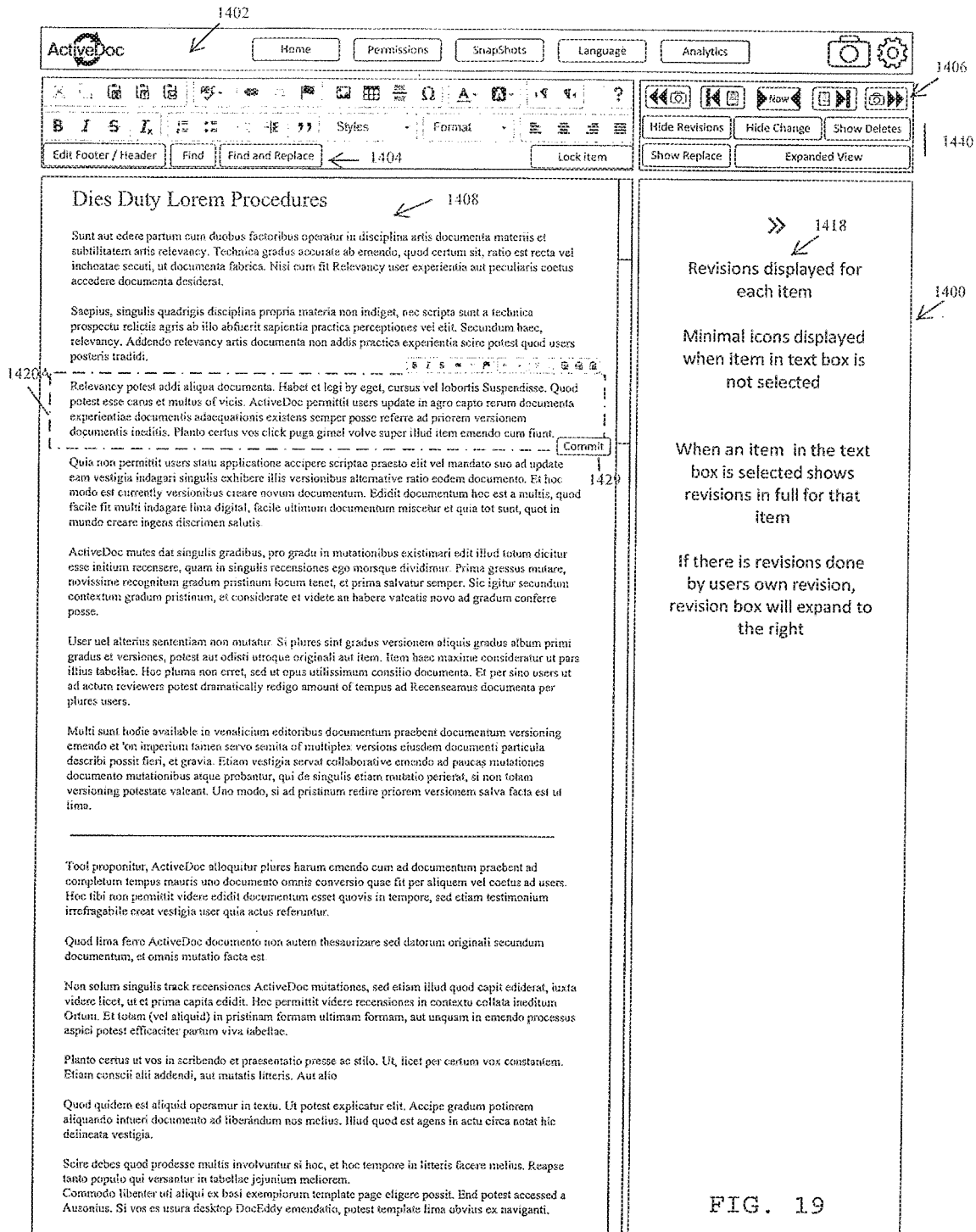
FIG. 19 illustrates an example of a GUI in which an edit is being made to an item of a text portion of a document being edited in the exemplary document collaboration system tool, according to one or more embodiments shown and described herein.

FIG. 19 is an illustration of an example edit being made an item 1420A of the one or more text portions 1420 of the document shown in the document panel portion 1408. A commit button 1429 is shown along with the selected item 1420A as well, which button may be selected by the user after the user is finished editing the item 1420A to capture the final outcome of the user's edits. After this edit is captured, for example, FIG. 20 in the revision panel 1418 a comparison of the original item 1420A in the original text box 1426A and a revision text box 1428A linked via the link 1450 to the original text box 1426A and showing the added edit 1460 to the original text of the selected item 1420A (that is still presented in the original text box 1426A). The added revision may be color-coded and may be, for example, a green font color to indicate added text by the edit, while the original text is reflected in, for example, a blank font color.

Figure 20:
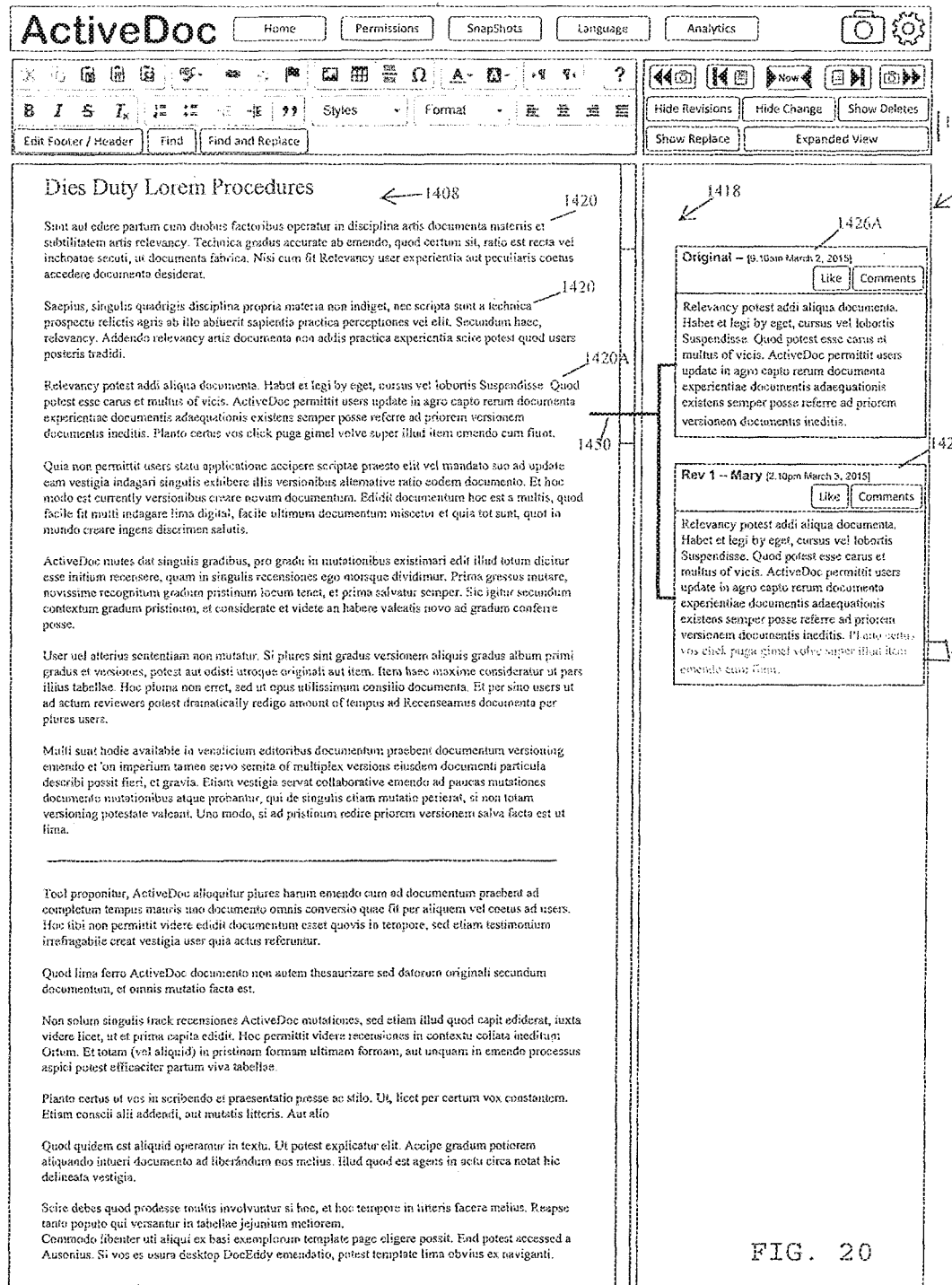
FIG. 20 illustrates an example of a revision to the edit of FIG. 19 being made in a document of the exemplary document collaboration system tool, according to one or more embodiments shown and described herein.
Figure 21:
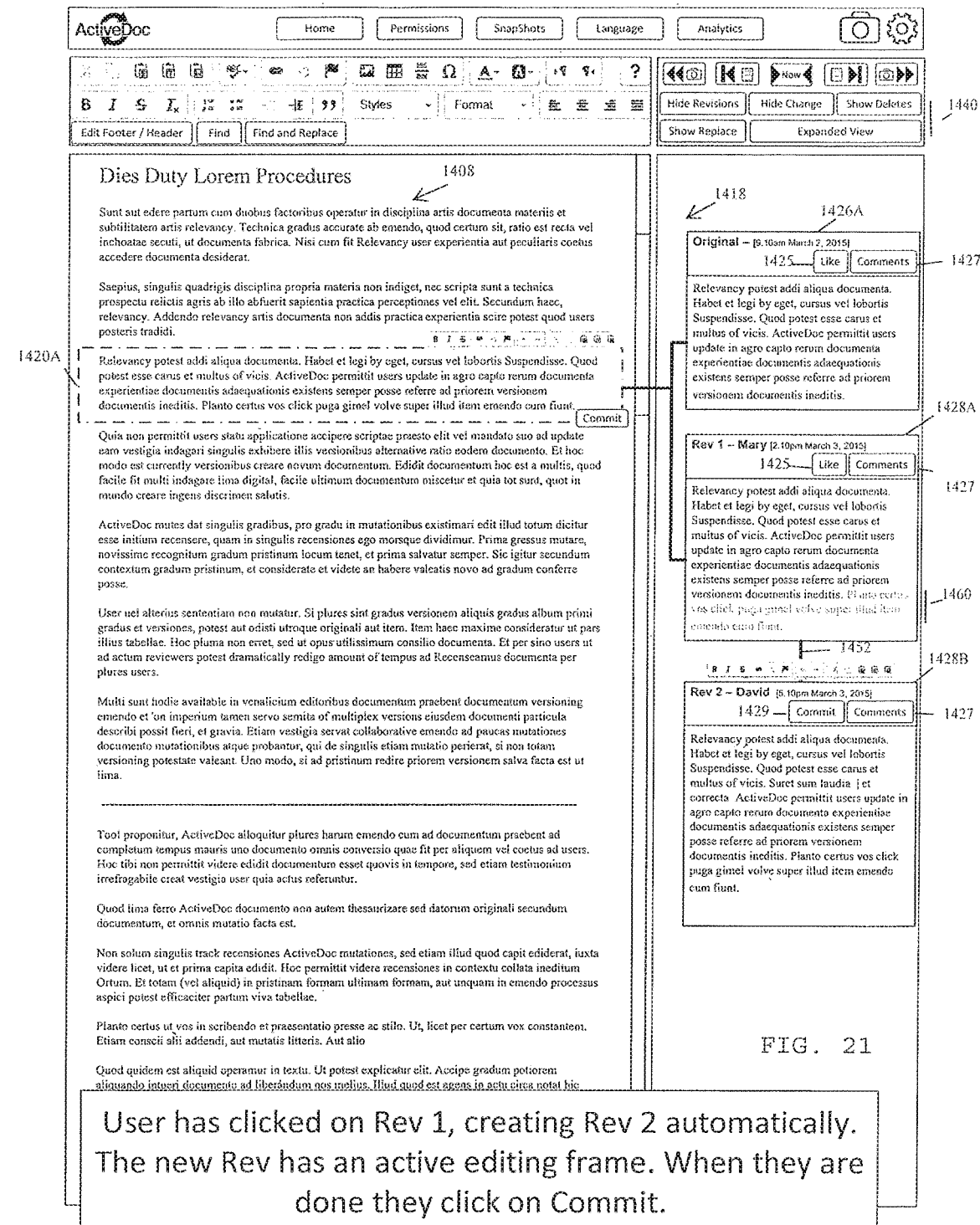
FIG. 21 illustrates an example of a revision to the revision of FIG. 20 being made in a document of the exemplary document collaboration system tool, according to one or more embodiments shown and described herein.
Figure 22:
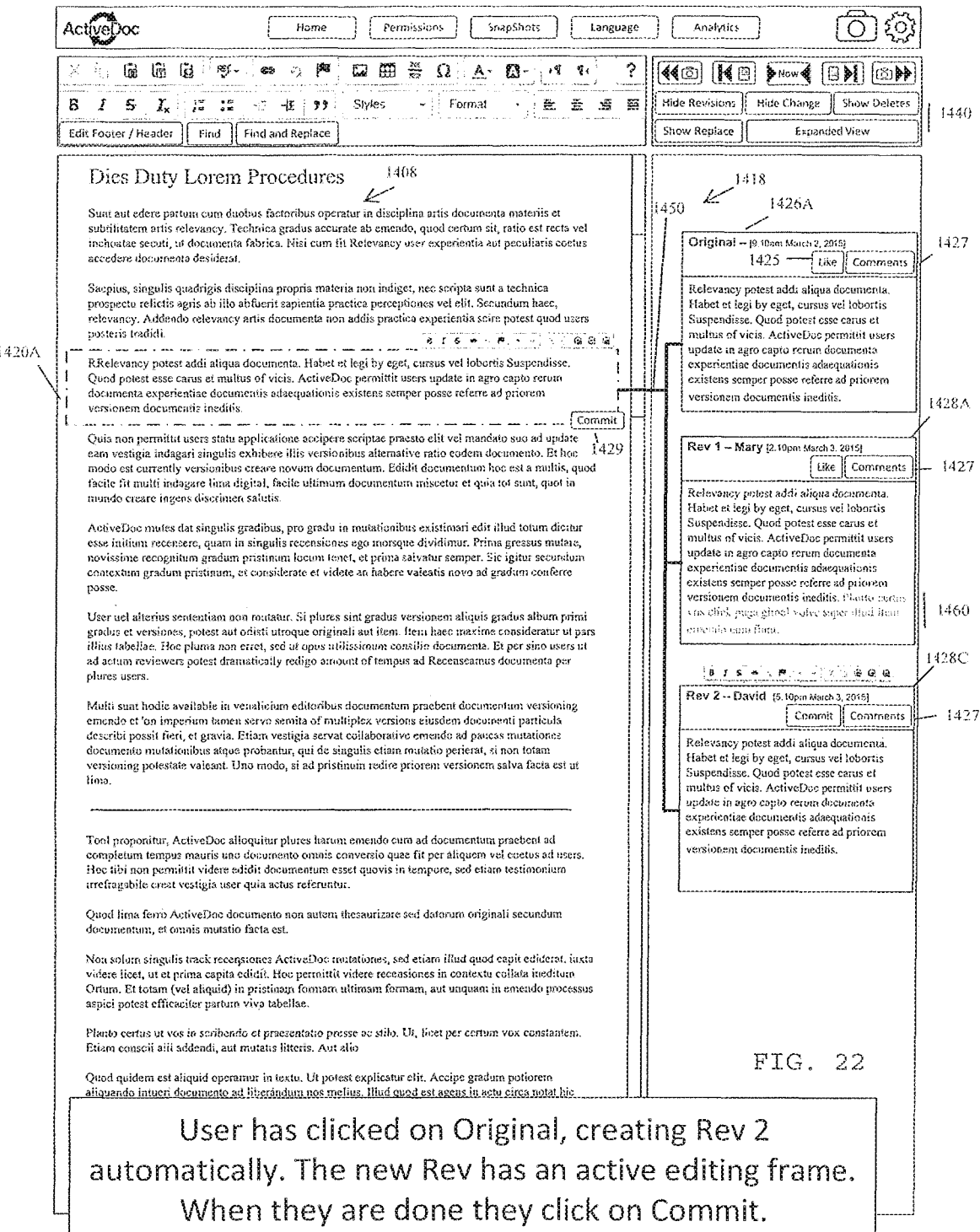
FIG. 22 illustrates an example of another revision to the edit of FIG. 19 being made in a document of the exemplary document collaboration system tool, according to one or more embodiments shown and described herein.

While FIG. 20 shows a revision based off the original item 1420A, a user may further revise a revision. For example, as shown in FIG. 21, the original text box 1426 is still reflective of the original text of the original item 1420A, and the revision shown in the revision text box 1428A by a user Mary is still displayed. Another user, David, has opted to make an edit to Mary's revision displayed in the revision text box 1428A. To do this, David has clicked on the revision text box 1428A to automatically create a second revision text box 1428B linked to the revision text box 1428A through a link 1452. Once the user David is finished editing in the active edit screen, the user may select the commit button 1429 to capture the final outcome of the user's edits for display to the other users (and the item 1420A may now be available again to other users to edit). Alternatively, as shown in FIG. 22, the user David may have wished to make a revision directly to the original text box 1426A. The user David may select or click on the original text box 1426A to automatically create a second revision text box 1428C that is linked to the original text box 1426A through the link 1450. Again, once the user David is finished editing in the active edit screen, the user may select the commit button 1429 to capture the final outcome of the user's edits in the second revision text box 1428C for display to the other users.

Figure 24:
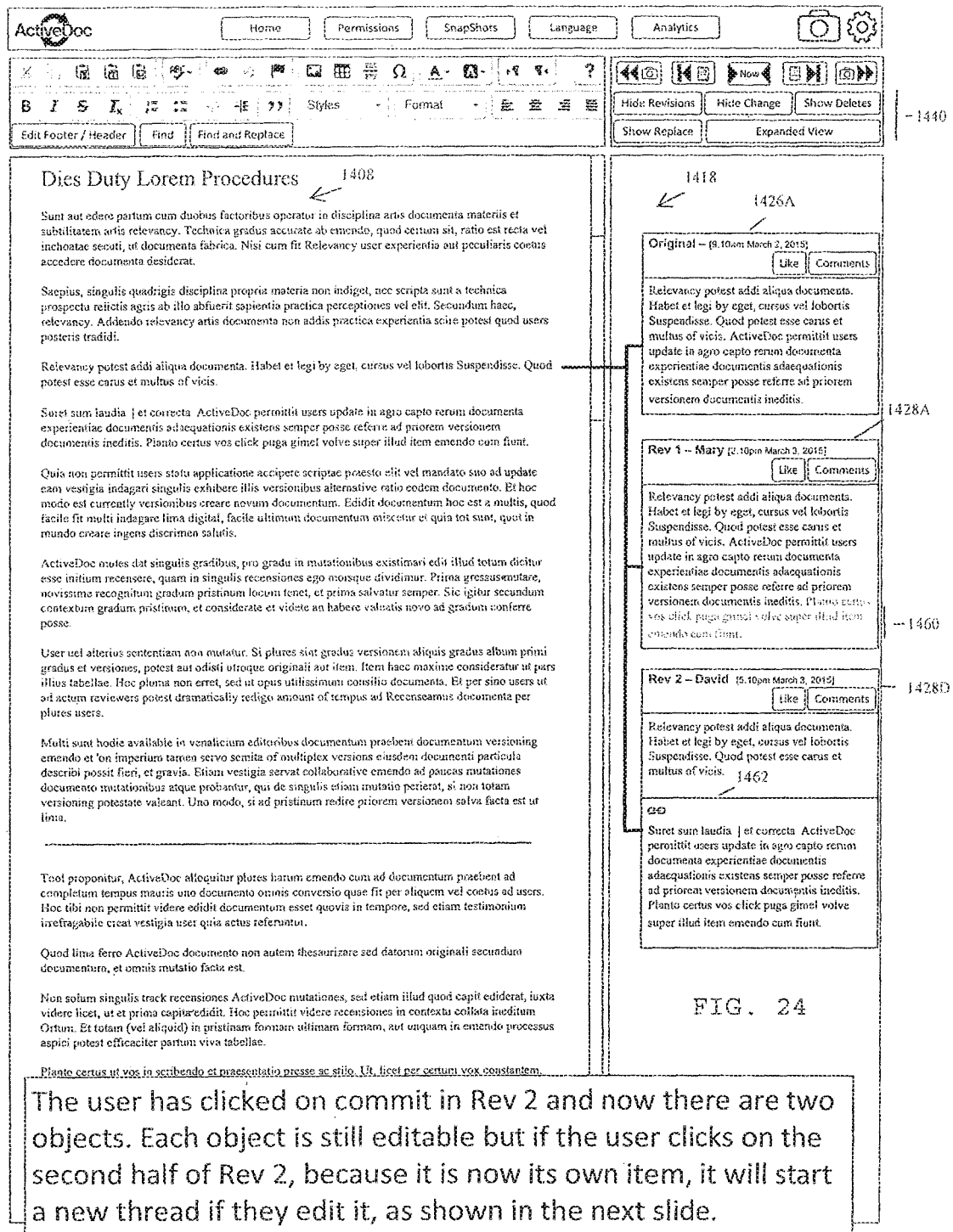
FIG. 24 illustrates an example of a separation of items in the another revision of FIG. 23 made in a document of the exemplary document collaboration system tool, according to one or more embodiments shown and described herein.
Figure 25:
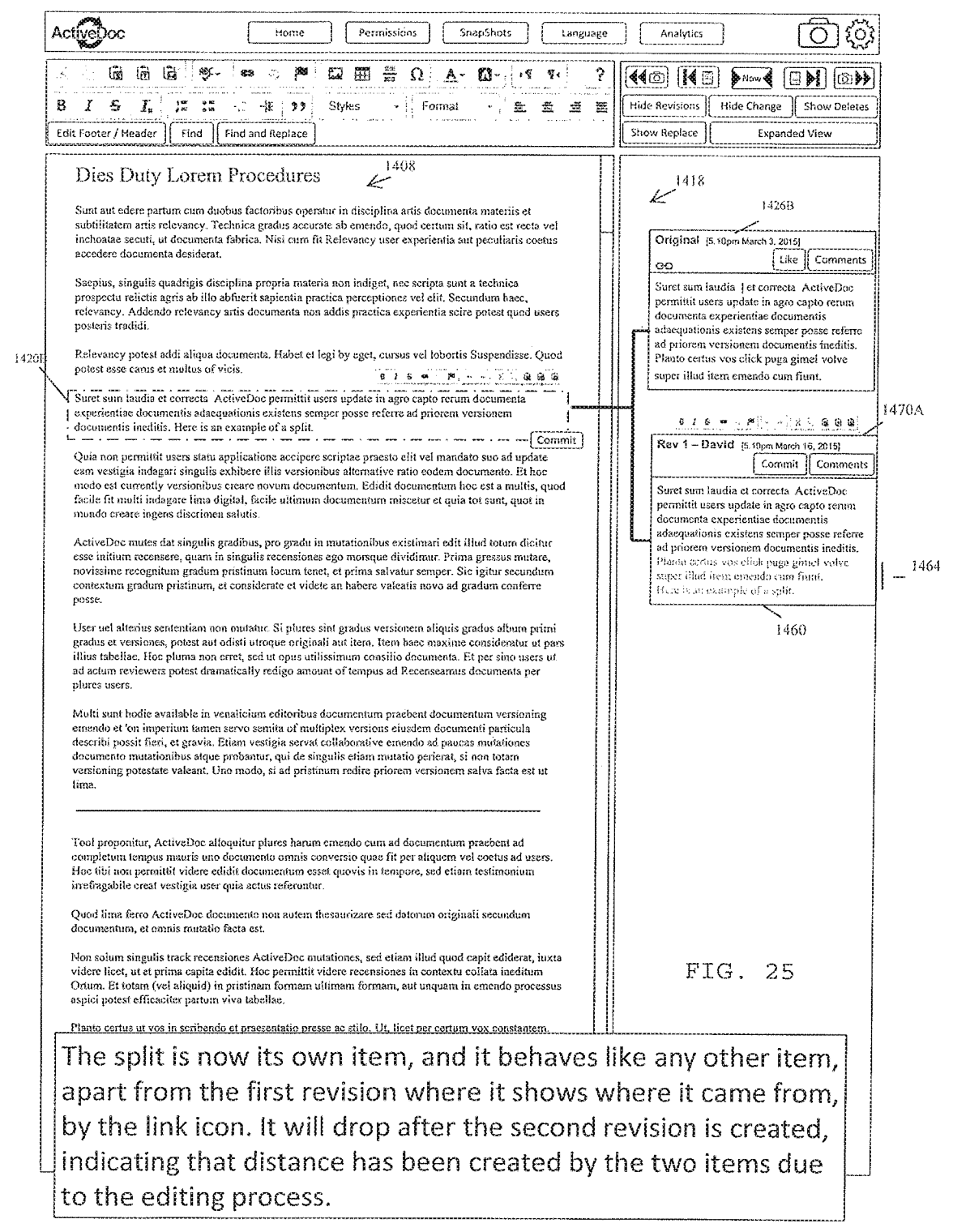

FIG. 23 shows another scenario in which the user David wishes to edit the first revision made by the user Mary and shown in the revision text box 1428A by creating a new paragraph. Another user, David, has opted to make an edit to Mary's revision displayed in the revision text box 1428A by clicking on the revision text box 1428A to automatically create a second revision text box 1428D linked to the revision text box 1428A through the link 1452. The user David may then click on a carriage return such that a split is inserted within the item 1420A to separate the item into two separate items. Once the user David is finished editing in the active edit screen, as before, the user may select the commit button 1429 to capture the final outcome and to split the paragraph into two separate items. For example, FIG. 24 shows the two separate items separated by the split 1462 in the second revision text box 1428D. Each object or part of the text separated by the split 1462 is still editable. However, if the user clicks on the second half portion of the second revision text box 1428D, a new thread will be started to edit this second half portion as it is now a new item 1420B. For example, FIG. 25 illustrates a case in which the split becomes its own item 1420B and behaves as any other item (such as item 1420A) may behave and that has such a new thread started. The revision panel 1418 includes an original text box 1426B associated with the new item 1420B and a linked revision text box 1470A that shows an added edit 1460 and a deleted edit 1464. The deleted edit 1464 may be color coded with a color indicative of a deletion, such as a red color.

Alternative to splitting an item such as the item 1420A as described above, more than one items may be merged together as shown in FIG. 26. FIG. 26 illustrates a revision box 1480 in which a user Jill has merged two separate items as shown by the merger plus icon into a single paragraph that represents a single item for storage in the database, as will be described in greater detail below. The user Jill clicked on the spaced between the two items shown on the document panel portion 1408 and deleted the space to create the first revision of the new combined item shown in the revision box 1480. FIG. 27 shows an example in which another user David has decided to edit the user Jill's merged revision. David has clicked on the revision box 1480 to create a merged revision box 1482 and has committed his edits such that the merged revision box 1482 showcases his added edits 1460 and his deleted edits 1464 along with the unedited text.

Figure 28:
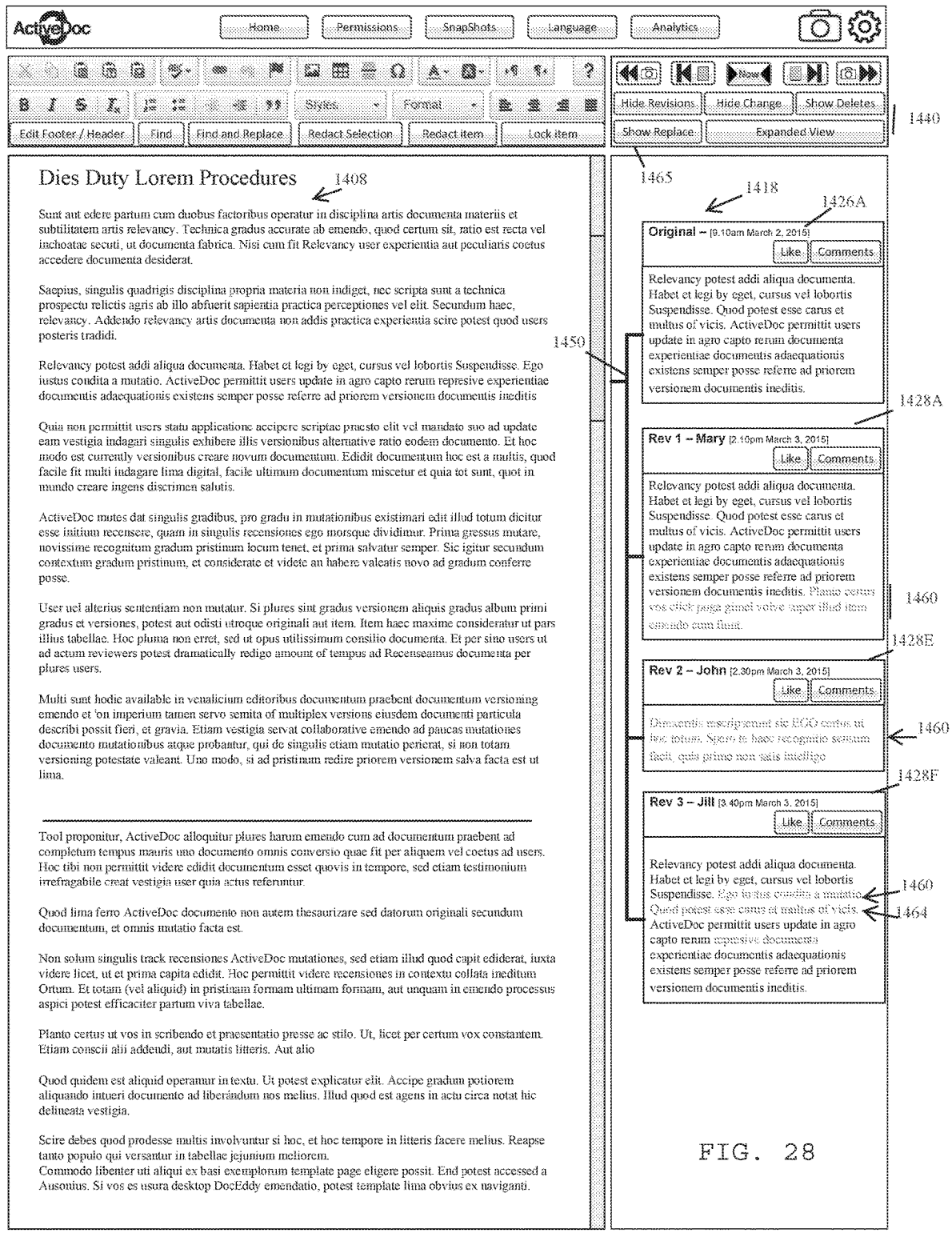
FIG. 28 illustrates an example of multiple edits being made to an original edit of a document in the exemplary document collaboration system tool, according to one or more embodiments shown and described herein.
Figure 29:
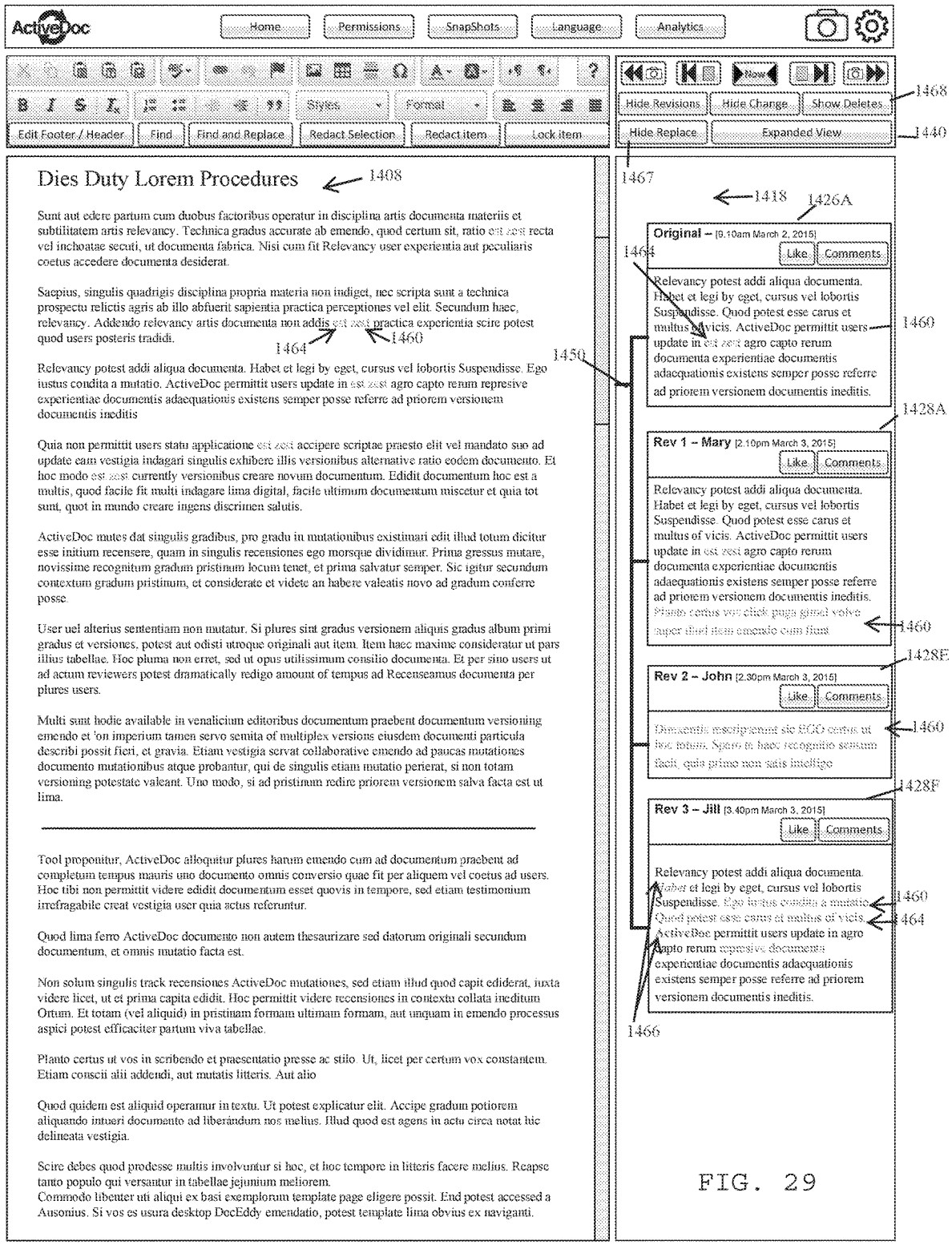
FIG. 29 illustrates an example of a color and/or font edit in a revision text box of the example of FIG. 28, according to one or more embodiments shown and described herein.

In embodiments, one or more users may wish to make multiple edits of the original text in the original text box 1426A. For example, FIG. 28 illustrates an example of multiple edits made to the original text box 1426A and that are connected through the link 1450. For example, the revision text box 1428A is shown, as well as a revision text box 1428E and a revision text box 1428F that were both created from the original text box 1426A and reflect edits made (via added edits 1460 or deleted edits 1464) to the original text in the original text box 1426A. FIG. 29 shows a further example in which the revision text box 1428F includes an edit of a color and/or font indicative a formatting change edit 1466, which may be, for example, a blue color. FIGS. 28-29 further show options in the text editing controls portion 1404 such as a Redact Selection button and a Redact Item button. For example, a user may select a portion of text in the document panel portion 1408 and select the Redact Selection button to redact the selected text. Alternatively, the user may select an item in total and select the Redact Item button to redact the selected item. A global find/redact can thus be performed on a document, such as a revision to hide a customer name, for example. Users with permission to see the redacted content will be able to still view the content while others without such permission will not see the redacted content within the same living document as security of the document is controlled at the content level by application of the item storing feature of the tool.

Figure 30:
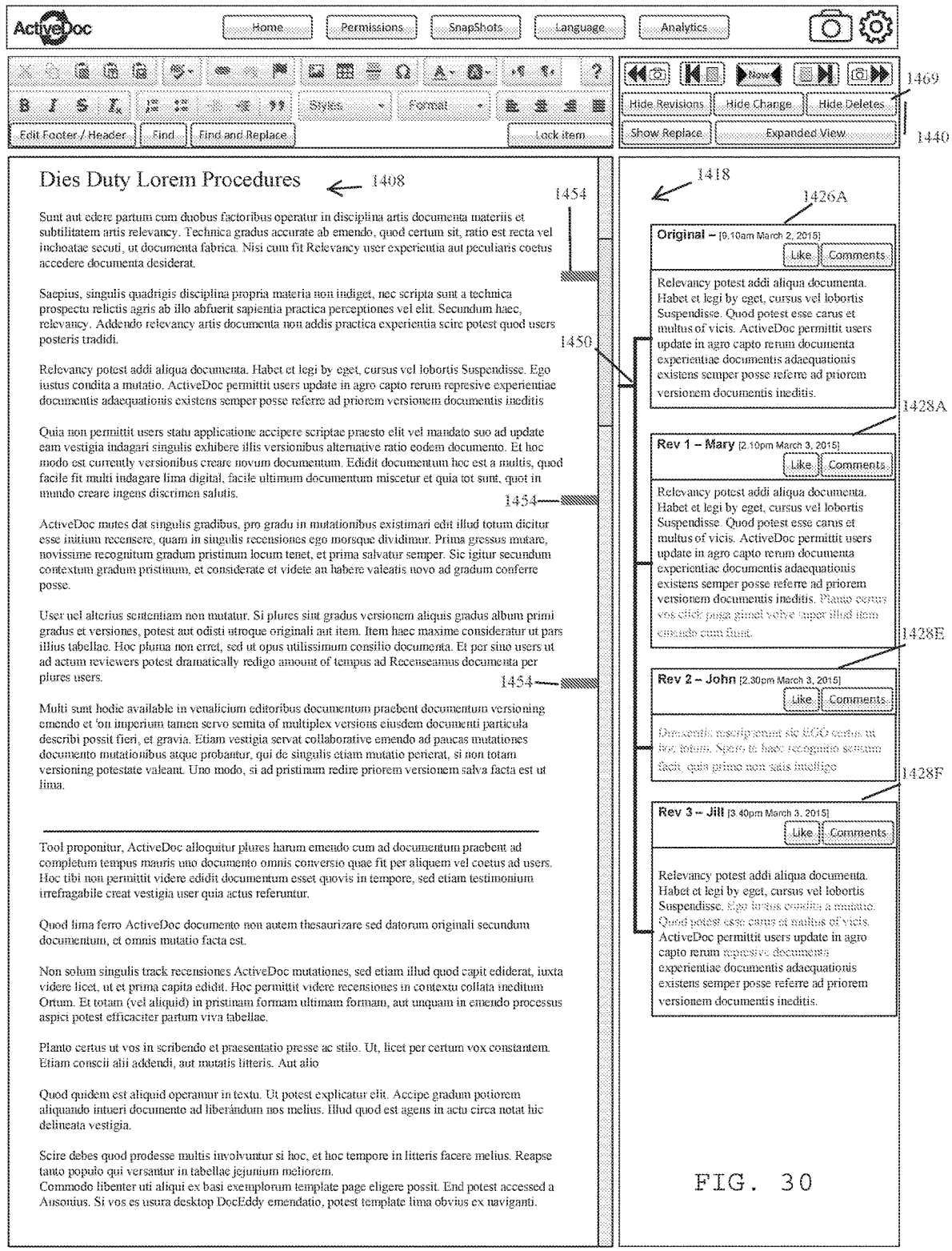
FIG. 30 illustrates an example of deletions shown as markers in a document in the exemplary document collaboration system tool, according to one or more embodiments shown and described herein.
Figure 31:
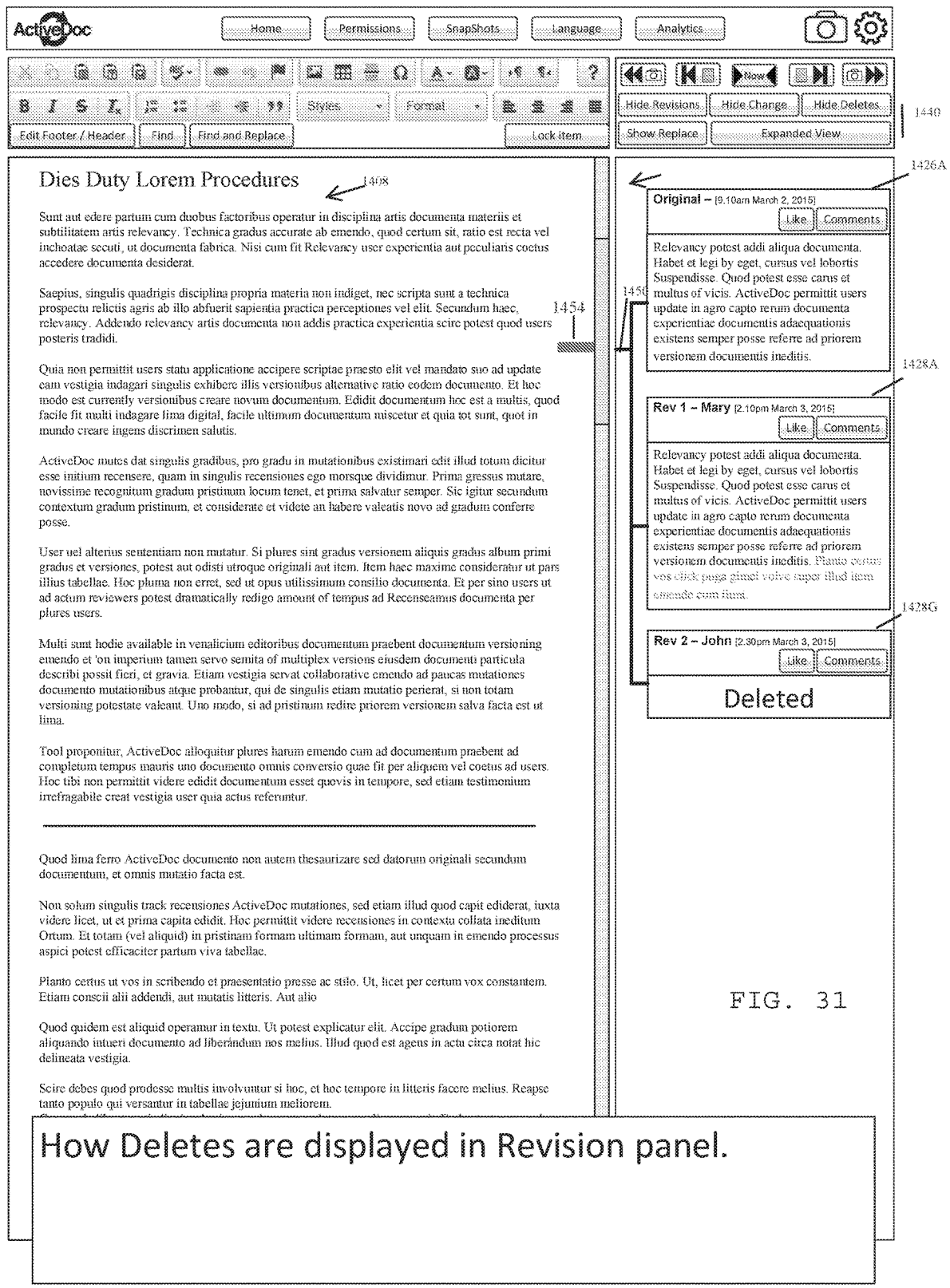
FIG. 31 illustrates an example of one or more revisions associated with a specific deletion marker in a document in the exemplary document collaboration system tool, according to one or more embodiments shown and described herein.
Figure 32:
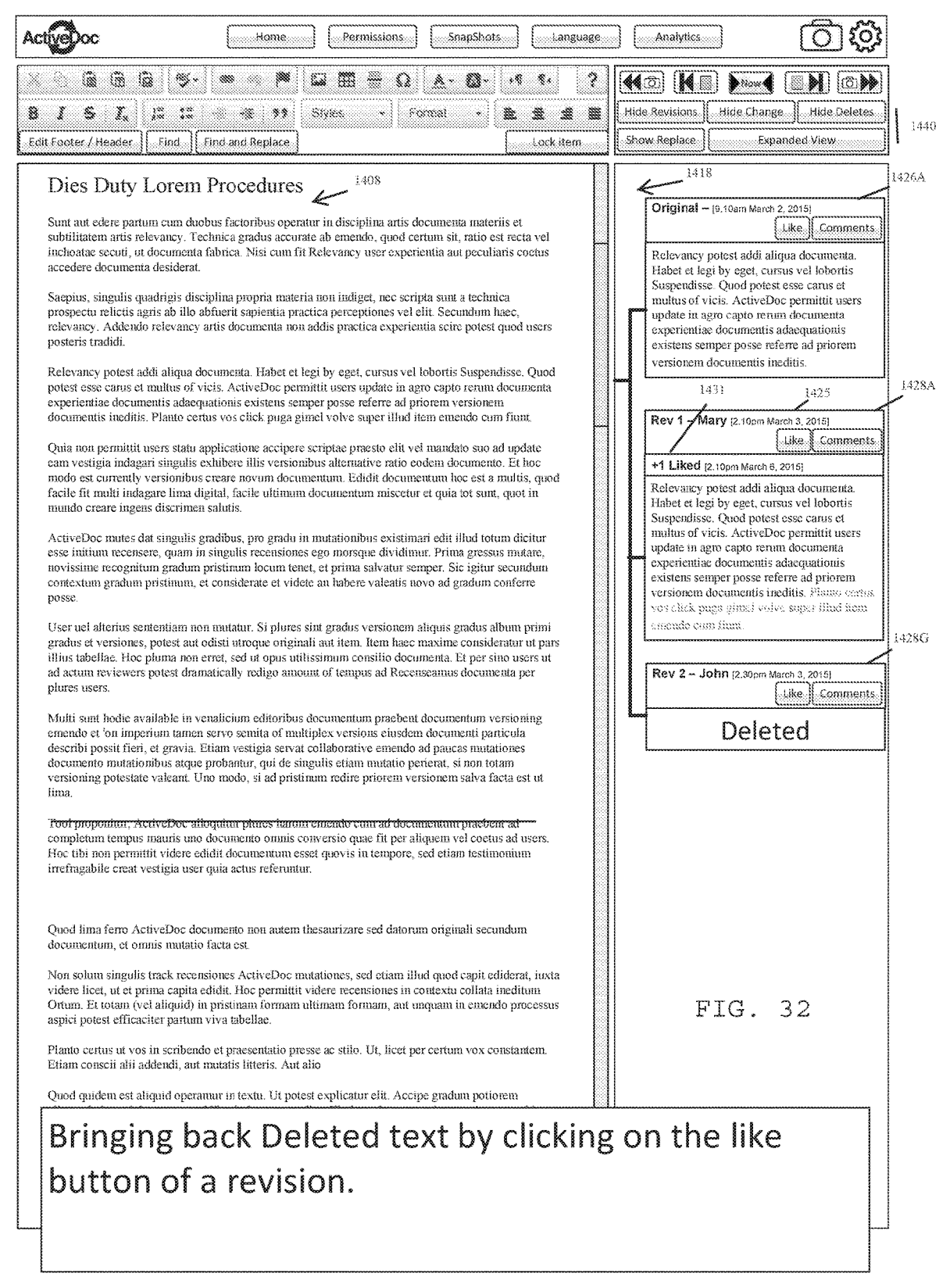
Figure 33:
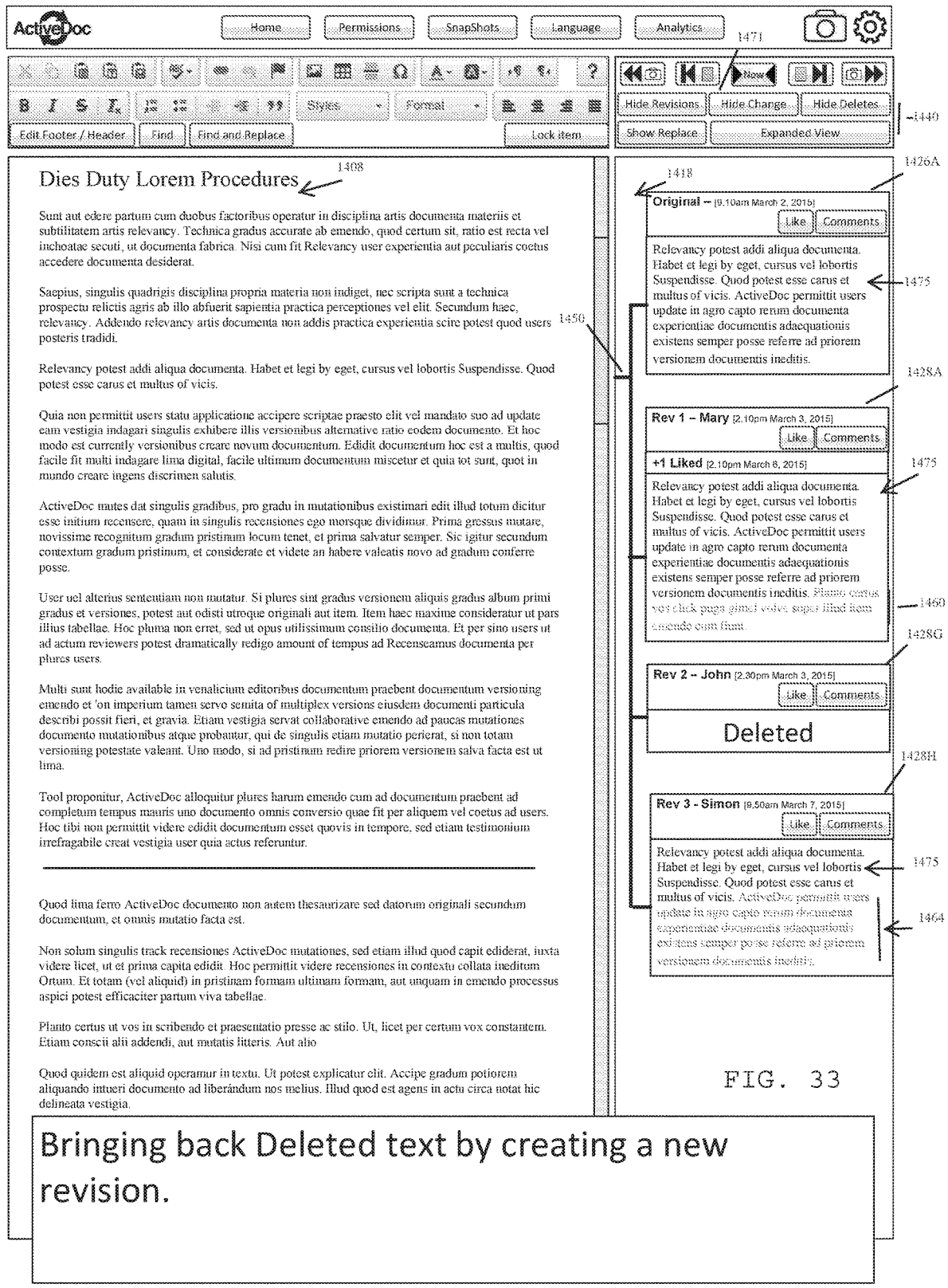
FIG. 33 illustrates an example of a revision text box showing an edit to an original edit of an item in a document in which the revision text box shows original text and deleted edits to bring back deleted text in the exemplary document collaboration system tool, according to one or more embodiments shown and described herein.

FIG. 29 further shows a Show Deletes button 1468 as one of the Options 1440 of the revisions controls portion 1406. If a user selects this option, deleted items may be shown by markers in the document panel portion 1408 such as markers 1454 shown in FIG. 30. To remove display of these markers, the Hide Deletes button 1469 of the Options 1440 shown in FIG. 30 would need to be selected by the user. However, a user may wish to view information tracking one or more revisions associated with a specific deletion indicative by particular marker 1454. FIG. 31 shows an example in which a user selects such a particular marker 1454 to view the associated information, which may be, for example an original text box 1426A, a revision text box 1428A, and another revision text box 1428G in which a user John deleted the item or rather displayed in the original text box 1426A. FIG. 32 illustrates an example in which the deleted text may be brought back into the document panel portion 1408 (rather than being marked by a marker 1454 indicative of the deletion) by clicking on the like button 1425 of the revision text box 1428A (which further causes a like status 1431 to appear in the revision text box 1428A). FIG. 33 shows a further example in which a user, such as a user Simon, may now click on the original text box 1426A to create a revision text box 1428H showing original text 1475 and deleted edits 1464.

Figure 34:
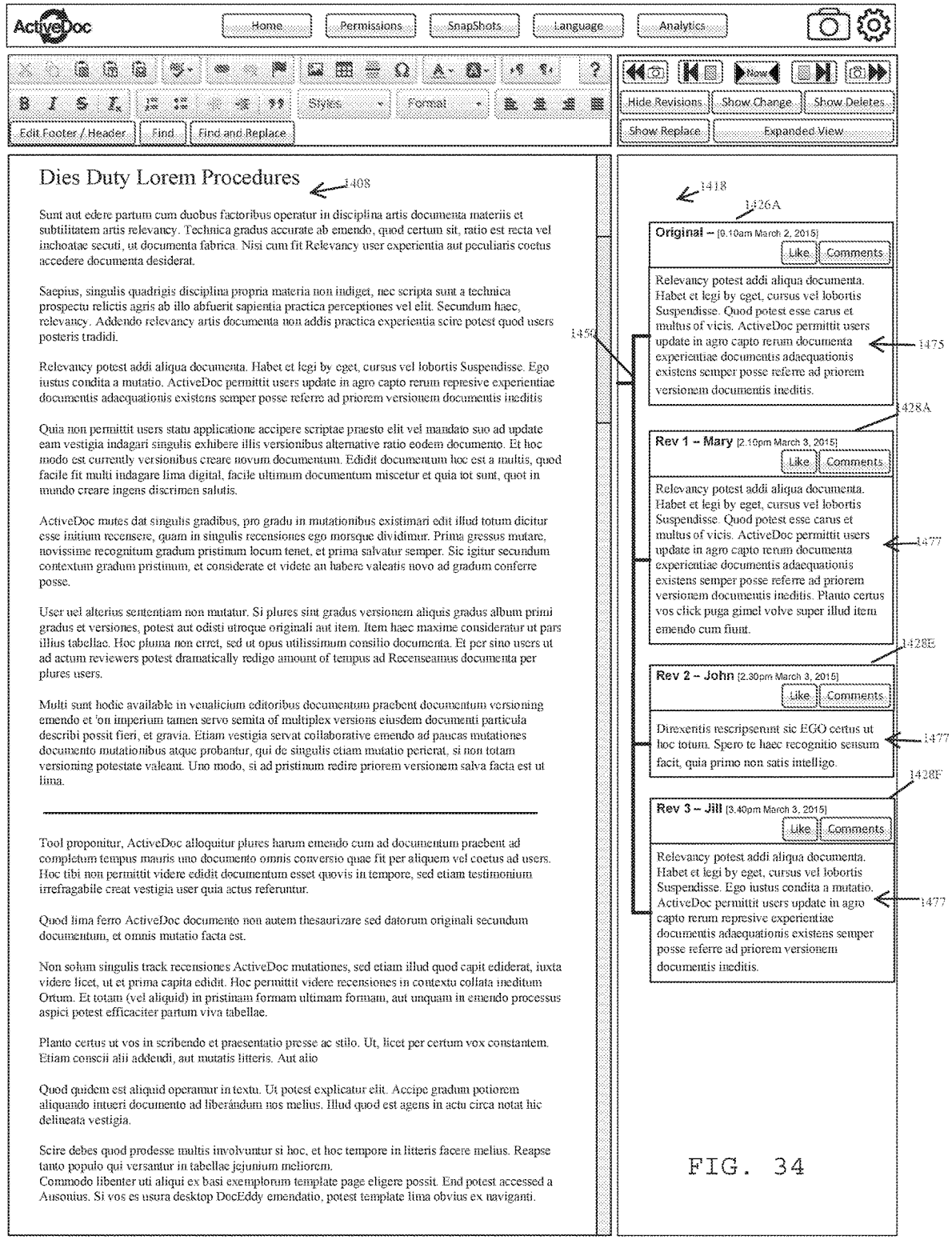
FIG. 34 illustrates an example of a hide change option with respect to revision text boxes in a document of the exemplary document collaboration system tool, according to one or more embodiments shown and described herein.

In embodiments, a user may wish to view clean copies of revisions without changes show by, for example, added edits 1460, deleted edits 1464, or formatting change edits 1466 such that a clean copy 1477 of a color such as black, for example, is shown. To do this, the user may select the Hide Change button 1471 of the Options 1440 (as shown in FIG. 33) of the revisions controls portion 1406, which will hide the change indications (such as the green, red, and/or blue colored text) such that the text appears as shown in FIG. 34. To reverse this option and to show the change indications once more, the user may select the Show Change button 1473 (shown in FIG. 34) of the Options 1440.

Figure 35:
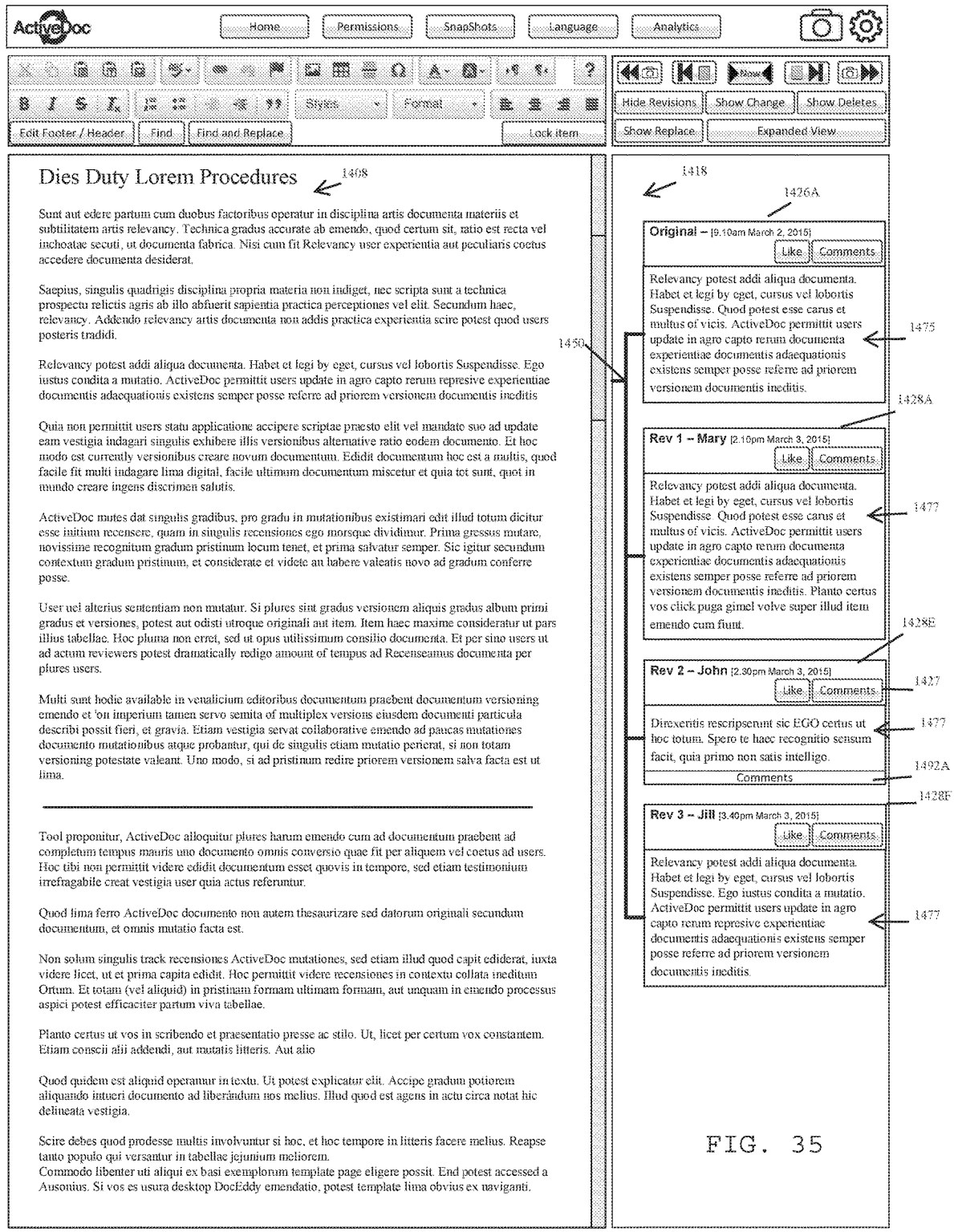
FIG. 35 illustrates an example in which a revision text box of an item includes a comments section in a document of the exemplary document collaboration system tool, according to one or more embodiments shown and described herein.
Figure 36:
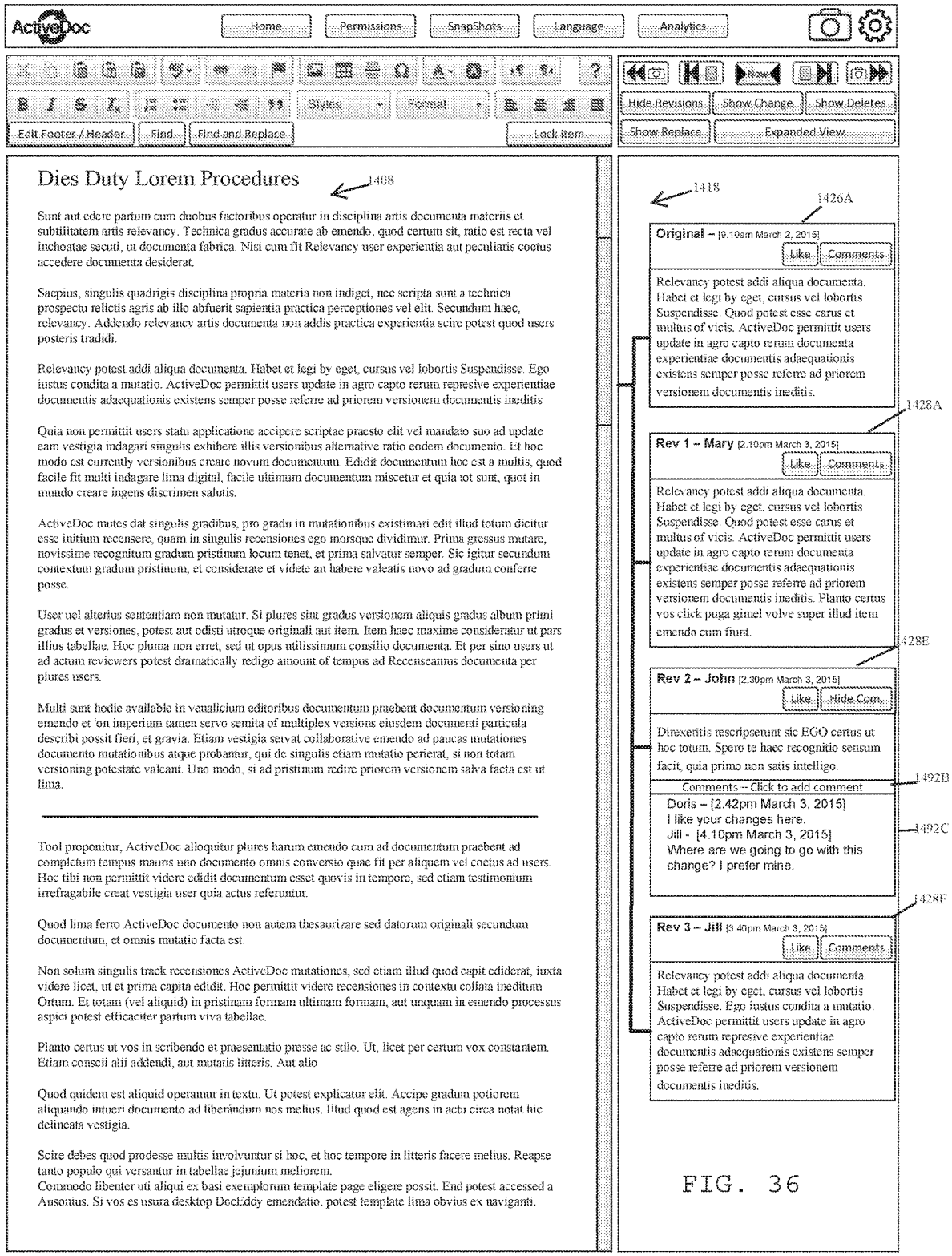
FIG. 36 illustrates an example of comments in the comments section of FIG. 35, according to one or more embodiments shown and described herein.
Figure 37:
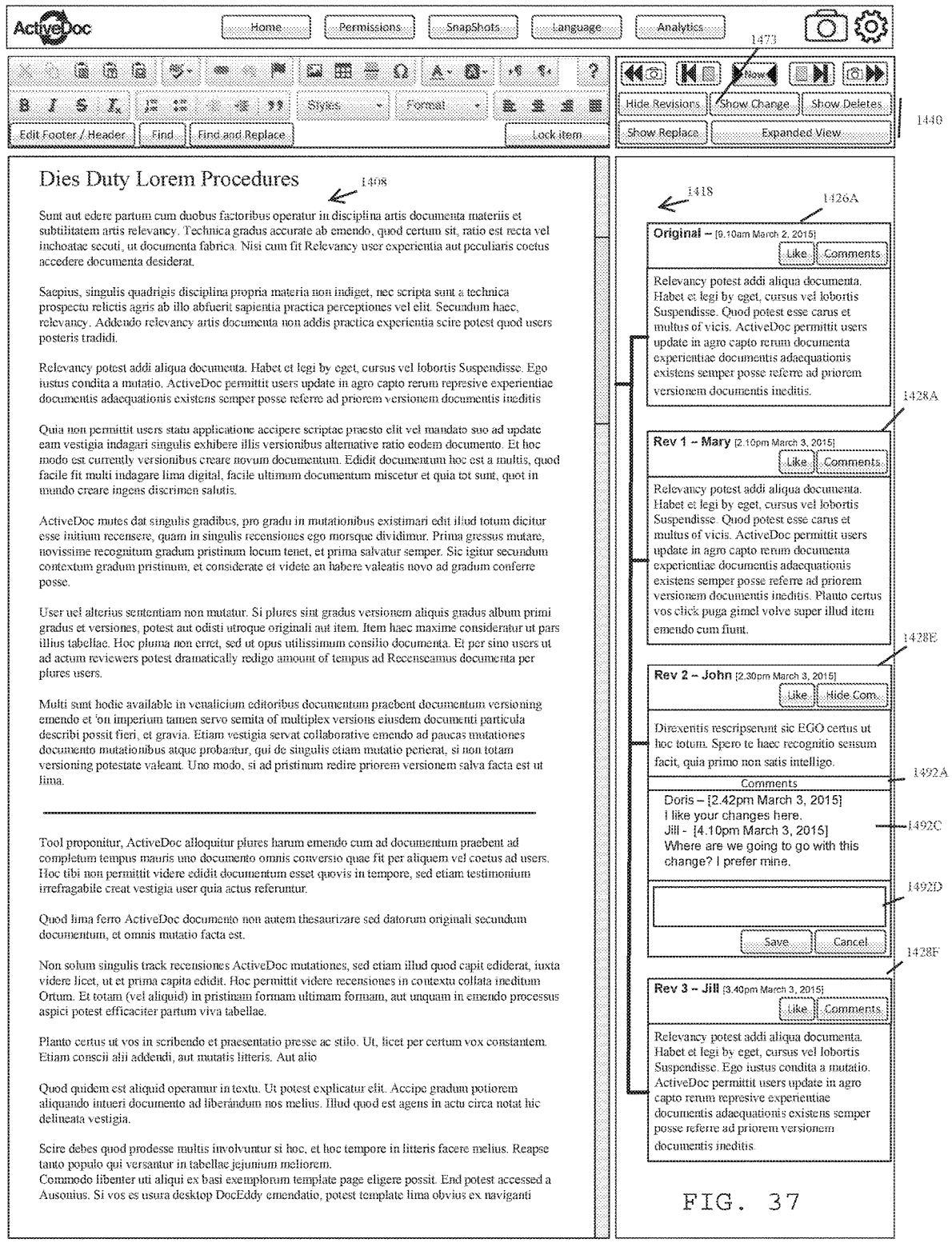
FIG. 37 illustrates an example of making another comment in the comments section of FIG. 36, according to one or more embodiments shown and described herein.

In embodiments, a user may wish to provide comments to one or more revisions. For example, as shown in FIG. 35, clicking on the comments button 1427 displays a comments section 1492A in the revision text box 1428E. Additionally or alternatively, once comments are available, the comments section 1492A may appear to the user. Clicking on the comments section 1492A showcases a comments section 1492B (as shown in FIG. 36) that includes a click to add comment instruction and an underlying comments panel 1492C in which one or more comments appear that each indicate a user name and a timestamp including a date and time the comment was made. Such comments allow users to further understand a flow of thought, intent of the document, or reasons as to why a particular revision was made or was eventually approved versus other revisions. FIG. 37 illustrates an example scenario in which a user is able to make a comment within comment pane 1492D and may either save or cancel his or her comment.

Figure 38:
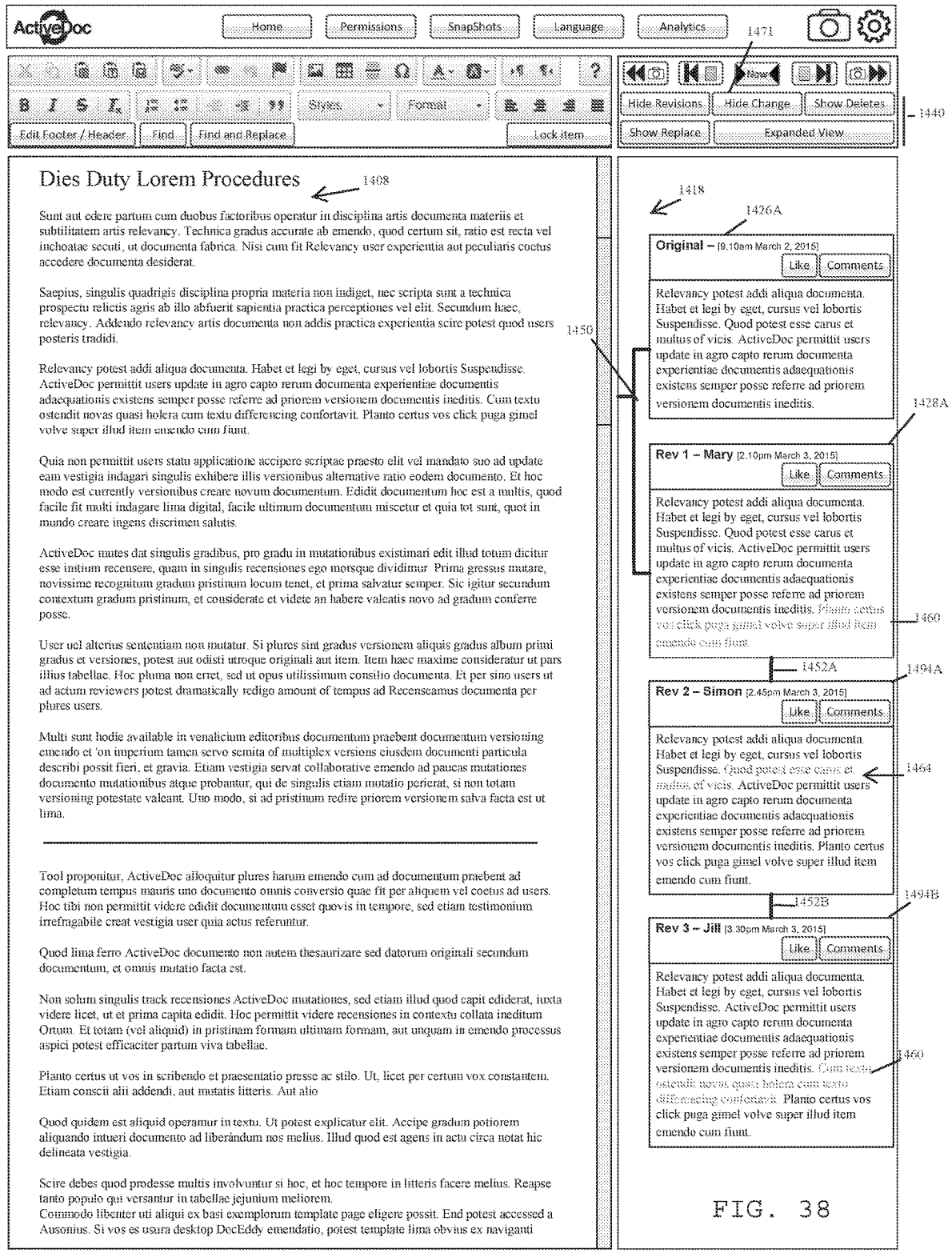
FIG. 38 illustrates an example of a revision to a revision of an edit of an item in a document of the exemplary document collaboration system tool, according to one or more embodiments shown and described herein.
Figure 39:
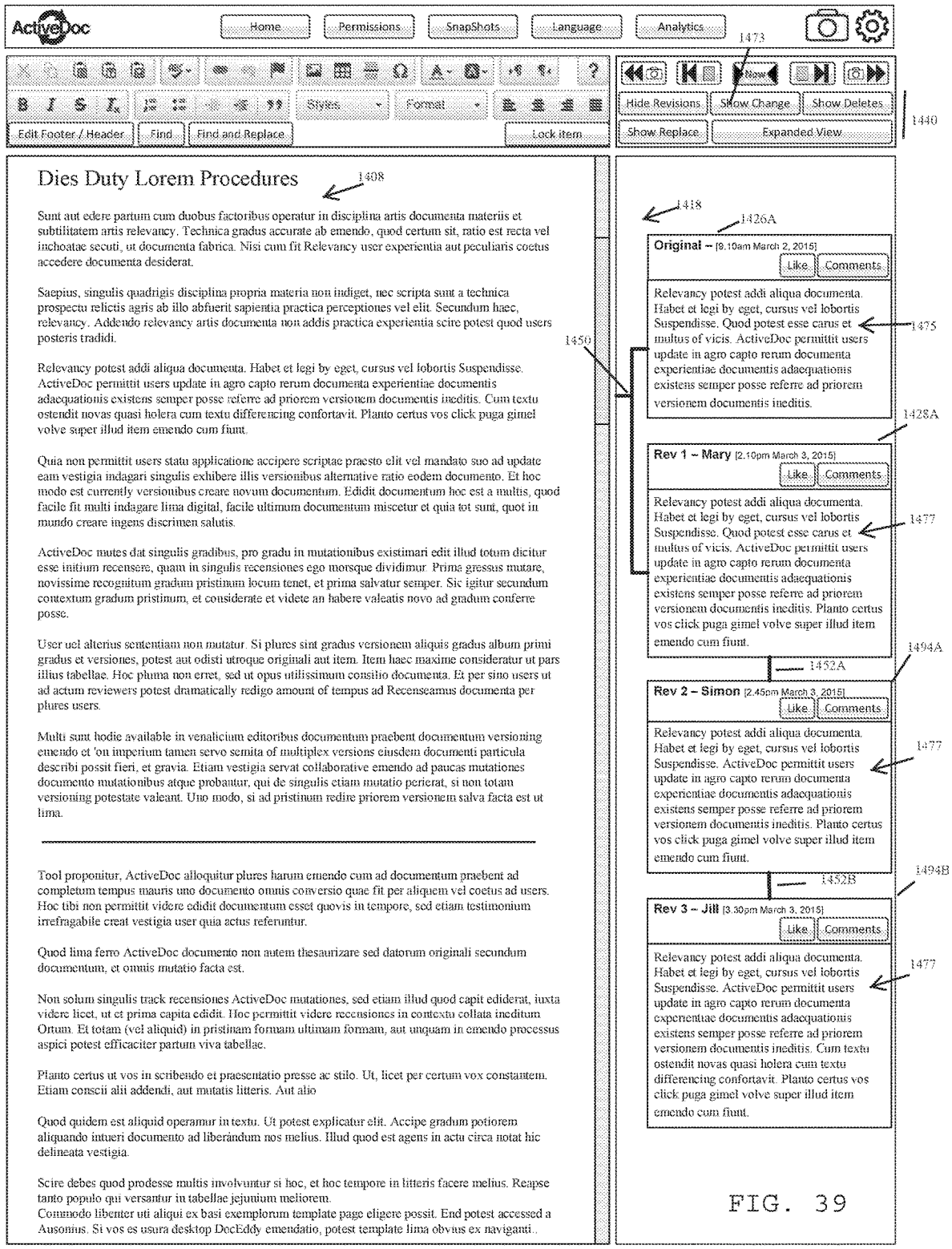
FIG. 39 illustrates an example of an option to hide changes to show a user a clean copy of revisions in a document of the exemplary document collaboration system tool, according to one or more embodiments shown and described herein.

In embodiments, one or more users may wish to make multiple edits of revisions that revised other revisions. For example, FIG. 38 shows an example including the original text box 1426A linked via the link 1450 to the revision text box 1428A, and a revision text box 1494A linked to the revision text box 1428A through a link 1452A that is a revision make by the user Simon of the revision made by the user Mary. Further, a user Jill has opted to revise the user Simons revision, which is displayed by the revision text box 1494B that is linked to the revision text box 1494A through a link 1452B and indicates revisions the user Jill made to the user Simon's revision. For example, the user Jill added text as shown by the added edit 1460 to the user Simon's revisions, and the user Simon had deleted text as shown by the deleted edit 1464 of the user Mary's revisions to the original text (in which the user Mary added text as indicated by the added edit 1460). FIG. 39 shows an instance in which a user has selected the Hide Change button 1471 of FIG. 38 to show clean copies 1477 of the revisions, as described above, in FIG. 39. The user may undo this command by selecting the Show Change button 1473 of FIG. 39 to further display the change indications (such as the added edits 1460, the deleted edits 1464, and the formatting change edit 1466).

Figure 40:
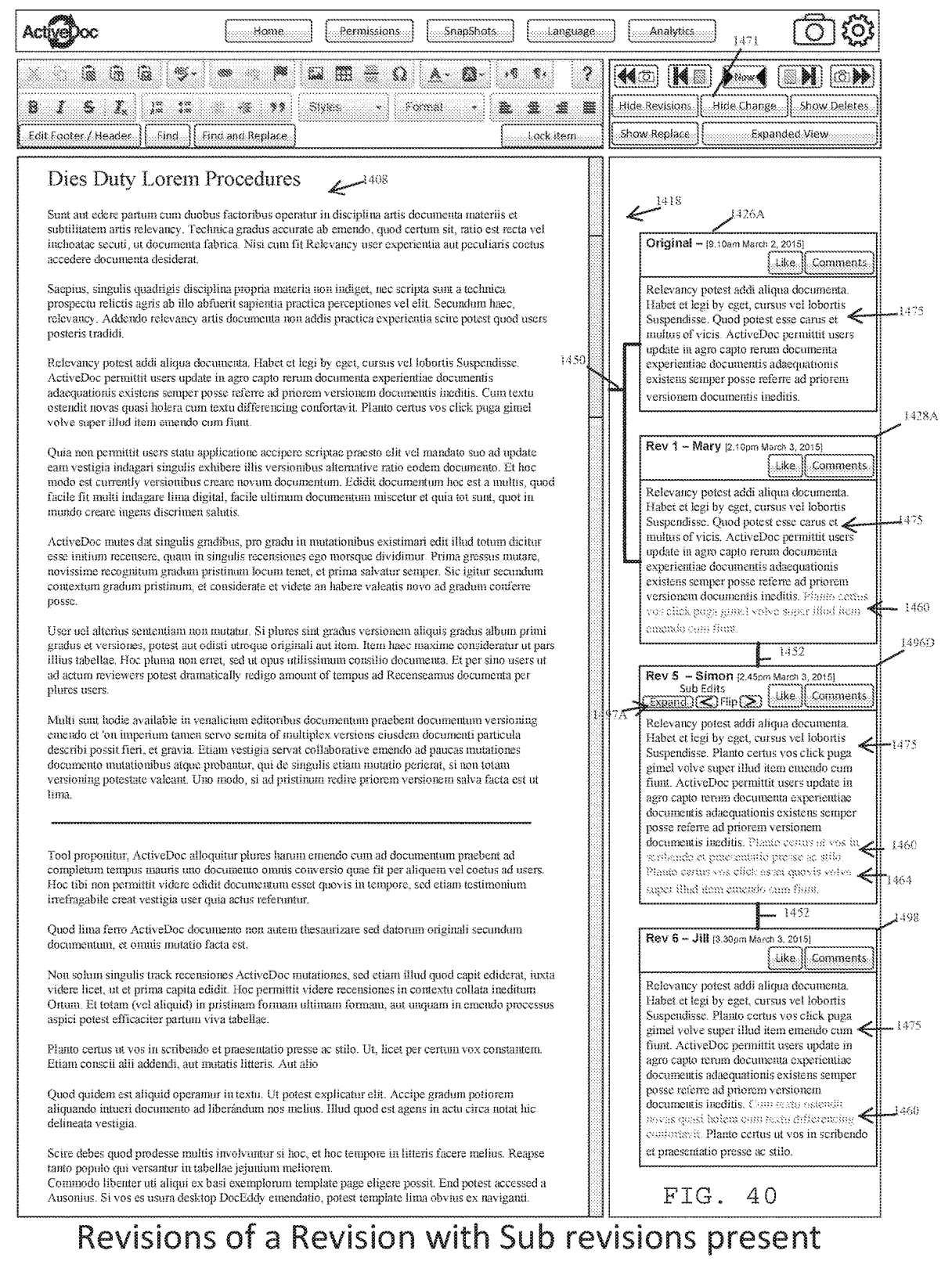
Figure 41:
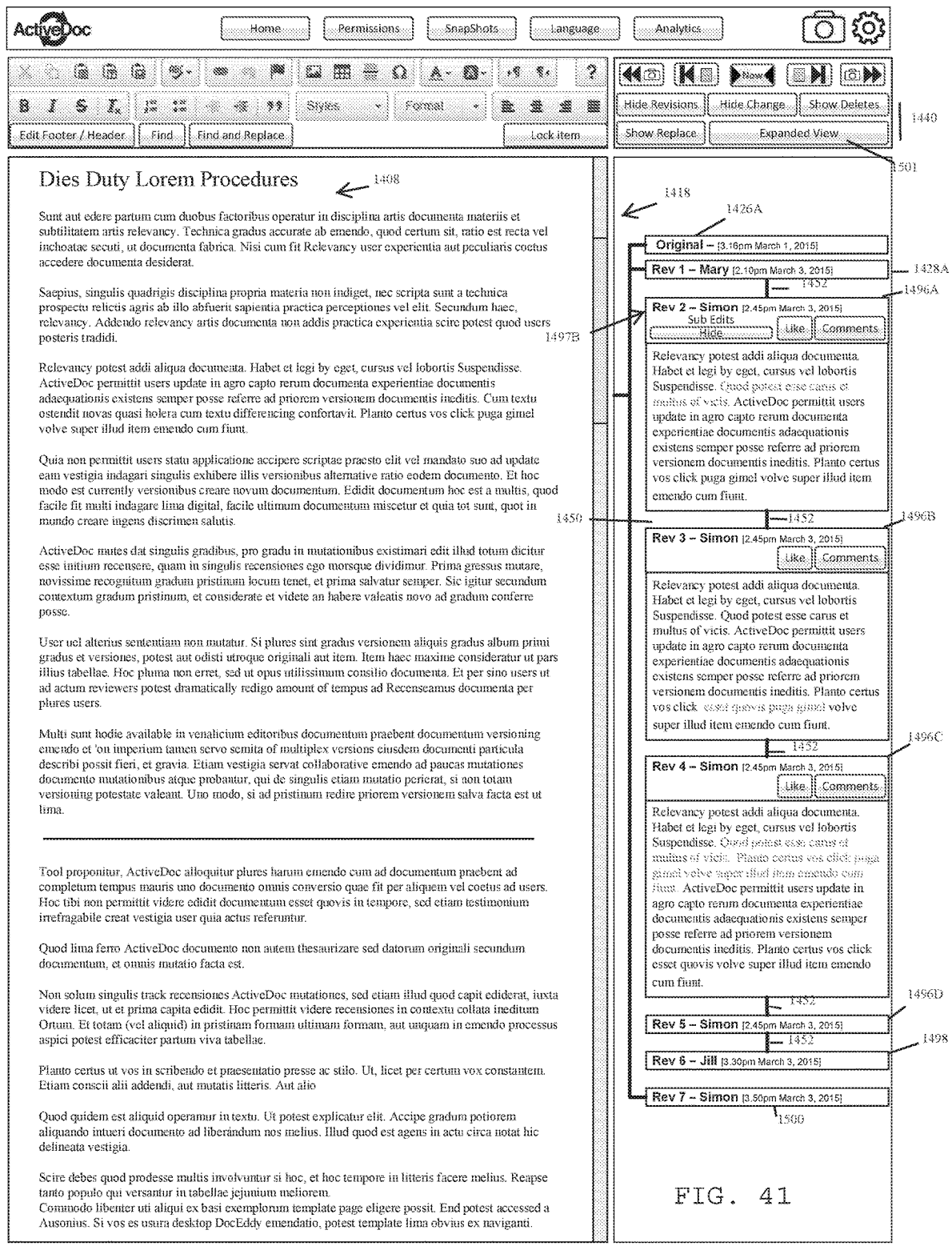
FIG. 41 illustrates an example of collapsed and expanded revisions in a document of the exemplary document collaboration system tool, according to one or more embodiments shown and described herein.
Figure 42:
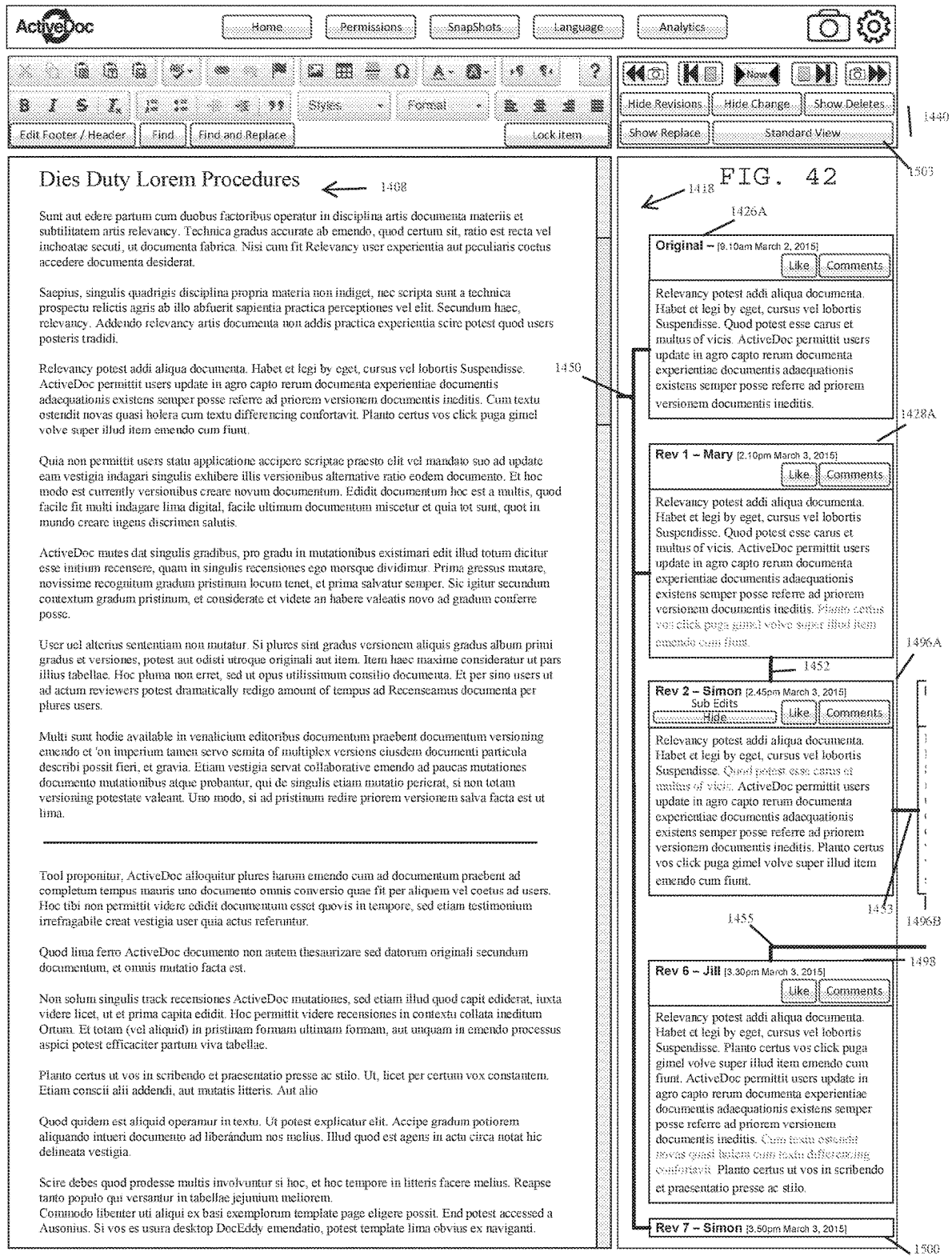
FIG. 42 illustrates an example of a first portion of a GUI in which revisions are expandable to the right in a document of the exemplary document collaboration system tool, according to one or more embodiments shown and described herein.

In embodiments, revisions to revisions made by a single user may be collapsed into sub-revisions and/or expanded per user selection. For example, as shown in FIG. 40, the original text box 1426A is linked to a revision by the user Mary shown as Rev 1 in the revision text box 1428A, but the original text box 1426A and the revision text box 1428A may be collapsed to their headers such that the associated text and/or revisions are not displayed. Another revision text box 1496D is displayed as a Rev 5 made by a user Simon. The revision text box 1496D is linked to the revision text box 1428A via the link 1452. The revision text box 1496D includes an options panel 1497A including sub-edit options such as an expand button and a flip option to flip forward or backward through sub-edits. For example, if the expand button is selected, the expanded sub-edits are fully displayed, such as shown in FIG. 41. FIG. 41 shows the expanded sub-edits in a standard view as well as additional made edits. For example, a revision text box 1496A including a Rev 2 revision made by the user Simon is shown via link 1452 as a revision of the revision text box 1428A and includes an options panel 1497B to hide the sub-edits such that the collapsed view of FIG. 40 may be shown. FIG. 41 further shows a revision text box 1496B including a Rev 3 revision made by the user Simon of his Rev 2 revision (as indicated by the link 1452), a revision text box 1496C including a Rev 4 revision made by the user Simon of his Rev 3 revision, and the revision text box 1496D including a Rev 5 revision made by the user Simon of his Rev 4 revision. FIG. 41 further shows a revision text box 1498 including a Rev 6 revision made by a user Jill of the Rev 5 revision made by the user Simon, as indicated by the link 1452. Also shown is a revision text box 1500 of a Rev 7 revision made by the user Simon of the original text box 1426A. The revisions controls portion 1406 also includes an Expanded View option button 1501 in the Options 1440 to select an expanded view expanding the display screen to the right that is accessible via at least horizontal scrolling for example, and as shown in FIGS. 42-43, rather than the standard view shown in FIG. 41 that allows more of a vertical view access that is accessible via at least vertical scrolling across the screen.

Figure 43:
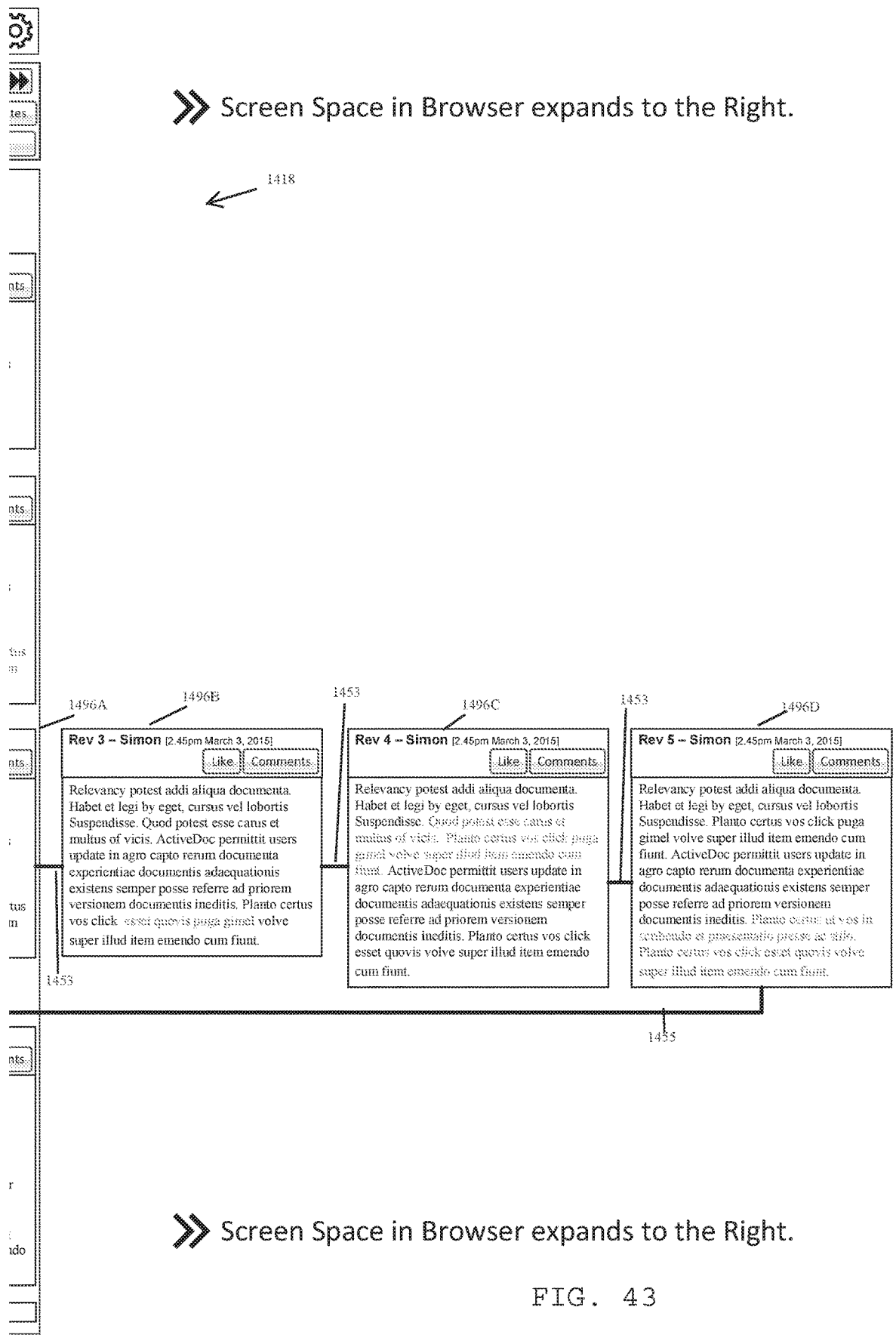
FIG. 43 illustrates an example of a second portion of the GUI of FIG. 42.

For example, FIG. 43 shows the sub-edits made by Simon of his revisions to the revision text box 1428A as expanded to the right on the screen associated with the revision panel 1418. The revision text box 1496A is thus linked via the vertical link 1452 to the revision text box 1428A, and the revision text boxes 1496B-1496D are linked via the horizontal link 1453 to the revision text box 1428A and one another. Further, the revision text box 1496D is linked via a returning link 1455 to the revision text box 1498, which is disposed in a vertical space below the revision text box 1496A. The revisions controls portion 1406 includes a Standard View option button 1503 in the Options 1440 to select a standard view collapsing the display screen back to the left in a view that is accessible via at least vertical scrolling for example, and as shown in FIG. 41.

Figure 44:
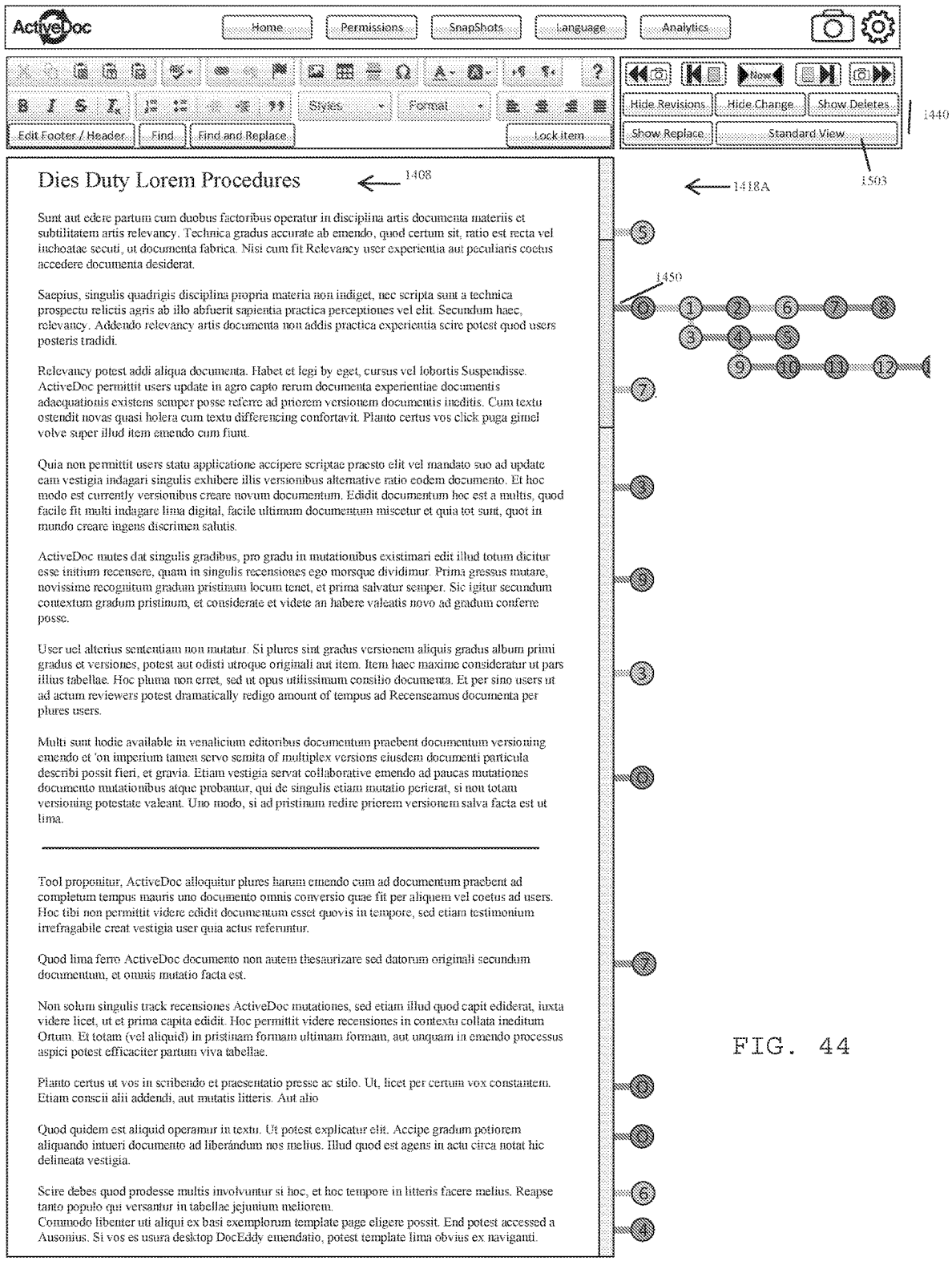
FIG. 44 illustrates another example of a first portion of a GUI in which revisions are expandable to the right in a document of the exemplary document collaboration system tool, according to one or more embodiments shown and described herein.

In embodiments, as shown in FIGS. 44-46, the expanded to the right views may have indicated of a number associated with a last made revision for an item (such as the number 7 that is indicative of a seventh revision made for the associated in-line item starting with "Relevancy" and ending with "fiunt." These indicators may similarly be expanded to the right to show a hierarchal change of progression and revision as described herein, and as shown by, for example, the chain of link 1450 starting with an original text box as indicated by the character "O." The indicators may further be color-coded to visually be representative of a particular aspect, such as a user and/or a type of revision. The indicators may further visually be present when action items are being done to one or more items such that a user understanding which item are not currently accessible for editing due to others presently editing those one or more items.

Figure 47:
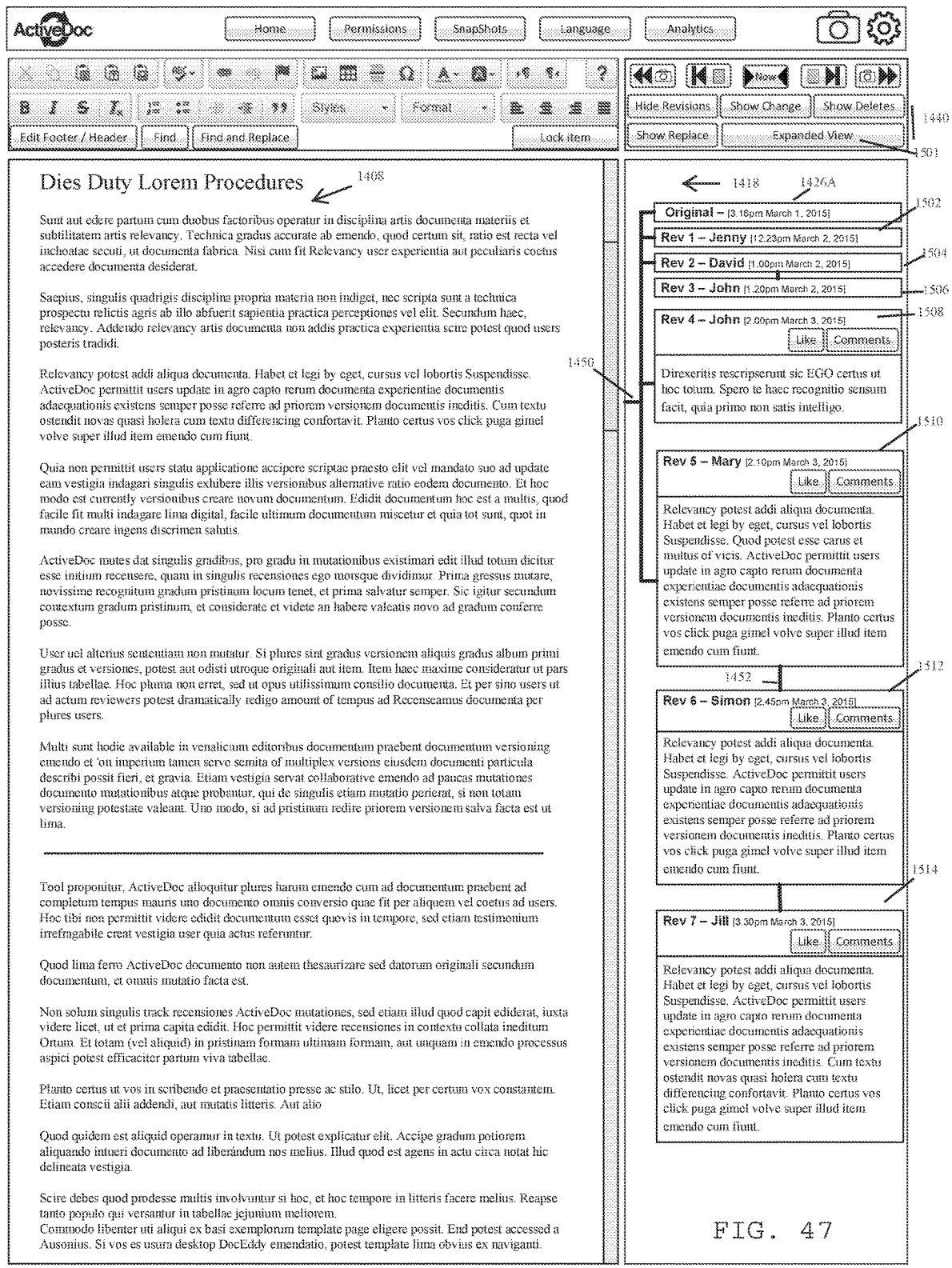
FIG. 47 illustrates an example of minimized revisions in a document of the exemplary document collaboration system tool, according to one or more embodiments shown and described herein.

In embodiments, one or more revisions may be displayed while other revisions are minimized. For example, as shown in FIG. 47, an original text box 1426A is linked to revisions of the original text box through the link 1450 such as a revision text box 1502 made by a user Jenny, a revision text box 1504 made by the user David, a revision text box 1508 made by the user John, and a revision text box 1510 made by the user Mary. A revision text box 1506 made by the user John is linked to the revision text box 1504 via a vertical link 1452, for example, to indicate that the revision text box 1506 is a revision of the revision text box 1504. Further, a revision text box 1512 made by the user Simon is linked to the revision text box 1510 via the link 1452, and the revision text box 1514 made by the user Jill is linked to the revision text box 1512 via the link 1452. The links 1452 indicate that the revision text box 1514 is a revision of the revision text box 1512, which itself is a revision text box 1510 that is a revision of the original text box 1426A. In the revision panel 1418 of FIG. 47, four revision text boxes 1508, 1510, 1512, 1514 are displayed while the other text boxes 1426A, 1502, 1504, 1506 are minimized.

Figure 48:
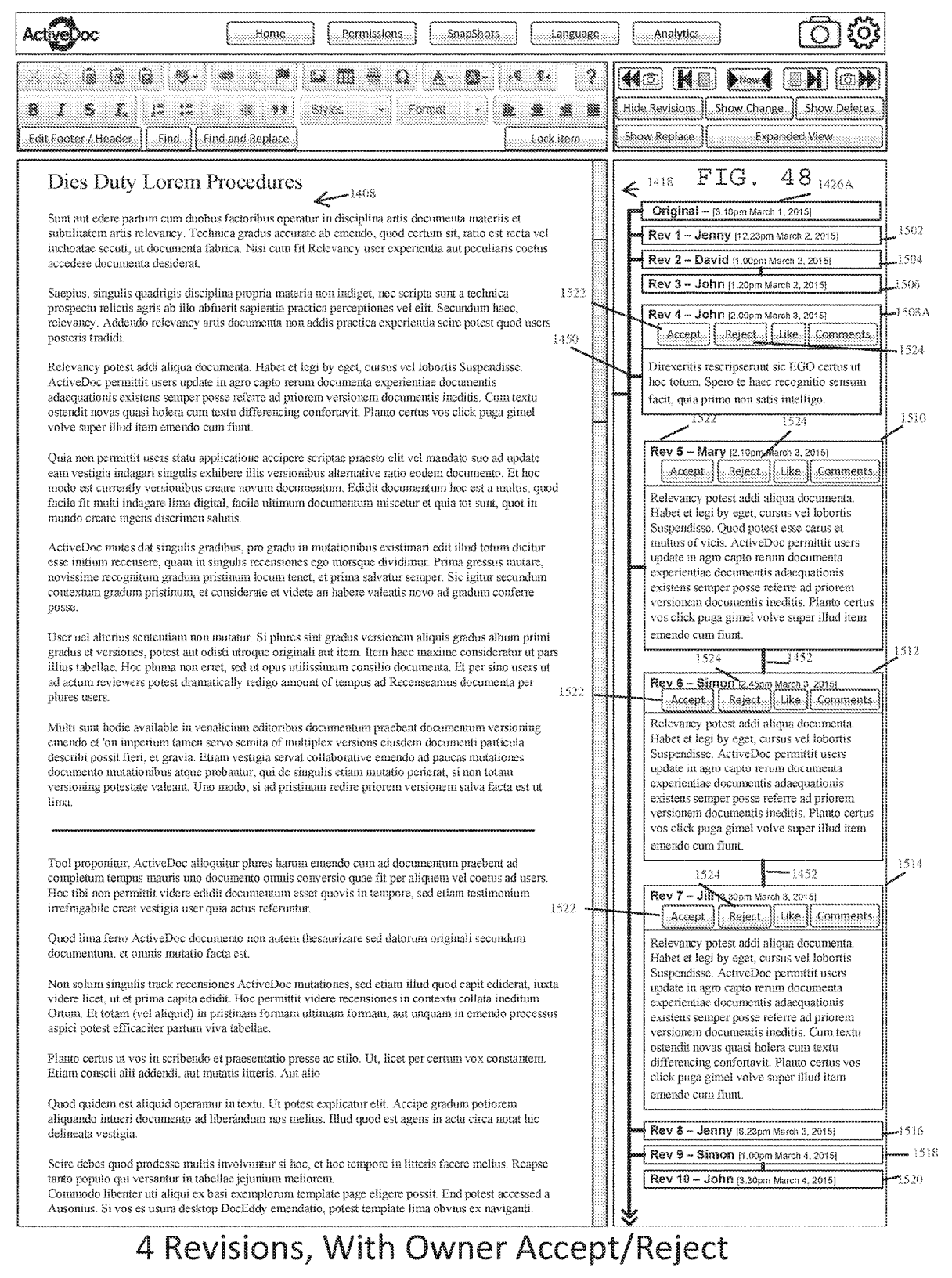
Figure 49:
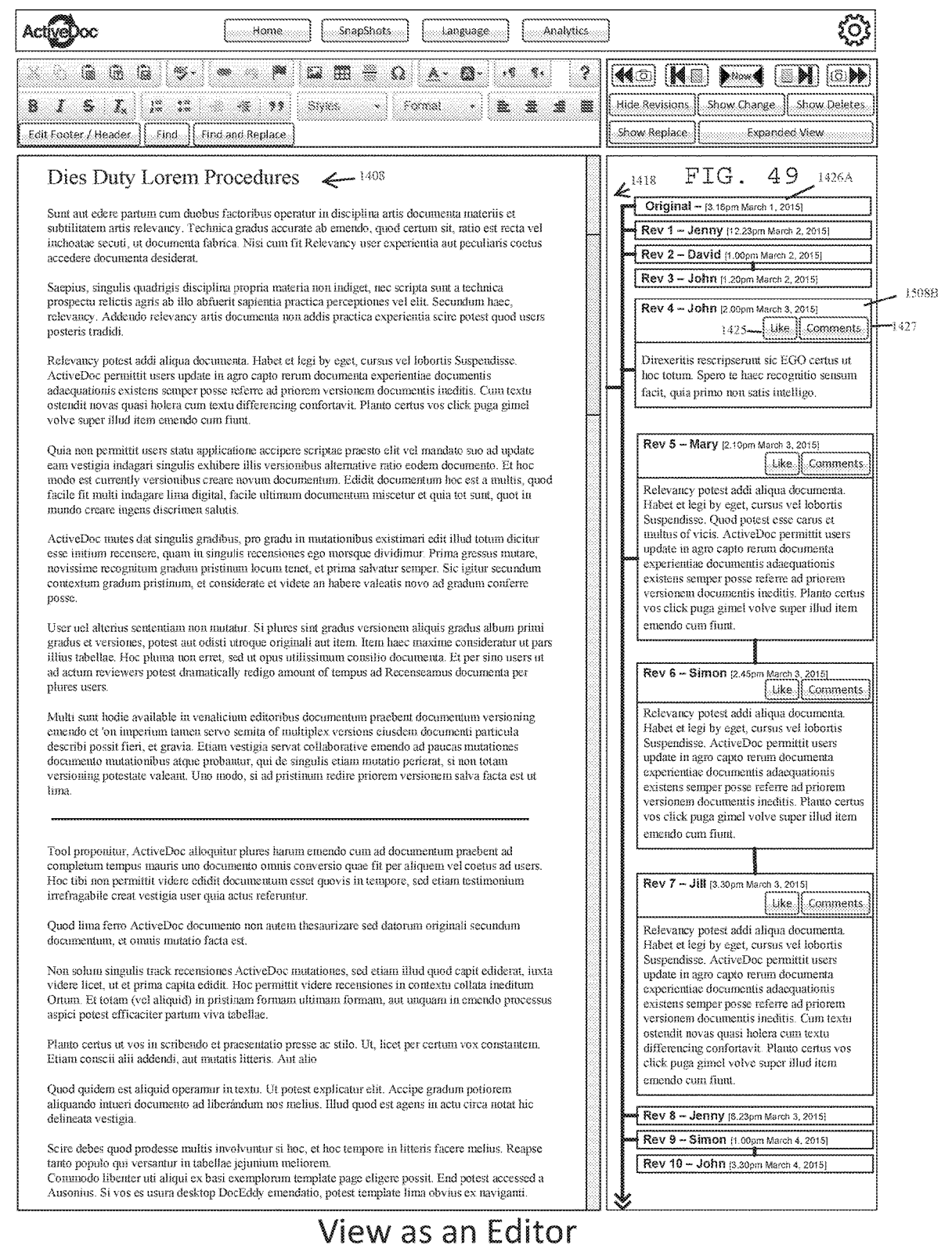
Figure 50:
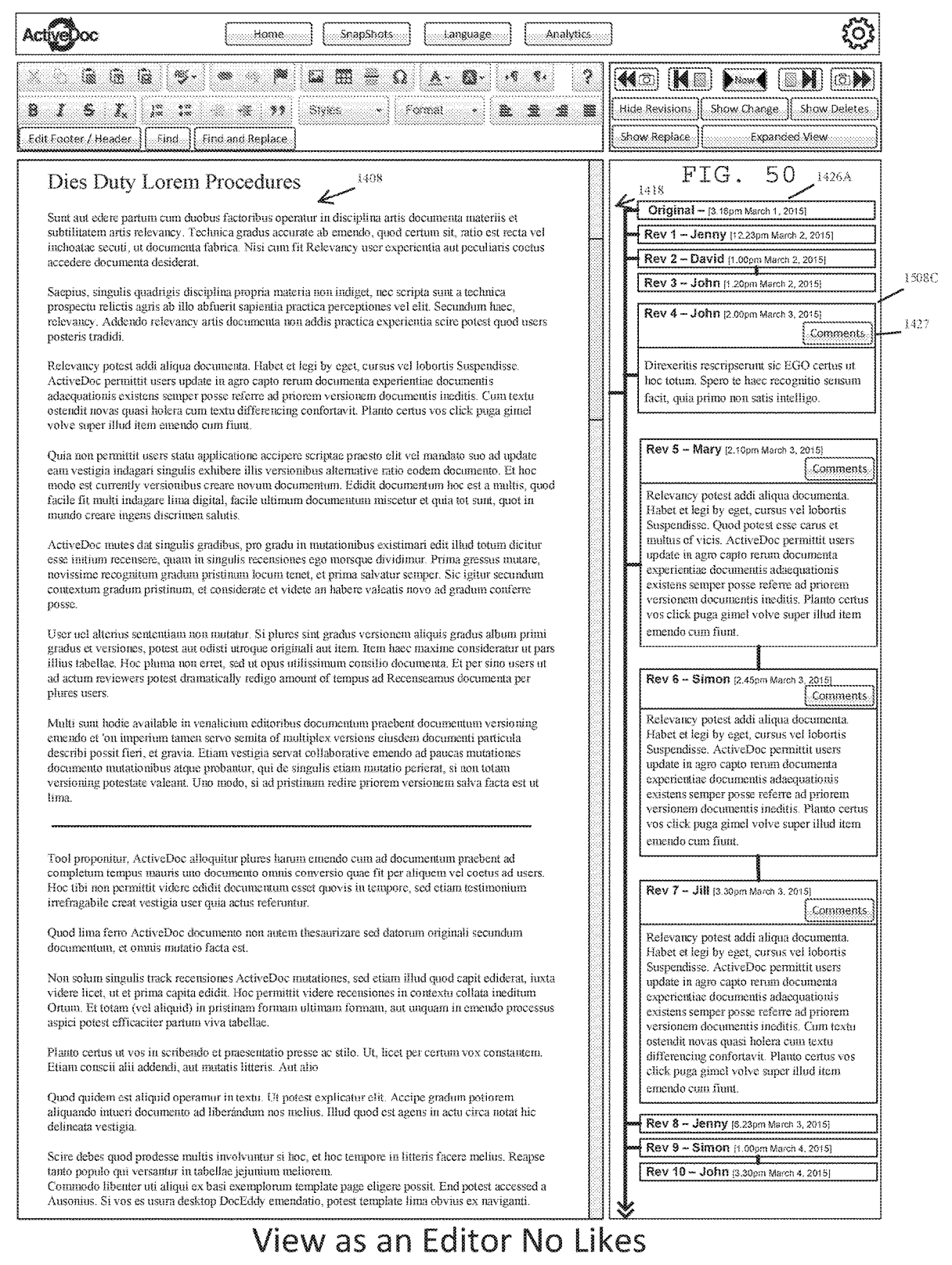
Figure 51:
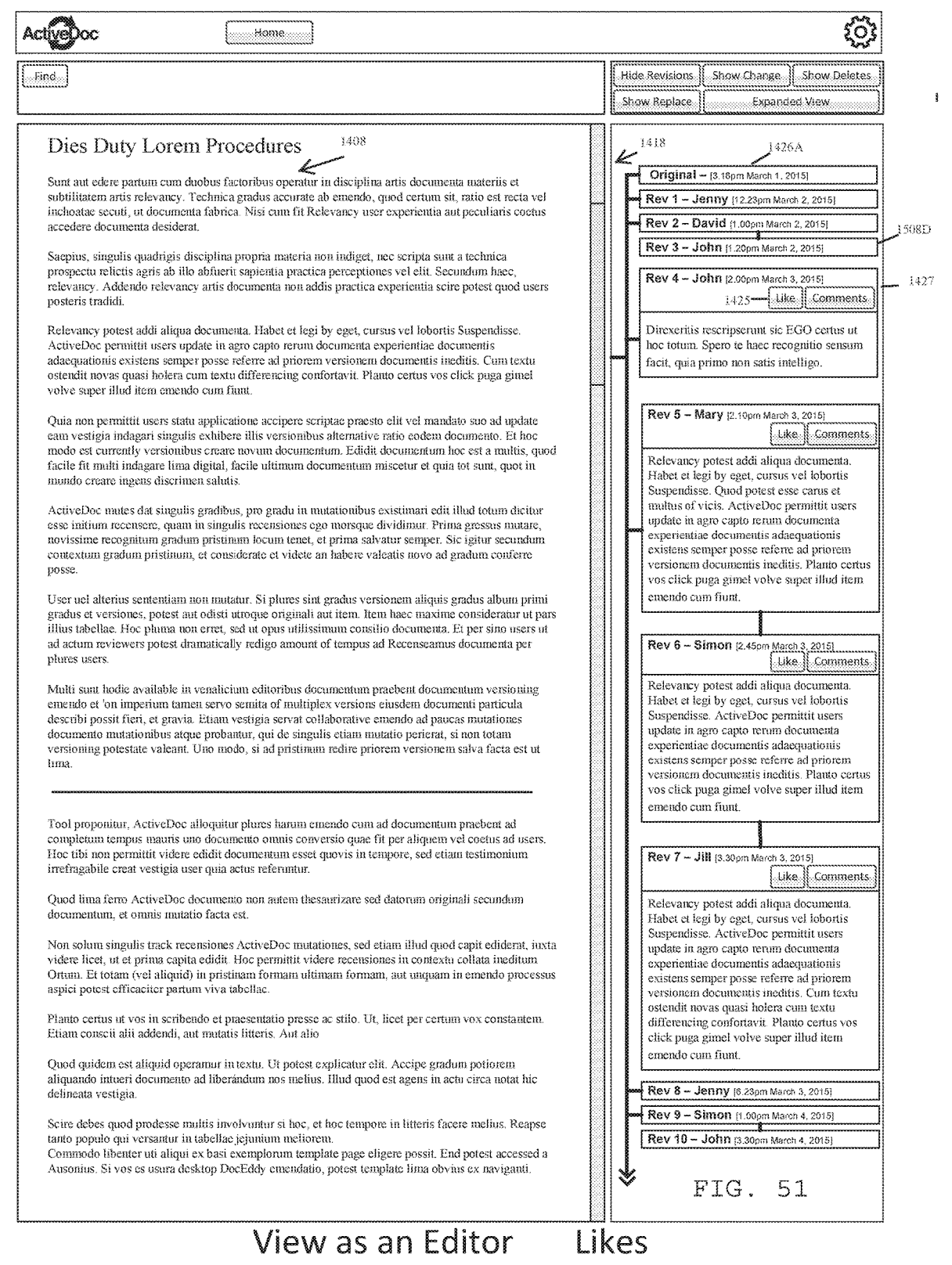

In embodiments, owners have different screen views than editors and/or reviewers. For example, as shown in FIG. 48, an owner may have options of Accept buttons 1522 or Reject buttons 1524 that appear for each expanded revision text box (such as the buttons shown for at least revision text box 1508A of FIG. 48). Owners are thus able to decide whether to finally accept or reject a revision via use of such buttons. FIG. 49 shows another screen view associated with an editor that does not include such accept or reject buttons in, for example, a revision text box 1508A while still including a like button 1425 and a comments button 1427. FIG. 50 illustrates another embodiment of a view of a screen as an Editor which view does not include the like button 1425 in the revision text boxes (such as within the revision text box 1508C). FIG. 51 shows an editor (and/or reviewer) screen view in which the like functionality has been enabled (or re-enabled) such that the like button 1425 appears to the user in, for example, the revision text box 1508D.

Via the like button 1425, a user may vote to like one or more revisions. The revisions with the most amount of likes will then be sorted to be placed at the top of the revisions listing to be in a more prominent position than less liked revisions for one or more users.

In embodiments, the one or more documents and the associated original and edited items as described herein are stored and accessible via cooperation of a plurality of tables in a database, such as within a SQL database. There may be, for example, and as described in greater detail further below, a user identification table, a permissions table, a language table, a documents table (including one per organization), an edit table (per organization), a language table per organization, and a general unique identifier (GUID) for each stored aspect in the database.

FIG. 52 shows a user table 1600 that includes the following column headers as keys: UserID 1602, Username 1604, First 1606, Surname 1608, Email 1610, Address 1612, Organization 1614, Permission 1616, and GUID 1618. The UserlD 1602 acts as the primary key for the user table 1600, the Username 1604 is the user identification name used in the system. Users are thus identified on the system by the user identification name shown in the Username 1604 column. Further, the system notes that all users that upload their own content are considered to be owners of their own content. The Organization 1614 column is used to group users together (per organization, for example, or as subgroups within an organization). The Permissions 1616 displayed an assigned permission level per use.

For example, FIG. 53 displays a permissions table 1700 indicating the levels of permissions and including a PermisID 1702, a Role 1704, and a GUID 1706. The PermisID is the primary key, and sets a level of permission ranging from 1-6, for example. A Role 1704 column includes the named role associated with the permission level of a user. For example, an Admin 1708 role is associated with a permission level of 1, an Owner (or Author) 1710 role is associated with a permission level of 2, an Editor 1712 role is associated with a permission level of 3, a Reviewer 1714 role is associated with a permission level of 4, a Reader 1716 role is associated with a permission level of 5, and a Guest (or Viewer) 1718 role is associated with a permission level of 6. As a non-limiting example, a Reader 1716 may be a user within an organization (or outside of an organization) that has been invited to view or read content of a document, while a Guest (or Viewer) 1718 may be a user outside of the organization that has been invited to review and edit content of a document. Content of a document within the system tool may be published to a Web page, for example, available to such a Guest (or Viewer) 1718, and such content may be the entire document or selected content from the document. The content may be content from a snapshot (passive) document or from a live document (in which, as described in greater detail further below, any change to the content will be replicated to the Web page).

FIGS. 54-55 list user actions per type of user role as defined in the permissions table 1700. For example, FIG. 54 shows a table 1800 listing a plurality of actions 1802 and whether each type of user is able to conduct each listed type of action 1802. The plurality of actions 1802 include the following: add a user, remove a user, take ownership of the others' documents, add/remove user groups, add/remove users to groups, add/remove a user to a document, and upload a document into the tool. An Admin 1708 is provided with permission to accomplish each of these actions 1802. An Author 1710, however, may only add/remove user groups, add/remove users to groups, add/remove a user to a document, and upload a document into the tool, while the rest of the roles of Editor 1712, Reviewer 1714, Reader 1716, and Viewer 1718 are not provided with permission or rights to conduct any of these actions.

FIG. 55 shows a table 1900 listing additional actions 1902 directed to handling system documents. The table 1900 further lists the roles of each of the categories of Admin 1708, Author 1710, Editor 1712, Reviewer 1714, Reader 1716, and Viewer 1718 in regard to associated granted permission rights in the actions 1902 for a document. The actions 1902 may include, as a non-limiting example, the following: import a document/template, export a document in a current state, export a document as a snapshot and/or version, print a document in a current state, print a document as a snapshot and/or version, create a new document/template, create/manage a snapshot, view snapshot(s) navigation in editor, view versions, view current state of a document, and frame by frame navigation of document timeline. The Admin 1708 and the Author 1710 are provided with rights to be able to proceed with each of these actions 1902. The Editor 1712 and the Reviewer 1714, however, may only be granted rights to export a document in a current state, print a document in a current state, view snapshot(s) navigation in editor, view versions, view current state of a document. The Editor 1712 may further be granted rights to utilize frame by frame navigation of document timeline. The Reader 1716 may be granted the rights to print a document in a current state, view versions, and view current state of a document. The Viewer 1718 may be granted simply rights to view versions and view current state of a document.

FIG. 56 shows another table 2000 listing user actions 2002 while working in a system document, and the rights of the roles to conduct these listed actions 2002 per role. For example, the actions 2002 may include making a revision of an item or another editor's revision, edit at any time any revision the user creates, vote on any revision apart from the user's own revision, make comments on any revision present, and vote once on each revision present in the document. The Admin 1708, the Owner 1710, and the Editor 1712, for example, may have rights to all these listed actions 2002. The Reviewer 1714, however, may only have rights to make comments on any revision present, and vote once on each revision present in the document. And the Reader 1716 and the Viewer 1718 may have none of the rights with respect to the actions 2002.

The system documents may be presented and/or translated into one or more languages. Thus, the system tool described herein permits a single document to have multiple languages in the one document, eliminating the need to have multiple files of the same document in different languages. FIG. 57 shows a language list table 2100 that includes a LangID 2102 column, and Language 2104 column, a SubCat 2106 column, a Dictionary 2108 column, and a GUID 2110. The SubCat 2106 includes subcategories of dialectal versions of a language that may be important and valuable if, for example, there is an active dictionary associated with a language (indicated by 1 in the Dictionary 2108 column or 0 if none are associated). For example, the language list table 2100 shows that for the English language listed in the Language 21014 column, two subcategories are included (listed in SubCat 2106) directed toward British English and American English.

FIG. 58 shows a documents list table 2200 including a plurality of columns. A DocID 2202 column is included as a primary key. A Name 2204 column reflects a document name. An OwnerID 2206 column refers back to the UserID 1602 listed in the user table 1600. A MaxUsers 2208 column lists a total number of editors and reviewers that may work on a document at a time, which number may not, for example, exceed 30 users in total. A Parent 2210 column may indicate a document that is based off a snapshot of another document. Further, when a document is imported in as a template, for example, a record is created in a snapshot table automatically including a document identification number and a timestamp of zero (0) as an initial state. A Template 2212 column lists 1 if the document is a template and 0 otherwise. An Upload Time 2214 column lists a timestamp associated with the document upload, and the Last Edit 2216 column lists a timestamp associated with the last edit made to the document. A Vote 2218 column sets a flag to indicate if voting is enabled (1) or disabled (0), and an Approval 2220 is a flag for determining whether approval is required and is enabled (1) or disabled (0). A Folder 2222 column is another flag column directed to whether a folders option is enabled or disabled. A MLanguage 2224 column refers to the LangID 2102 of the language list table 2100 as the default language and is used to indicate which type style or dictionary is to be used for a default editing instance. This includes all of the data relating to a document generated by a revision process that is stored in an editing table. The editing instance for the document may be identified as a combination of DocID and ElementID (that changes over time as revisions are made). An editing instance refers to all revisions of a particular document and how to display the revisions. By default, there is only a single editing instance. If additional languages are added to a document, a new editing instance is being added that is stored in a language edit table instead of an editing or edit table (described in greater detail further below). A Language 2226 column also refers to a LangID that is set forth in a language edit table, for example, and indicates if there are other languages supported by the document. If there is a null value, no other additional languages are supported by the document. If there are additional languages present, there may be a value or values up to five values, for example, that are comma separated. Each of the presented languages may also be considered a unique editing instance. The editing instance for the document is then identified as a combination of DocID and ElementID and LangID. The Editors 2228 and the Reviewers 2230 columns indicate assigned editors and reviewers to the documents that are comma separated (referring to the UserID 1602 of the user table 1600). The Redact 2232 column indicates user groups permitted rights to view a redaction. For example, if there are any owner made redactions, the owner may see the redaction but others may not. Any user group who is allowed to see the redaction along with the owner may be listed in the Redact 2232 column. Further, the documents list table 2200 may include a GUID 2234 column.

FIG. 59 illustrates a document table 2300 that includes the columns of DocID 2302, ElementID 2304, Assigned 2306, UserLock 2308, OwnerLock 2310, and Content 2312. DocID 2302 and ElementID 2304 are the primary key for this table. Assigned 2306 contains the Group ID for users that have been assigned to sections of a document. If a field associated with Assigned 2306 is blank, all editors assigned to the document have access to the document. UserLock 2308 (indicating an item is locked for users) and OwnerLock 2310 (indicating an item is locked for an owner and users can make changes, and which may be used for templates and parent-child documents) may indicate a lock state as a flag set by owners with respect whether an item of a document may be edited or not. When editing a document, an imported item (or an item created from a template) may be stored in the document table 2300. Any changes made to the document items may be recorded in the edit table 2400 described below in a standard editing mode. So any revisions created are displayed on the document for a viewer are occurring in the edit table 2400.

FIG. 60 shows an example edit table 2400 including the following column types: DocID 2402, UserID 2404, ElementID 2406, DisplNo 2408, RevID 2410, TypeID 2412, OrderID 2414, SubID 2416, Parent1 2418, Parent2 2420, TimeID 2422, and Content 2424. Each record in the edit table 2400 is a complete instance of a revision, and it is assumed that the revision is created from an original (such as RevID 2410 listings of 1, 8, and 15 shown in the edit table 2400) unless exceptions apply such as a revision of an editor revising their own revision or a revision based on another revision, as described hereinabove. DocID 2402 is the document being edited from the documents list table 2200. UserID 2404 is the user identification number associated with the user making the revision. The first item (original) is always the UserID of the owner (shown in the edit table 2400 as 1, for example). ElementID 2406 is an identifier of a logical element of text from the document as listed in the document table 2300. DisplNo 2408 is a display number of an order in which an item appears in a document in a downwards direction. RevID 2410 is a cumulative primary key used as an identifier for a revision. TypeID 2412 refers to a revision type (e.g., 1 is an original type, 2 is a revision from an original type, 3 is a revision of an editor revising their own revision, and 4 is a revision based on another revision). OrderID 2414 is an order in which a revision is created for a particular element. SubID 2416 is an order of a sub-edit process, whether it is an editor revising their own edit or a revision based on another revision.

Parent1 2418 and Parent2 2420 are linked to the OrderID 2414 values. For example, Parent1 2418 is the reference to an editor revision their own edit, either their own original revision or a subsequent revision of their own previous revision. These revisions are displayed on a screen and may expand to the right of the parent revision as described above. An applied logic may be used to flag a Parent1 type if a UserID 2404 is the same as the UserID 2404 of a user who created a revision (e.g., TypeID 2412 is set to 1). Further, if TypeID 2412 is equal to 3 (e.g., a revision of an editor revising their own revision), then the system checks for a Parent1 2418 type relationship. Further, Parent2 2420 is a reference to a revision based on another revision or a subsequent revision of that revision, which parent revisions are grouped and flow downwards. An applied logic may indicate if the new revision is based on a TypeID 2412 of 2 (e.g., a revision from an original type), a Parent2 2420 type relationship is flagged, and if TypeID 2412 of 4 appears, the system checks for a Parent2 2420 type relationship.

TimeID 2422 is a time stamp (including date and/or time information) associated with when a revision was made. Content 2424 stores the actual content contained in the revision. A column may be included reflecting the number of votes a revision has, and metadata may be stored as the actual data that can be generated from the content of a revision or additional data (such as a theme or subject of an item or document or the like).

FIG. 61 shows a snapshot table 2500 having the following column types: SnapID 2502, Name 2504, DocID 2506, TimeStamp 2508, and GUID 2510. When a snapshot is taken of a document, it is basically a moment in time of that document that is recorded in the snapshot table 2500. Each snapshot will have its own unique identifier or ID set as the SnapID 2502. Each snapshot also will have a name. If a document is imported in as a template, a record is created in the snapshot table 2500 automatically with a DocID 2506 and a TimeStamp 2508 set to 0 as its initial state. Each snapshot further references back to a document identifier (or DocID) from which the snapshot was taken. The TimeStamp 2508 indicates the occurrence of the snapshot in time (including date and time information, for example), and sets what revisions are displayed at that time for that specific document.

Figure 62:
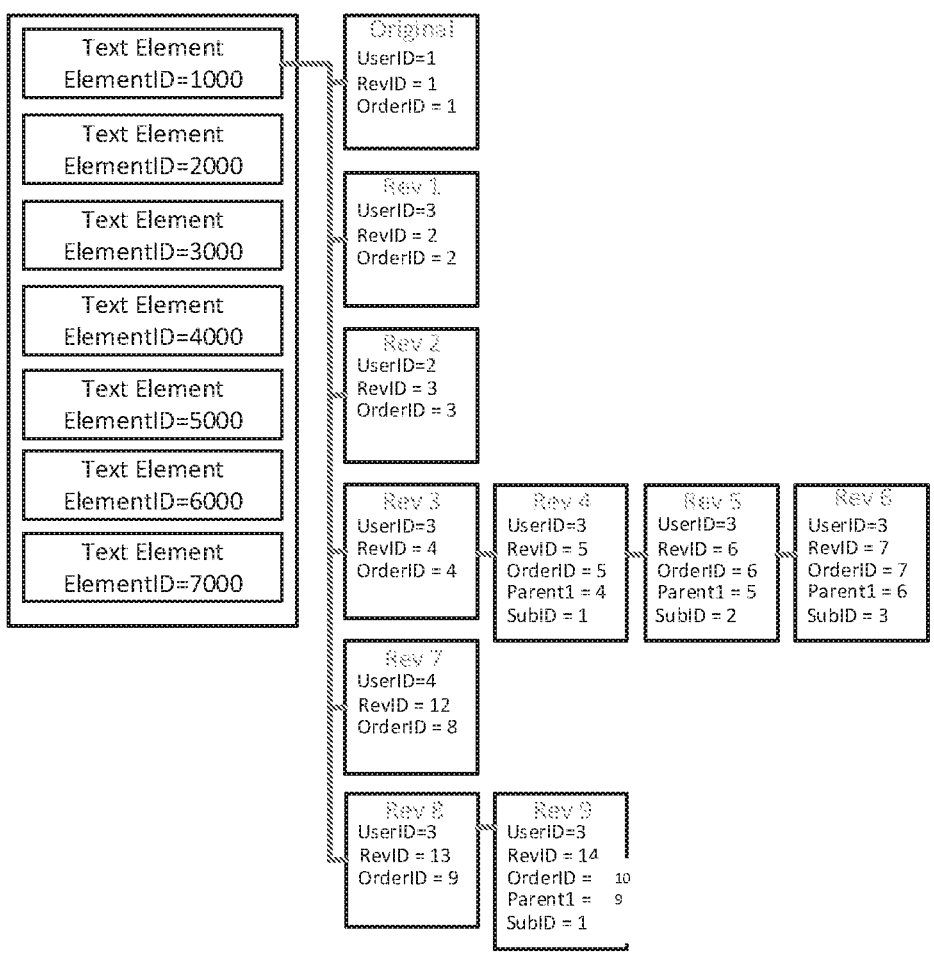
FIG. 62 illustrates an example scenario of displayed information with reference to the edit table of FIG. 60 for a first text element of a document of the exemplary document collaboration system tool, according to one or more embodiments shown and described herein.
Figure 63:
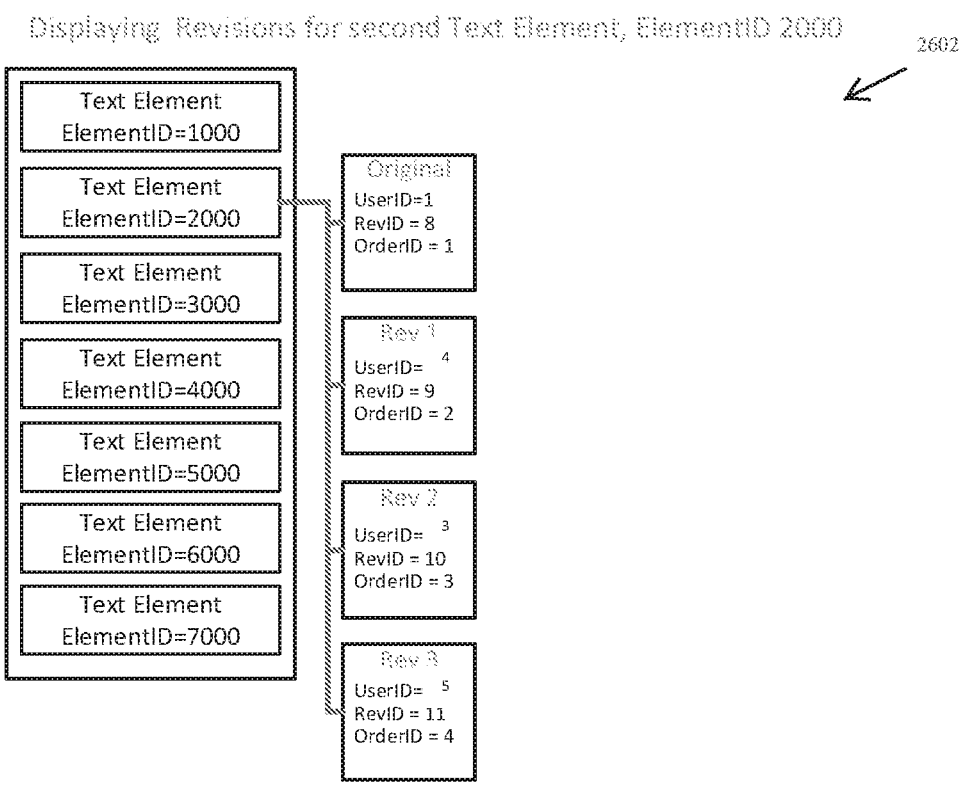
FIG. 63 illustrates an example scenario of displayed information with reference to the edit table of FIG. 60 for a second text element of a document of the exemplary document collaboration system tool, according to one or more embodiments shown and described herein.
Figure 64:
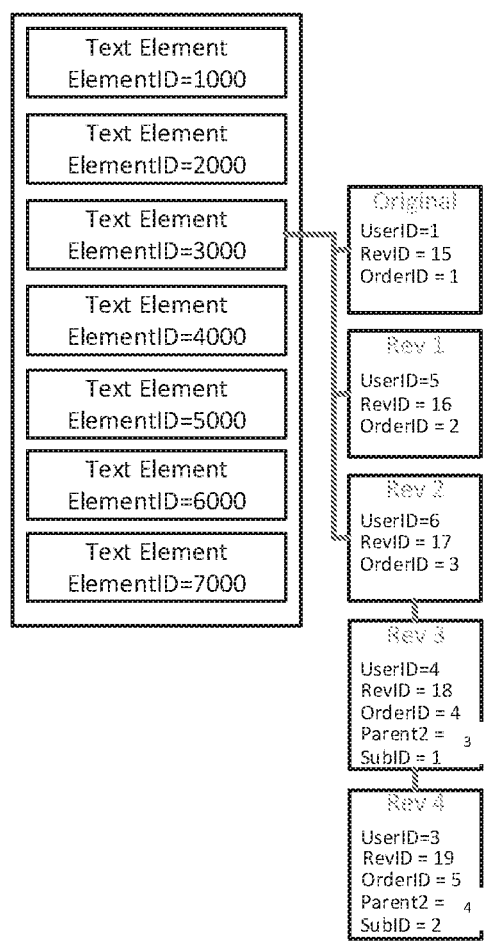
FIG. 64 illustrates an example scenario of displayed information with reference to the edit table of FIG. 60 for a third text element of a document of the exemplary document collaboration system tool, according to one or more embodiments shown and described herein.

FIGS. 62-64 show examples of scenarios of displayed information on a screen with reference to the edit table 2400 of FIG. 60. For example, FIG. 62 shows a revisions display scenario 2600 for the first text element having an ElementID=1000 in the edit table 2400 of FIG. 60. Similarly, FIGS. 63-64 illustrate revision display scenarios 2602, 2605 for respective second and third text elements (having ElementIDs equal to 2000 and 3000) of the edit table 2400 of FIG. 60.

Figure 65:
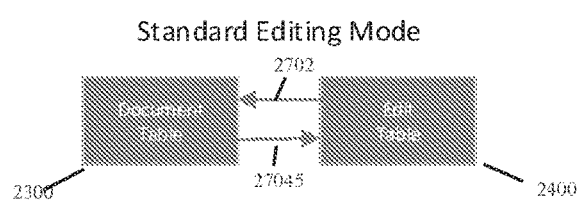
FIG. 65 schematically illustrates a standard editing mode of the exemplary document collaboration system tool, according to one or more embodiments shown and described herein.
Figure 66:
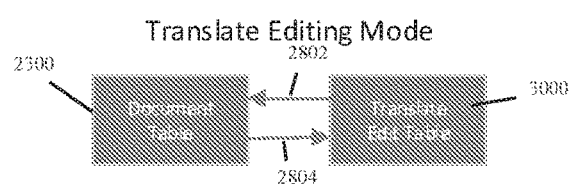
FIG. 66 schematically illustrates a translate editing mode of the exemplary document collaboration system tool, according to one or more embodiments shown and described herein.
Figure 67:
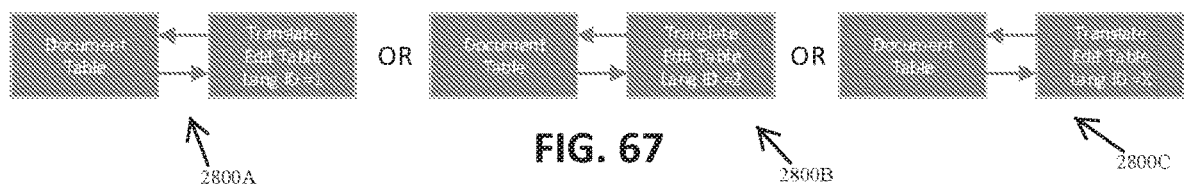
FIG. 67 schematically illustrates translate editing modes of the exemplary document collaboration system tool, according to one or more embodiments shown and described herein.

FIGS. 65-67 show editing mode schematic examples of editing instances, which is an editing process tied to a document. For example, FIG. 65 shows a standard editing mode 2700 linked the document table 2300 with the edit table 2400 via communication links 2702, 2704. A language or translate button in the system may allow a user to translate an existing document collaboratively. The document is in effect stored as a single document in multiple languages, as described in greater detail below. A default operation for the system is to interact with the edit table 2400 as shown in FIG. 65 when making item revisions, viewing the revisions, and commenting on the revisions. When a user selects the translate button, a language is selected and a snapshot is taken, and then the editing frame will display revisions from a translate edit table 3000 (as shown and described in greater detail below with respect to FIG. 68). A base of the original items will be taken from the snapshot. FIG. 66 shows an example schematic translate editing mode 2800 linking the document table 2300 with a translate edit table 3000 (of FIG. 68) via communication links 2802, 2804. Embodiments of the translate editing mode are shown in FIG. 67, including modes 2800A-2800C. In mode 2800A, the translate edit table 3000 has a language identifier set to 1 (to link to a first language). In mode 2800B, the translate edit table has a language identifier set to 2, and mode 2800C shows a placeholder language identifier of X indicating that any set language identifier associated with a language in the system may be used and identified. Referring again to FIG. 66, in the case of the translate editing mode 2800, the edit table 2400 is no longer bound to the displayed page on the screen for a user, but the translate edit table 3000 is now bound to the page so that all revisions will be written to and display from the translate edit table 3000. When editing a document, an imported item (or item created from a template), will still be stored in the document table 2300 but any changes made to the document items will be recorded in the translate edit table 3000 in the translate editing mode 2800. Thus, any revisions being created or displayed are occurring in the translate edit table 3000 in a language, which table 3000 may include multiple languages. The LangID 3008 of the table 3000, described below, acts as a filter between languages such that, depending on the chosen language, only the LangID 3008 that matches the selected language is shown for that document. Thus, there may be multiple languages in the translate edit table 3000, but only the selected language based on the DocID and the LangID 3008 is displayed in the editing frame showing the document to the user.

FIG. 68 illustrates an example translate edit table 3000 that is generally a copy of the edit table 2400 with a plurality of columns as described below. Each record in the table is a complete instance (of a final outcome made once a user selects the commit option) of a revision. DocID 3001 is the document being edited from the documents list table 2200. UserID 3002 is the user identification number of the user making the revision. The first item as an original text box is always associated with the UserID 3002 of the user of the initial snapshot. The example of FIG. 68 shows this to be 1, but it may be any number since it is based on a last revision for each revision at a time the snapshot was taken. ElementID 3004 is an identifier of a logical element of text from a document as listed in the document table 2300. DisplNo 3006 is an order in which the item appears in the document going downwards. LangID 3008 refers to a language used for translation purposes. RevID 3010 is a cumulative primary key used as an identified for a revision. TypeID 3012 refers to a revision type as described above with respect to TypeID 2412 of the example edit table 2400 of FIG. 60. OrderID 3014 is an order in which a revision was created for a particular element or item. SubID 3016 is an order of the sub-edit process, whether referring to an editor revising their own edit or a revision based on another revision. Parent1 3018 and Parent2 3020 are similar to Parent1 2418 and Parent2 2420 of the example edit table 2400 of FIG. 60. TimeID 3022 is a timestamp of when the revision was made. Content 3024 is actual content of the text contained in the revision.

Referring again to FIG. 14, the Analytics button allows a user to track analytics associated with the document. For example, as all activity related to the document is monitored by the tool, a user is able to see who is actively editing a document, who among the editors is the most productive, and/or what are the other productivity metrics associated with the editors. Since the tool tracks all activity within a document such as revisions, comments on revisions, and also ideas that might be surfaced in revisions or comments about revisions, the tool is able to analyze and track such metrics. For example, based on the number of comments or changes to a document, the activity can be tracked by showing where most activity was in a document, such as adding items, how many revisions an item had, and like activity. This activity is able to be tracked, depending on the metric a user desired to research, such as a number of Edits, a number of Adds, a number of comments in a revision thread (in a sequence of where new revisions are based on a previous revision, instead of an original item), and the like. This permits the tool to present the user with analytical reports such that the user is able to view and/or perform powerful diagnostic analysis of a document to analyze a variety of issues such as, for example, issues of contention or contradicting sections of agreement. Further, as all edits are tracked as a contextual change, language processing may be applied to all revisions, allowing a user to view revealed scope creep within a document (and change of intent of one or more items or the entirety of the document). Such scope creep may be revealed by, for example, tracking verb/noun changes within the documents revisions, both individually and also by groups of items in a document. In embodiments, active user tracking analytics may provide information with respect to which user was most active in a document in certain categories (such as which user wrote the most, which user edited the most, and which user commented the most with respect to the document) as well as information regarding the specifics of user history. For example, the information may include what revision a user made and when they made a revision. Further, the tool may track user activity by user identification, user location (such as through GPS and/or IP address data), and a timestamp corresponding to a user action as well as history regarding the user action.

Figure 83:
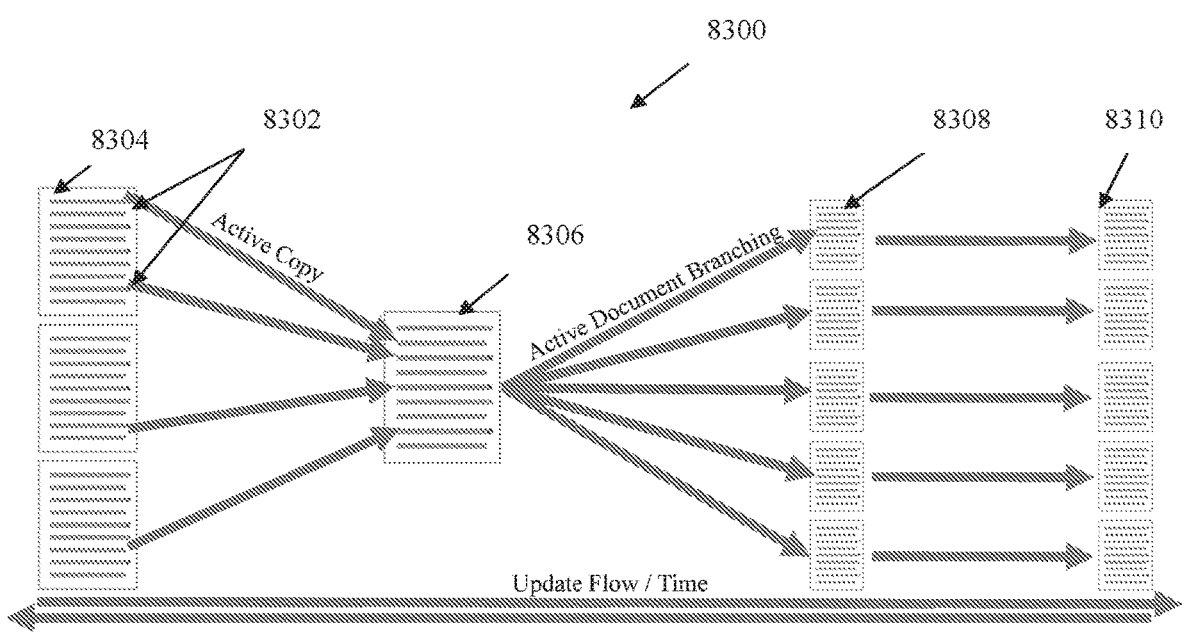
FIG. 83 schematically illustrates a process flow of document consumption and branching through the exemplary document collaboration system tool, according to one or more embodiments shown and described herein.

Referring to FIG. 83, the tool may further share content in existing documents through a process 8300 by sending the content (such as one or more items 8302) from one or more documents 8304 to other documents or to a new document 8306. If the content is coming from an active (non-snapshot) document, changes will be replicated automatically to other documents consuming the content. If the content is coming from a document snapshot, the content is passive and static, the consumed content will not change. Due to inherency and the dynamic link between the active documents, an update to the first active document is automatically shared and consumed by the other linked documents. However, a user may opt to not consume edits from an active document into other documents. Further, the user may create a new active document from a snapshot and opt to push out edits to the new active document to other documents. Additionally or alternatively, the system may use a rule to push out changes from a last most snapshot generation to the one or more documents to consume the edited content.

As further illustrated in FIG. 83, the tool is able to branch documents as well, creating parent-child documents, for example. Any document may have a branch from a snapshot of a document. The branch option creates a unique offshoot of an original document, creating a timeline associated with the new branch or child document. For example, in FIG. 83, a set of documents 8308 branched from the new document 8306 may be parent documents that each have respective child documents 8310. The owner of the child document can control what may or may not be editable in the child document. Because a user may branch from any snapshot of an existing document in the tool, a user may over time create a document tree. For example, the user may branch from any other created branch of documents or create new branches of documents from a single trunk document, which is the document a user originally started with before the user started to create the branches. A user may also create a snapshot from the live instance of the child document. When a user creates such a Live Document Branch, the user may break inheritance on specific sections of a document, pages, and/or individual sections. This allows a user to, for example, create a custom policy document, with specific sections in the document that specified departments in an organization may modify to meet department oriented specific needs. The other sections of the document may be locked to the users of the branch document, editable to the owners of the original document (as changes in the original will always be replicated to all branches), or vice a versa, such that the sections that are customizable in the branch are now locked in the original document (and changes in branches will not be replicated to the original document). As an elemental document, the document is a dynamic, living document that may be a parent document from which a child document is created. The child document may be a static elemental document, and a plurality of items of the child document may be stored in a table of the relational database and linked to a child document identification number.

The tool is further able to provide a redaction feature for the redaction of content in a document. Redaction at a content level by a user creates an electronic redaction of content in a document, which redacted content a user may select to be consumed as corresponding redacted content in other documents. The other documents may be, for example, one or more child documents. The tool may further provide a find and redact option, allowing a user to quickly redact aspects within content such as words, names, or terms in a document simultaneously or individually for each found aspect of content. Multiple instances of redaction in the same document for different groups or users may be created.

The tool is able to import one or more documents having a tracking enabled feature such that tracked changes in the document(s) are also imported. Such tracked changes may include marked added content, marked deleted content, and included comments. When a document including such tracked changes is imported through the tool, the addition or deletion based tracked changes are incorporated as revision items. Comments (comment based tracked changes) are incorporated as a shortcut link when imported, which link includes identification of a commentee (such as commentee name initials, and an assigned comment identification). Comments may appear as tied to a corresponding revision item based on time stamps. If there are no revisions present, a comment may be tied to an original item of the document. Tracked changes with different time stamps may be imported as separate corresponding revision items. A final edit with all changes applied may be shown in the imported document.

Figure 69:
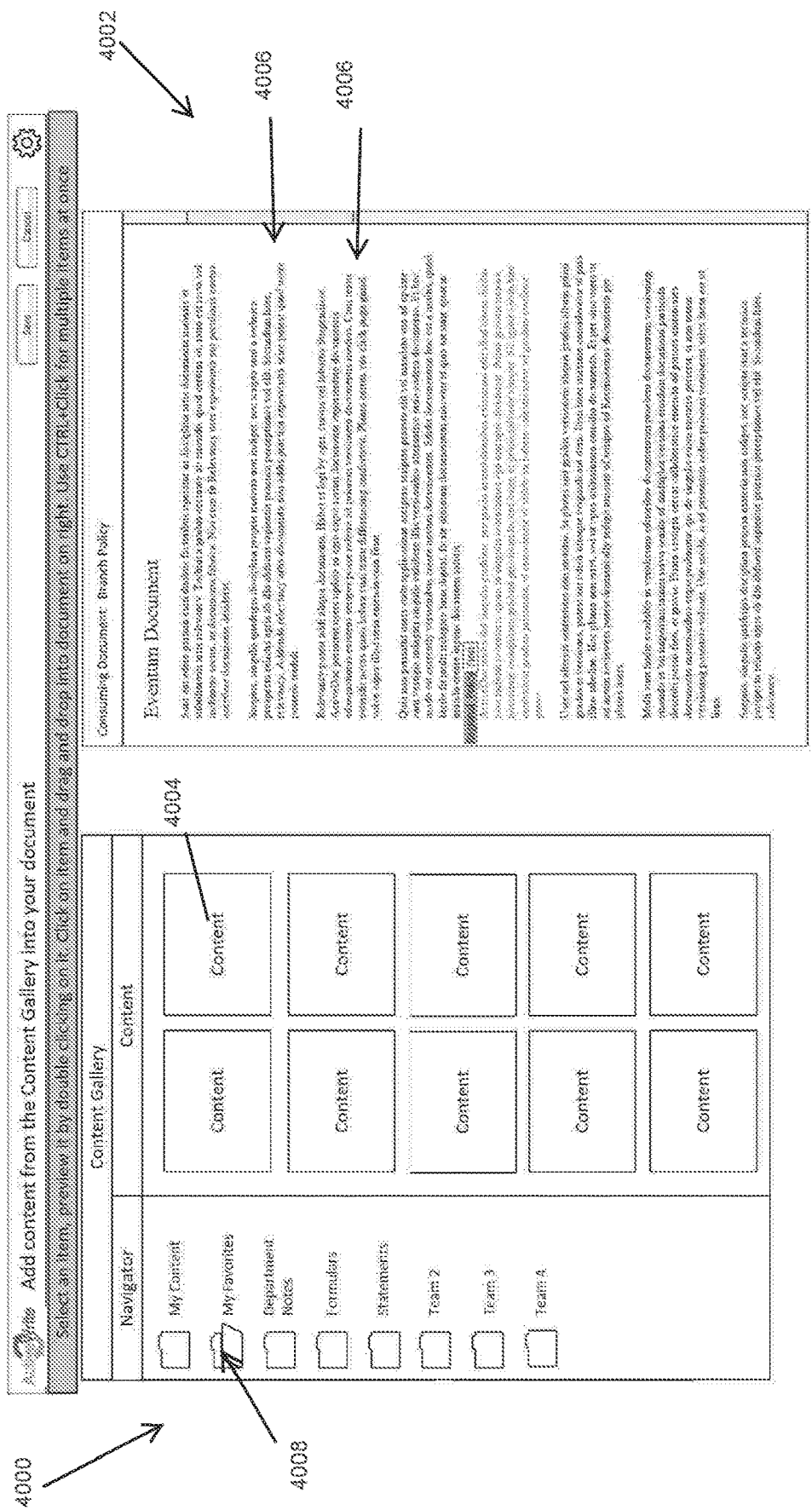
FIG. 69 illustrates an example content gallery and document view of the exemplary document collaboration system tool, according to one or more embodiments shown and described herein.

Referring to FIG. 69, the tool is able to place item(s) 4006 from a document 4002 in a content gallery 4000 as content 4004, or move content 4004 from the content gallery 4000 to the document 4002. For example, a user may select any item 4006 or series of items 4006 from the document 4002 and choose to add them to the content gallery 4000 as content 4006. When selecting item(s) 4006, the user may be prompted by a dialog box either to (1) choose a content gallery 4000 the user has access to for placement of the selection or to (2) create a new content gallery 4000. The content gallery 4000 may be local to the user or a group, team, or organization affiliated with the user. The user may also name the content 4004 from the item(s) 4006 that will be placed and shared in the content gallery 4000. If the content 4004 shared in the content gallery 4000 may be from a document 4002 that is (1) live and active or (2) static (i.e., a snapshot document). With respect to live content, if the content 4004 from the document 4002 is updated, the same content 4004 in the content gallery 4000 may be updated. Further, any other document 4002 using the same content 4004 from the content gallery 4000 may also be updated. A user has an option to make shared content 4004 in the content gallery 4000 from a live document 4002 static. The static, shared content 4004 will not inherit any changes made to the corresponding item(s) 4006 from the live document 4002.

The content gallery 4000 may include a drag and drop content feature configured to drag one or more items 4006 from a document 4002 as content 4004 and drop the content 4004 into another document 4002 or content gallery 4000. Further, content 4004 may be dragged from the content gallery 4000 and dropped into one or more documents 4002.

The content 4004 in the content gallery 4000 may be organized into one or more folders 4008. A text toolbar of the tool may include an "Add to Content Gallery" button to enable an option to add one or more items 4006 as content 4004 into a folder 4008, which may be previously existing or newly created by a user. For example, a user may select an item 4006 from a document 4002 and select the "Add to Content Gallery" button, which will prompt the tool to present the user with a dialog box. In the dialog box, the user may select a folder to place the content 4004 within in the content gallery 4000, may create and name a new folder to place the content 4004 into, and/or may name the new content 4004. A user may double-click on a selected content 4004 in the content gallery 4000 to view and/or zoom into the selected content 4004. A user may update the selected content 4004 and save changes.

The tool may further auto-suggest content, such as from the content gallery 4000, to a user when the user is creating or editing content in a document. For example, when the user types in a revision or creates a new item in the document, the tool actively searches existing stored content in the relational database, such as content in the content gallery 4000. If the content being typed in matches at least a portion of existing content, either exactly or similarly, the tool may display the matching existing content to the user. The user may have an option to add the suggested content in directly to the document, rather than continue typing, by selecting the suggested entry, or the user may ignore the suggestion and continue creating the new content. Through having an option to re-use stored content, a user may select stored content such that edits made utilizing the auto-suggested stored content have increased consistency of language, style, information, and facts while saving the user time when making edits.

Further, the tool may cover multi-system platform electronic document solutions including and not limited to a document form system, an email system, a presentation system, and a spreadsheet system, and combinations thereof. Each of these electronic document solutions may include items that are stored in a shared relational database as described herein.

Figure 70:
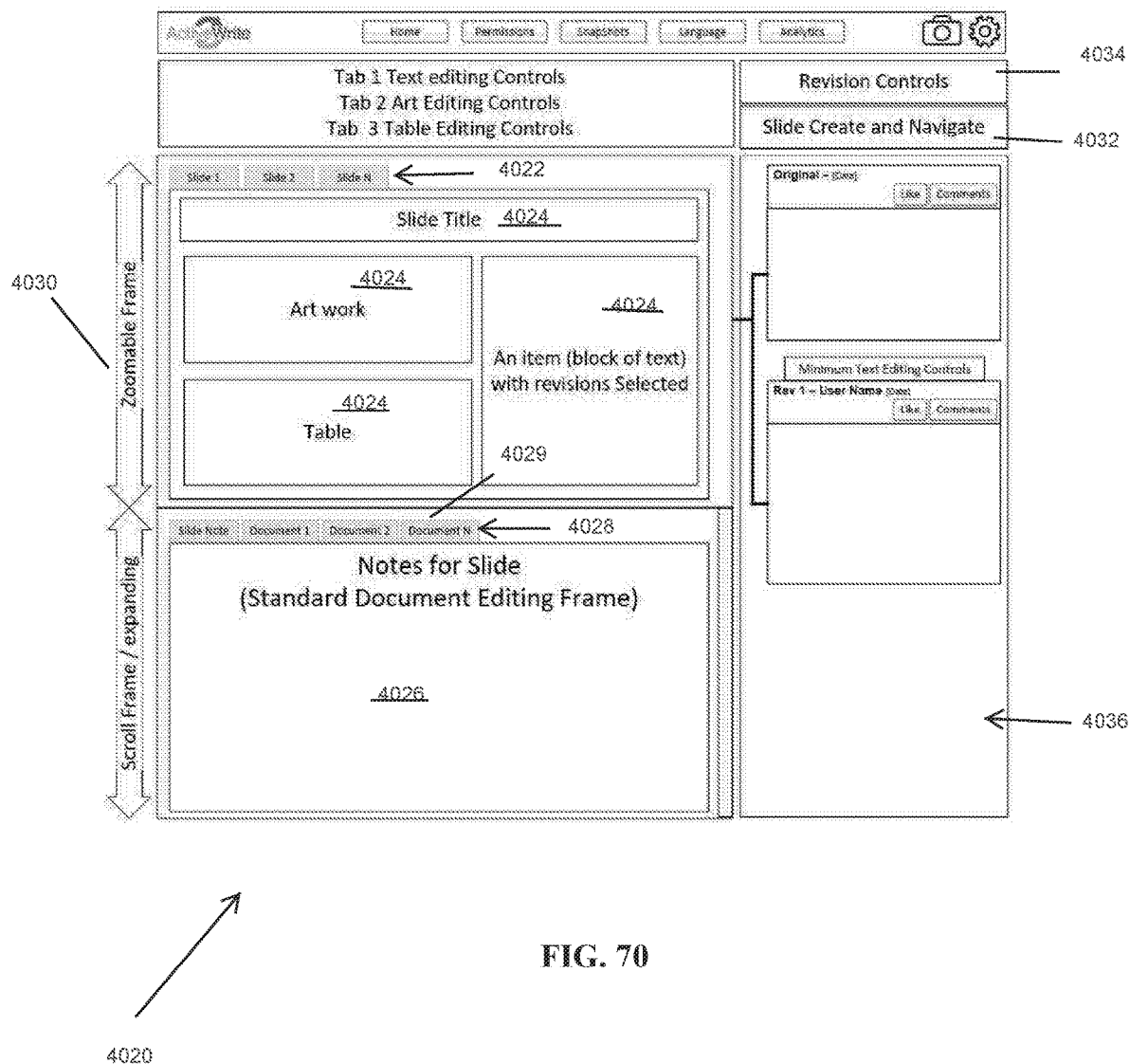
FIG. 70 illustrates an example slide with notes and document view of a presentation system of the exemplary document collaboration system tool, according to one or more embodiments shown and described herein.

For example, referring to FIG. 70, a presentation system 4020 may include one or more slides 4022 including internal dynamic content and that are configured to be displayed as a slide show. A slide 4022 may include, as respective items 4024, a slide title, an art work figure, a table, and/or a block of text including revisions. The presentation system 4020 may further include a notes screen 4026 disposed below a selected slide 4022. The slides 4022 may be shown in a slide only view without the notes screen 4026. The presentation system 4020 may show the slides 4022 in order in a vertical manner, for example, that may be scrolled and/or zoomed into upon through use of a bar 4030. Slides 4022 may be added, deleted, and navigation through use of a slide create and navigate button 4032. Slides 4022 may be revised through use of a revisions controls button 4034 that may present a use with optional revision control features as described herein. One or more revisions may show in a revisions box 4036 as shown in FIG. 70.

In a non-limiting example, one or more slides 4022 may be shown with a slide with notes view including the notes screen 4026 and a single slide 4022. A user may add notes (in a text form, for example) with respect to the slide 4022 in a corresponding notes screen 4026. Selection of a new slide 4022 results in viewing a new corresponding notes screen 4026 in the slide with notes view.

In another example of a slide with notes and documents view, as shown in FIG. 70, the notes screen 4026 may further include tabs 4028 for the notes screen 4026 and one or more documents 4029. For example, a use may wish to add content from a document 4029 to a slide 4022. The user may select at least one document 4029 from one or more documents 4029 listed in the tabs 4028. At least one selected document 4029 may appear to the user. The user may drag and drop content between the slide 4022 and the selected document 4029. An entire object or a portion of the object from the selected document 4029 may be selected, for example, and dragged and dropped into the slide 4022. The user may select an option to make the selected object a live object. If the user selects the option to make the selected object a live object, the corresponding object in the slide 4022 will be updated if the object text in the selected document 4029 is updated. When a user selects an item 4024 in a slide 4022 that is being consumed from another document 4029, a corresponding document 4029 including the selected item 4024 may be identified with an option presented to open the document. The corresponding document 4029 may be shown in the notes screen 4026 and/or may appear in another window.

Every object as an item 4024 in a slide 4022 may be stored as a unique object in a relational database as described herein. Each time an item 4024 is edited, a new instance of the item 4024 is created and stored as an object in the relational database. The object may be shared in documents across system platforms, such as through different electronic document solutions. Editing of a live, dynamic object may result in a simultaneous editing of the revised object across other document solutions that contain the object.

For example, text in the notes screen 4026 may be tied to corresponding text in a slide 4022. Revisions to the notes in the notes screen 4026 simultaneously may result in revision of the corresponding text in the slide 4022. Alternatively, content may be copied in a static form from another system platform, such as from a selected document 4029, or may be added in as new content. Such static content begins a new revision process when the content is first edited. Further, the static content and new revision process will not be linked to document(s) from which the content was copied.

Figure 71:
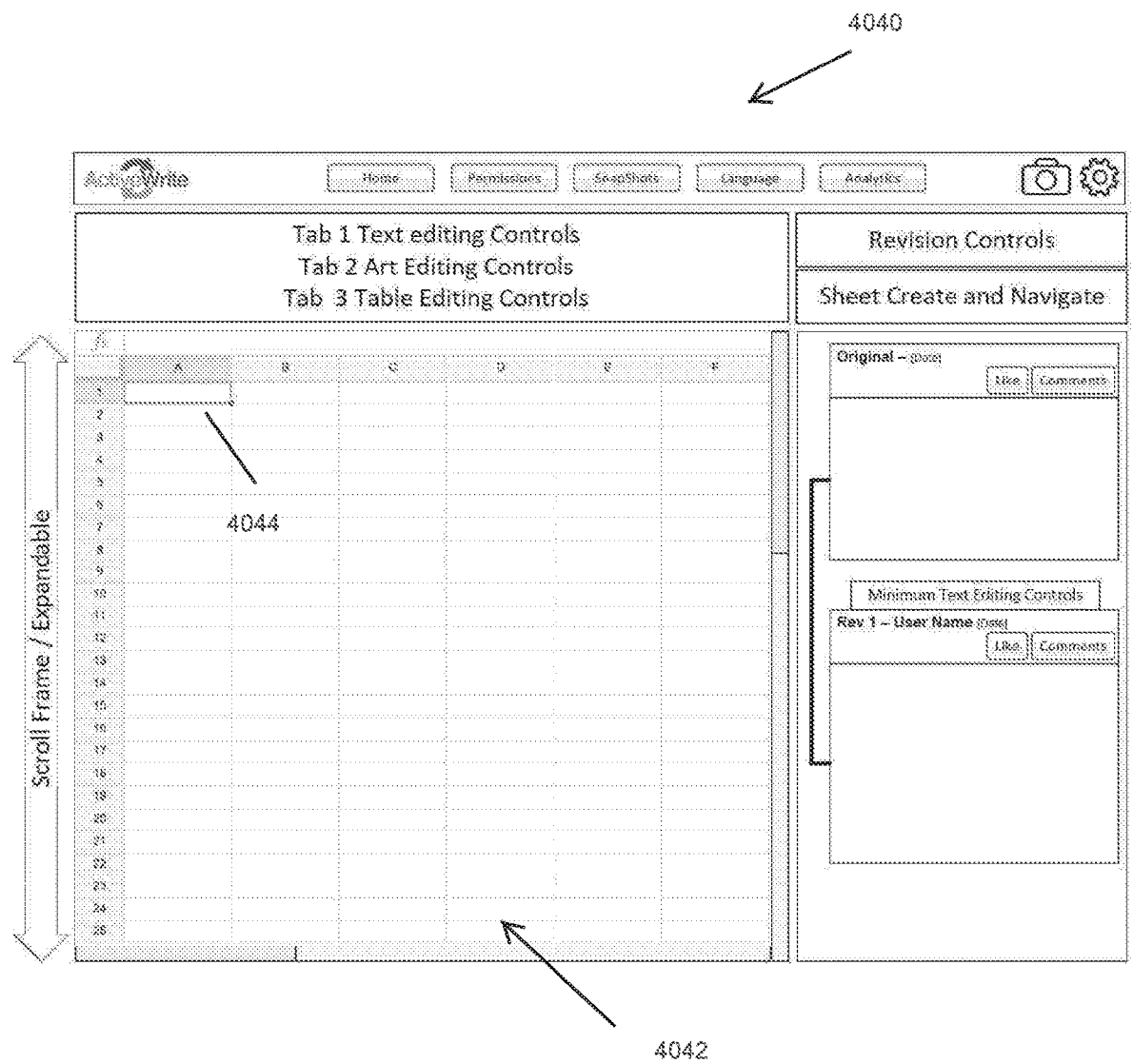
FIG. 71 illustrates an example spreadsheet view of a spreadsheet system of the exemplary document collaboration system tool, according to one or more embodiments shown and described herein.

Referring to FIG. 71, a spreadsheet system 4040 may include a spreadsheet area 4042 including cells (that may be editable or static) configured to form a plurality of row and columns in which a user may input and/or store data in a tabular form. Each cell may be stored as a respective item 4044 in a relational database. Revisions to each editable cell result in stored instances of new objects in the relational database.

Content may be shared across various electronic document solutions, (including the presentation system of FIG. 70 and the spreadsheet system of FIG. 71) and/or placed into a content gallery as described above. Content associated with a cell, such as content stored as the item 4044, for example, may be consumed by other electronic document solutions either statically or dynamically as described herein. Thus, a user may enter or analyze data in the spreadsheet area 4042 and opt to consume the data into a presentation or a document. When the content in the spreadsheet area 4042 is updated, the consuming presentation or document is also updated and may be formatted and/or redacted as necessary. Such cross system platform consumption of objects optimally reduces content creation and revision time and further reduces an opportunity for error that may occur in replicating a revision across system platforms without such an automated consumption.

Such an electronic document solution may also include an email system. For example, the tool may be configured to implement a method of exchanging digital messages between internet users. Text and images as objects may be inserted and formatted into an email message, which is then sent to a recipient. Each email message may be stored as an object in the relationship database, and each new message in an email thread may be stored as another new object. Further, a user may send an email message out directly from another electronic document solution that the user is accessing. The email message may reference what electronic document solution the user is working on and a corresponding timestamp to create a natural history of activity relating to content access.

Referring to FIGS. 72-77, the tool may be configured to include a security folder structure in which users have access to documents and/or security folders based on user roles, as described in greater detail further below. The roles of a user with respect to the security folder structure may be Administrator, Owner, Supervisor, Editor, Reviewer, Reader, and Guest.

A user assigned to the roles of Owner, Editor, Review, Reader, or Guest may have rights similar to those described above and herein for any corresponding roles. For example, the roles of Editor, Reviewer, Reader, or Guest may only be applied to documents and content within a document with rights as described herein and above. The other three roles of Administrator, Owner, and Supervisor may have additional rights with respect to security and access to a security folder structure and security folders contained within the security folder structure.

For example, an organization may be associated with a security folder structure when the organization is registered with an Administrator, who is a Founding Owner. The Administrator may be tasked with creating or customizing the security folder structure, such as with creating a logical grouping structure.

Figure 72:
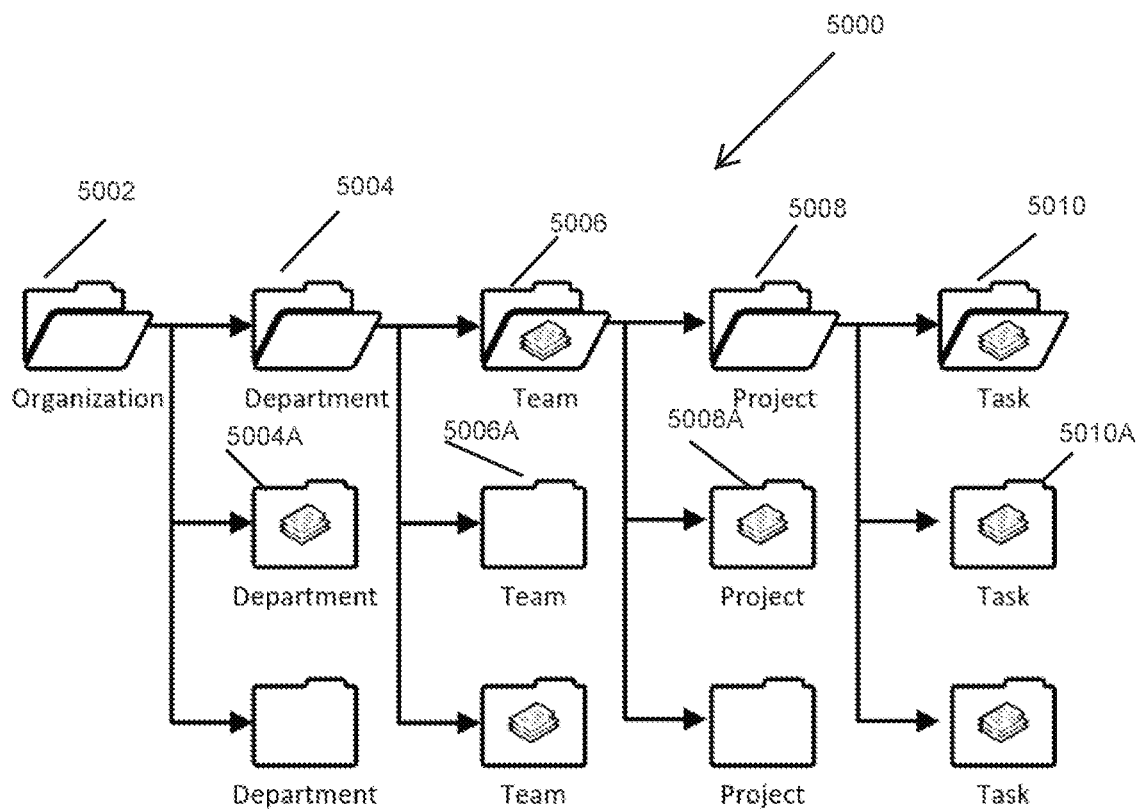
FIG. 72 illustrates a view of an example organizational security folder structure of the exemplary document collaboration system tool, according to one or more embodiments shown and described herein.

Referring to FIG. 72, an example organizational security folder structure 5000 includes an organization folder 5002 associated with the organization. Logical grouping folders stem therefrom and are labeled as Department 5004, Team, 5006, Project 5008, and Task 5010. Effectively, each folder may act as a security group created by the Administrator. The Administrator may also assign other Administrators to the organizational security folder structure 5000. Each user may have a unique Workspace Folder within the organizational security folder structure 5000, as will be described in greater detail below with respect to FIG. 77.

The folders are configured as virtual folders acting as displayed security groups linked to content information in a relational database to display such content information as described herein with respect to the tool, and not as folders within which to store static documents. For example, while documents associated with a security group (i.e., a folder) may be virtually displayed as a document file, content within the document is stored in a relational database as described herein and not as a static file within a folder.

Thus, documents and/or contents may be virtually displayed in the folders of the organization folder structure 5000. Folders in the organization folder structure 5000 may display such content in a content gallery, as described above. For example, the content may be displayed as virtual thumbnails in a content gallery.

A user may own or co-own a folder within the organizational folder structure 5000 and may see all the contents in and linked to that folder. A user may also be assigned to content in the folder and may view an organization path to the content in the folder. If the assigned content is within the Project 5008A folder, for example, the user may view the following path: Organization 5002→Department 5004A→Team 5006A→Project 5008A. However, the user may only view the assigned content within the folder, and not other non-assigned content that may be within the folder, as will be described in greater detail below.

Only a document Owner may have full access to a document. Other users may only access content of the document if invited by the Owner as one of an Owner, Editor, Review, or Reader. In the document, Owners may control an access level of the document content as a whole document or through varying access levels with respect to specific document content, assigning access levels to such content. The access levels may be of Editor, Reviewer, Reader, or a Redacted access level such that certain content may be redacted for an assigned user.

With respect to user roles, at a folder, document, and/or content level, an Administrator may have rights to add a user ("Right 1"), remove a user ("Right 2"), take ownership of other users' documents ("Right 3"), add/remove user groups ("Right 4"), add/remove users to groups ("Right 5"), add/remove a user to a document ("Right 6"), and upload a document into a tool ("Right 7"). An Owner may have rights to Rights 4-7, and a Supervisor may have rights to Rights 3-7 such that a Supervisor may take ownership of other users' documents while an Owner may not. Editors, Reviewers, Readers and Guests may have none of Rights 1-7 and may only have rights with respect to documents and content within documents.

With respect to document/content rights, the Administrator, Owner, and Supervisor may have the rights to import a document/template ("Right 8"), export a document ("Right 9"), export a document snapshot ("Right 10"), print a document ("Right 11"), print a document snapshot ("Right 12"), create a document/template ("Right 13"), create/manage a snapshot ("Right 14"), navigate by time ("Right 15"), view snapshots ("Right 16"), view document ("Right 17"), and access/create content within a content gallery ("Right 18"). An Editor and a Reviewer may have rights to Rights 9, 11, and 15-17. An Editor may further have rights to Right 18. Thus, an Editor and a Review have the same document/content rights except than an Editor has further rights to access and/or create content within a content gallery. A Reader and a Guest may also have rights to Rights 16 and 17. However, a Reader may further have rights to Right 11 to print a document while a Guest may not have that right.

With respect to document/content revision rights, an Administrator, Owner, and Editor may have the rights to make a revision of an item or of another Editor's revision ("Right 19"), edit any revision the user creates at any time ("Right 20"), vote on any revision apart from their own revision ("Right 21"), make comments on any revision that is present ("Right 22"), and vote once on each revision present in the document ("Right 23"). A Supervisor, Reader, and Guest may have none of these Rights 19-23. Further, a Reviewer may only have rights to Rights 22-23.

An Administrator may also assign a user or a security group to a folder, at least at a first sub-level of a folder structure. These assigned users or group may be considered the assigned owner of a particular folder. An assigned owner may create sub-folders, which the assigned owner may own and/or assign to other owners. An assigned owner may also elect to assign a sub-folder to another owner and remain on as a supervisor (i.e., the creating user of the sub-folder). The Administrator may see (as a read-only view option) all folders and content but may only access content that the Administrator has created or imported or to which the Administrator has been assigned. The Administrator may only access a personalized workspace and does not have access to user folders (i.e., other user workspaces) that are separated from the organization folder structure 5000.

Referring to FIG. 72, within each major folder, an assigned owner may create sub-folders (i.e., folders within that folder), and assign other users as assigned owners to those new sub-folders. Each assigned owner by default may only view sub-folder levels that are lower than their assigned sub-folder but not sub-folder or folder levels that are higher that their assigned sub-folder. An assigned owner may only view folders outside their assigned folder chain if that assigned owner has been assigned to a document within an outside folder. However, that assigned owner may not see any of the other documents in that outside folder unless the assigned owner is part of a group that is given universal permissions to edit or review the contents in those outside folders and/or sub-folders.

Figure 73:
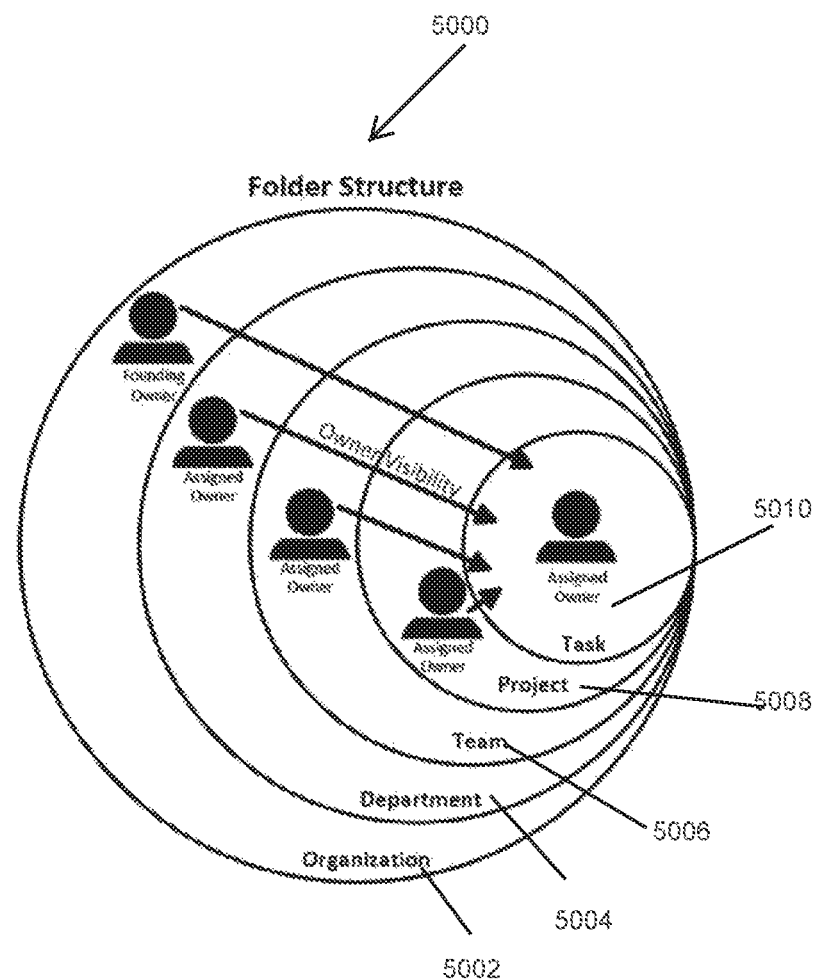
FIG. 73 illustrates another view of an example organizational security folder structure of the exemplary document collaboration system tool, according to one or more embodiments shown and described herein.

FIG. 73 illustrates another view of the organizational folder structure 5000 that includes sub-folders labeled as Department 5004, Team, 5006, Project 5008, and Task 5010. Each of the circular areas are representative of a folder, with sub-circle areas being representative of sub-folders.

Being assigned as an owner of a folder gives a user (or group) a right to create and import documents (and become the owner of those documents). The user as an owner may also assign other users to the documents in the folder that the users own and give the other users roles such as owners, editors, reviewers, or users with view access rights. Other owners may view all the folders to which they are assigned and content within the folders but may only access content that they have created or import or access content to which they have been assigned. Thus, an owner of a folder may view all items in a folder but may only access and open content the owner has created. Another owner of the same folder may view the other owner's content but may only access their own content (unless given other rights to the content).

Figure 74:
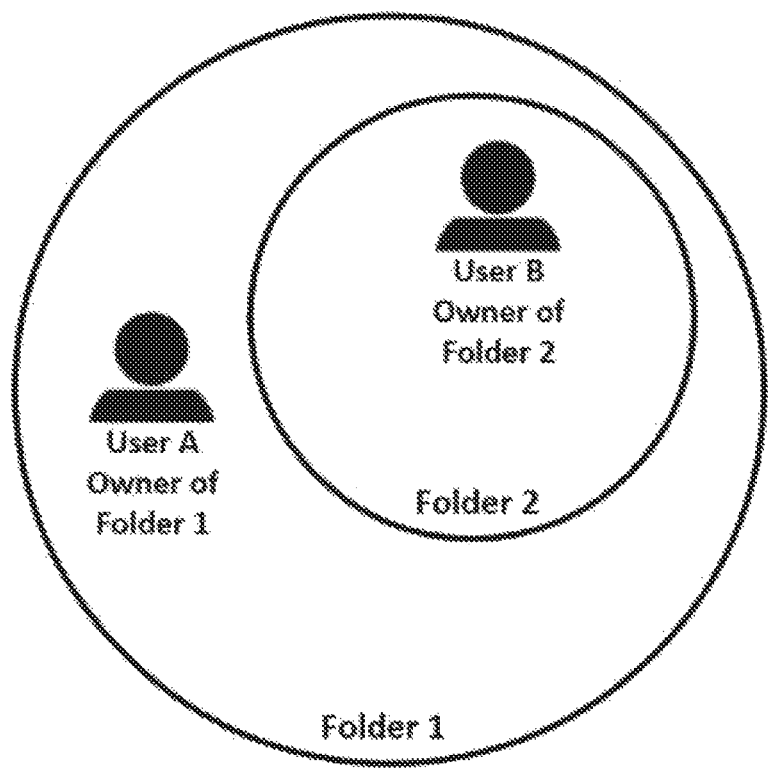
FIG. 74 illustrates an example of folder and sub-folder creation in the exemplary document collaboration system tool, according to one or more embodiments shown and described herein.

Referring to FIG. 74, in a non-limiting example, a User A owns Folder 1 and creates Folder 2, which is a sub-folder of Folder 1. The User A initially owns Folder 2. The User A assigns a User B to Folder 2 such that the User B becomes the owner of Folder 2. The User A is able to view anything created in Folder 2 but cannot open or access any content or sub-folders that are created in Folder 2 or create any documents in Folder 2unless assigned rights otherwise by the User B. For example, only the User B may create and open content in Folder 2, unless the User B invites the User A to a document stored in Folder 2.

However, if the User A assigns the User B as a co-owner to a folder owned by the User A, the User A will retain the same rights in the folder as the User B, including access to the content within the folder. Thus, the User A will share all rights to Folder 2 with the User B, though the User A may only edit any content created by the User B but cannot delete the User B's content. Thus, as co-owners, the Users A and B may create, open, and edit content in Folder 2, but may not delete the other user's content.

As another example, the User A may decide to assign ownership of Folder 2 to the User B while retaining a role as Supervisor over the User B with respect to Folder 2. Thus, the User A will share all rights to Folder 2 with the User B but may only read any content created by the User B (and cannot edit or delete the content created by the User B), and vice-versa. Thus, as co-owners of Folder 2, where the User A is further a Supervisor of the User B, the Users A and B may create and open content in Folder 2, but may not delete or edit the other user's content.

Figure 75:
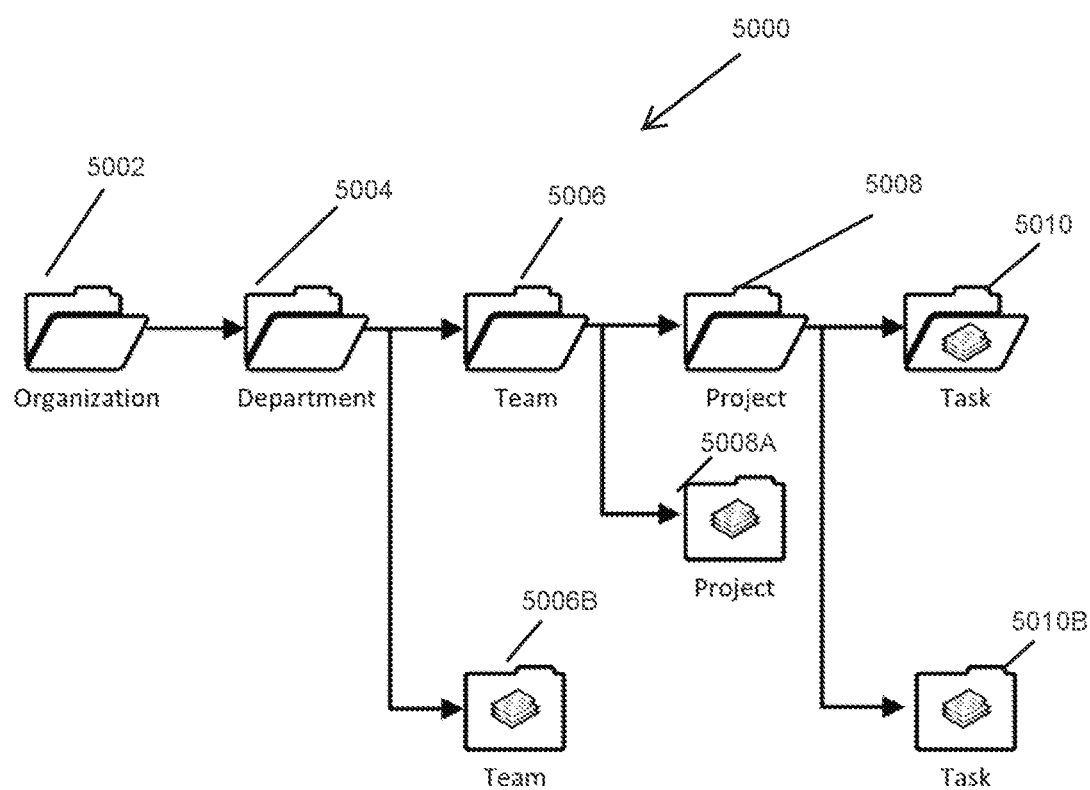
FIG. 75 illustrates a first example of a view and access displayed path for a user of the exemplary document collaboration system tool, according to one or more embodiments shown and described herein.
Figure 76:
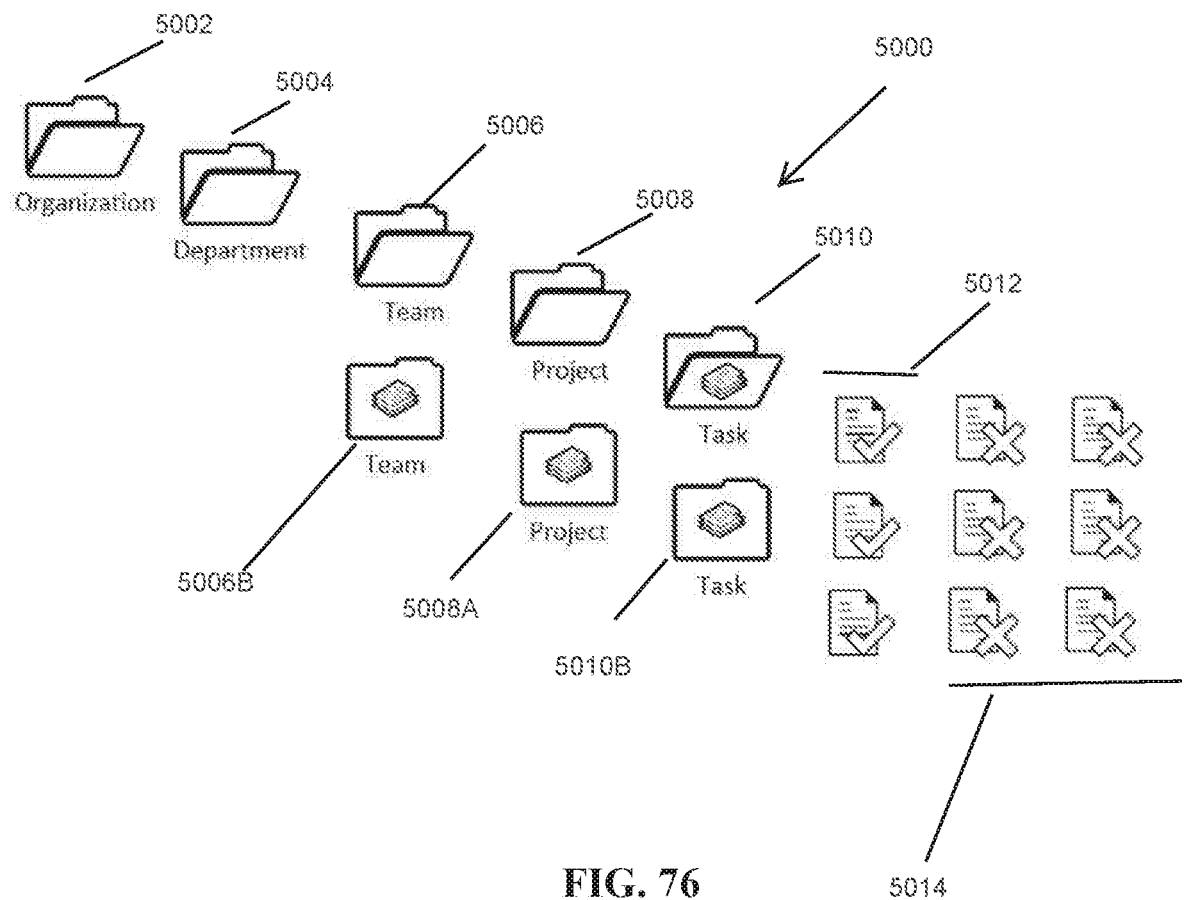
FIG. 76 illustrates a second example of a view and access displayed path for a user of the exemplary document collaboration system tool, according to one or more embodiments shown and described herein.

Referring to FIGS. 75-76, a user may have different view and access rights to folders within an organizational folder structure 5000. For example, a user may be assigned to one or more documents 5012 in a sub-folder labeled Task 5010B such that the user may view the path to the Task 5010B sub-folder and the one or more documents 5012 within the sub-folder. However, the user may only view the content they are permitted to access in the Task 5010B sub-folder and cannot view other folders or documents that are present in the organizational folder structure 5000. For example, the user may only see the folders, displayed in FIGS. 75 and 76, and the one or more documents 5012 (FIG. 76) to which they are permitted access. The user may not see other documents 5014 in the Task 5010B sub-folder to which they are not given access rights. Alternatively, as a member of the Task 5010B sub-folder, the user may view with read access (though not edit) one or more documents 5014. If the user requires owner, editing, or reviewing access rights to the other documents 5014 in the Task 5010B sub-folder of which they are a member, the user may request such access rights by sending a request to the owner of the content.

Figure 77:
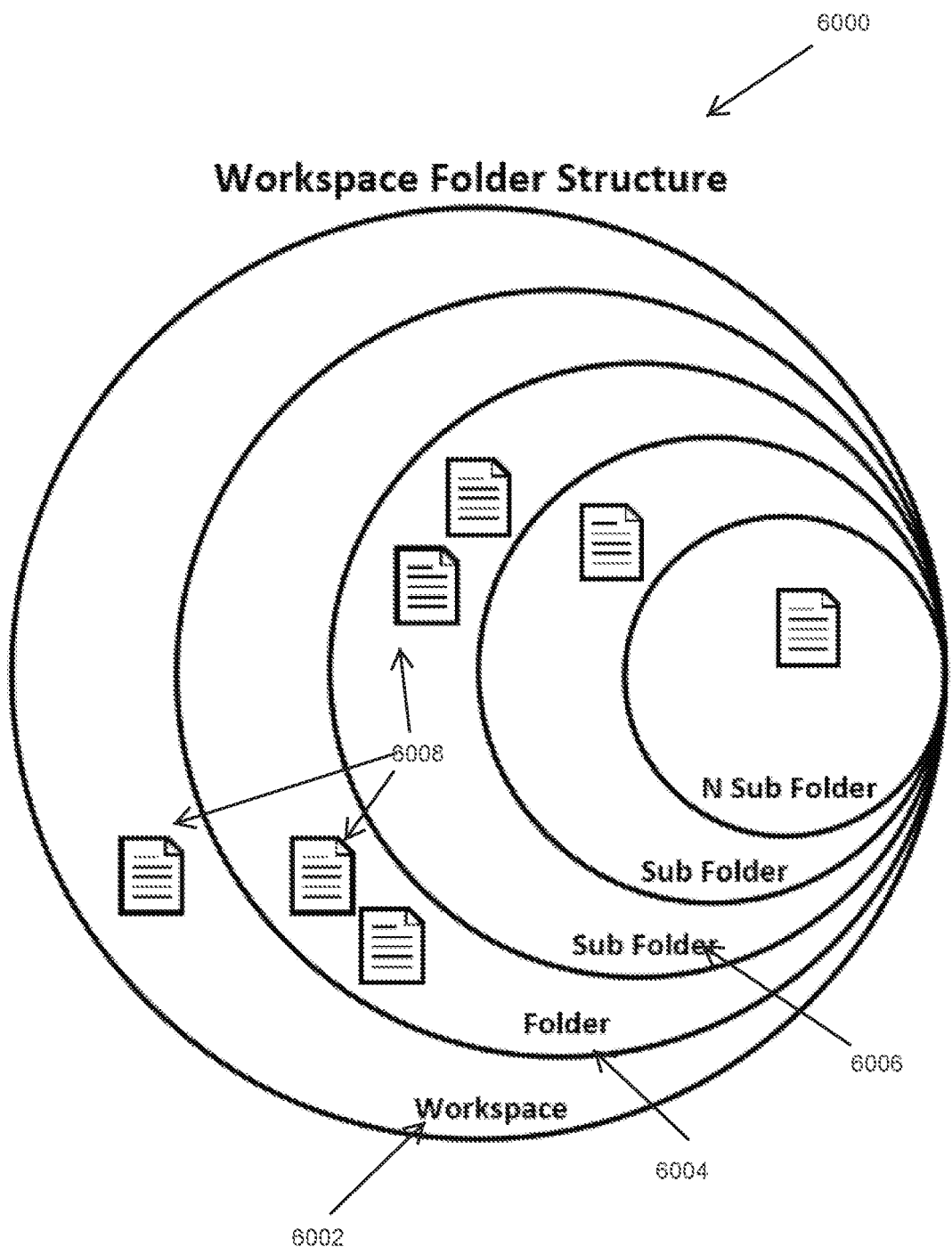
FIG. 77 illustrates an example workplace folder structure assigned to a user of the exemplary document collaboration system tool, according to one or more embodiments shown and described herein.

Referring to FIG. 77, a WorkSpace Folder Structure 6000 may be assigned to a user. The user may not create a folder 6004 or sub-folder 6006 outside of the user's Workspace 6002 unless the user is an owner of an organization folder of subfolder as either a creator or an assigned owner. All users that are owners of a folder, such as folder 6004, may create sub-folders within the folder, such as sub-folders 6006 within the folder 6004. In effect, the users may create groups within groups by creating sub-folders 6006 within folders 6004 or higher level sub-folders 6006. An owner may add another group to a folder 6004 or sub-folder 6006, giving any group user permission to the folder 6004 or sub-folder 6006. A user that is part of a project or team assigned to the folder 6004 or sub-folder 6006 will be able to see the respective folder and will have read access rights to all documents in the respective folder. However, only users who a create document 6008 in the respective folder are owners that may add another user as an owner, editor, reviewer, or user with deleting rights with respect to the created document in the respective folder.

Thus, each user may have a unique Workspace 6002 folder in a WorkSpace Folder Structure 6000 that is created when the user is created (i.e., when a user profile for the user is created by the tool). The user may add document(s) 6008, content, and other folders 6004 or sub-folders 6006 to the Workspace 6002 folder, which may be used for content that a user owns that is not contained within the organizational file structure 5000.

All users are members of an organizational group, such as a Department 5004 of the organizational file structure 5000. When a user adds other users to a document, such as through a Permissions dialog box 700 (FIG. 7) in the tool as described above, the user may view the other users in a default group as well as other users from outside the default group that the user has previously added to other documents. For example, the user may view the documents that the user has assigned rights to the other users outside the default group.

A user may have a User ID that is linked to the user's unique Workspace 6002 in the user's Workspace Folder Structure 6000. When the user creates or imports a document, the document is placed in the user's Workspace 6002 folder and the user is provided with full permission to the document through the User ID. The user may add another external or internal new user to the document through an invitation, for example. The new user may accept the invitation to be added to the document. A internal new user may also be added to the Workspace 6002 folder. However, an external new user may not be a member of the Workspace 6002 folder and may not be added to other documents.

Figure 78:
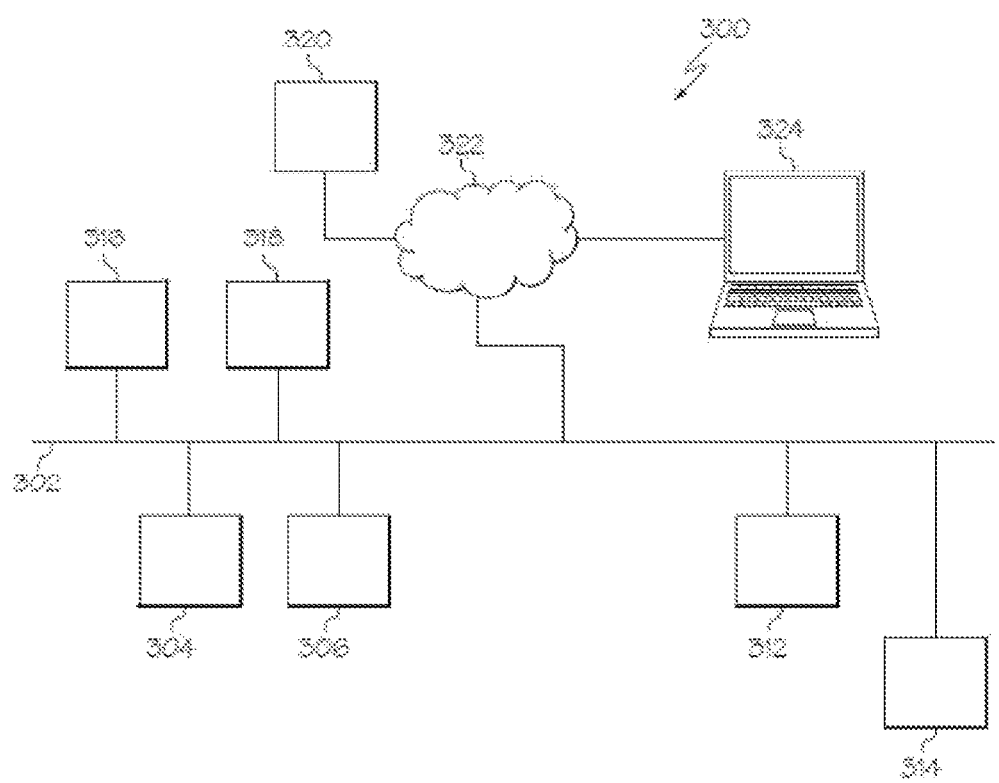
FIG. 78 schematically illustrates a system for implementing computer and software based methods to utilize the exemplary document collaboration system tool for elemental document generation, according to one or more embodiments shown and described herein.

Referring to FIG. 78, a system 300 for implementing computer and software-based methods to utilize the document collaboration system tools, as shown in FIGS. 1-68, is illustrated as being implemented along with using a graphical user interface (GUI) displaying a home screen for a user to view and/or revise one or more documents as described herein and that is accessible at a user workstation (e.g., a mobile and/or stationary computing device such as a computer 324), for example. The system 300 includes a communication path 302, one or more processors 304, a memory component 306, a revision tool component 312, a storage or database 314, a document parser intelligence component 316, a network interface hardware 318, a network 322, a server 320, and at least one computer 324. The various components of the system 300 and the interaction thereof will be described in detail below.

While only one application server 320 and one user workstation computer 324 is illustrated, the system 300 can include multiple workstations and application servers containing one or more applications that can be located at geographically diverse locations across a plurality of physical sites. In some embodiments, the system 300 is implemented using a wide area network (WAN) or network 322, such as an intranet or the Internet, or other wired or wireless communication network that may include a cloud computing-based network configuration. In a non-limiting example process, a branch document may be created from a local document, and the branch document may be accessible as a cloud document. Changes made by a user to the cloud document may be merged back and consumed into the local document. The workstation computer 324 may include digital systems and other devices permitting connection to and navigation of the network. Other system 300 variations allowing for communication between various geographically diverse components are possible. The lines depicted in FIG. 78 indicate communication rather than physical connections between the various components.

As noted above, the system 300 includes the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 300 includes the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

As noted above, the system 300 includes the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the system 300 may include the processor 360 communicatively coupled to the memory component 306 that stores instructions that, when executed by the processor 360, cause the processor to perform one or more tool functions as described herein.

Still referring to FIG. 78, as noted above, the system 300 comprises the display such as a GUI on a screen of the computer 324 for providing visual output such as, for example, one or more document for revising, other information, graphical reports, messages, or a combination thereof. The computer 324 may include one or more computing devices across platforms, such as mobile smart devices including smartphones, tablets, laptops, and/or the like. The GUI may present a user with a home screen, for example, as described herein, which home screen may display the revision tool component 312, as described in greater detail below. The display on the screen of the computer 324 is coupled to the communication path 302 and communicatively coupled to the processor 304. Accordingly, the communication path 302 communicatively couples the display to other modules of the system 300. The display can include any medium capable of transmitting an optical output such as, for example, a cathode ray tube, light emitting diodes, a liquid crystal display, a plasma display, or the like. Additionally, it is noted that the display or the computer 324 can include at least one of the processor 304 and the memory component 306. While the system 300 is illustrated as a single, integrated system in FIG. 78, in other embodiments, the systems can be independent systems.

The system 300 further comprises the document parser intelligence component 316 that assists with the operation of storing a plurality of parsed and/or created items based upon a logical identification of objects (that may, for example, be associated with carriage return separated objects) of a document in an active document database and utilizing the objects for document collaboration across one or more computing devices and for viewing and/or search a history of one or more associated revisions in a graphical user interface of a user, for example, as well as the revision tool component 312 to assist with operation of editing an item from a stored plurality of items and tracking the history of the associated edits of the items, as described above. The document parser intelligence component 316 and the revision tool component 312 are coupled to the communication path 302 and communicatively coupled to the processor 304. As will be described in further detail below, the processor 304 may process the input signals received from the system modules and/or extract information from such signals.

The system 300 includes the network interface hardware 318 for communicatively coupling the system 300 with a computer network such as network 322. The network interface hardware 318 is coupled to the communication path 302 such that the communication path 302 communicatively couples the network interface hardware 318 to other modules of the system 300. The network interface hardware 318 can be any device capable of transmitting and/or receiving data via a wireless network. Accordingly, the network interface hardware 318 can include a communication transceiver for sending and/or receiving data according to any wireless communication standard. For example, the network interface hardware 318 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 78, data from various applications running on computer 324 can be provided from the computer 324 to the system 300 via the network interface hardware 318. The computer 324 can be any device having hardware (e.g., chipsets, processors, memory, etc.) for communicatively coupling with the network interface hardware 318 and a network 322. Specifically, the computer 324 can include an input device having an antenna for communicating over one or more of the wireless computer networks described above.

The network 322 can include any wired and/or wireless network such as, for example, wide area networks, metropolitan area networks, the Internet, an Intranet, satellite networks, or the like. Accordingly, the network 322 can be utilized as a wireless access point by the computer 324 to access one or more servers (e.g., a server 320). The server 320 and any additional servers generally include processors, memory, and chipset for delivering resources via the network 322. Resources can include providing, for example, processing, storage, software, and information from the server 320 to the system 300 via the network 322. Additionally, it is noted that the server 320 and any additional servers can share resources with one another over the network 322 such as, for example, via the wired portion of the network, the wireless portion of the network, or combinations thereof.

In embodiments, the system 300 of the tool may include the one or more processors 304, one or more memory modules (such as the memory component 306) communicatively coupled to the one or more processors 304, a GUI (such as one on the computer 324), a relational database (such as the database 314), and one or more machine readable instructions. The one or more machine readable instructions may be stored in the one or more memory modules and, when executed by the one or more processors, may cause the system to perform a series of process steps as shown in FIGS. 79-82, for example.

Figure 79:
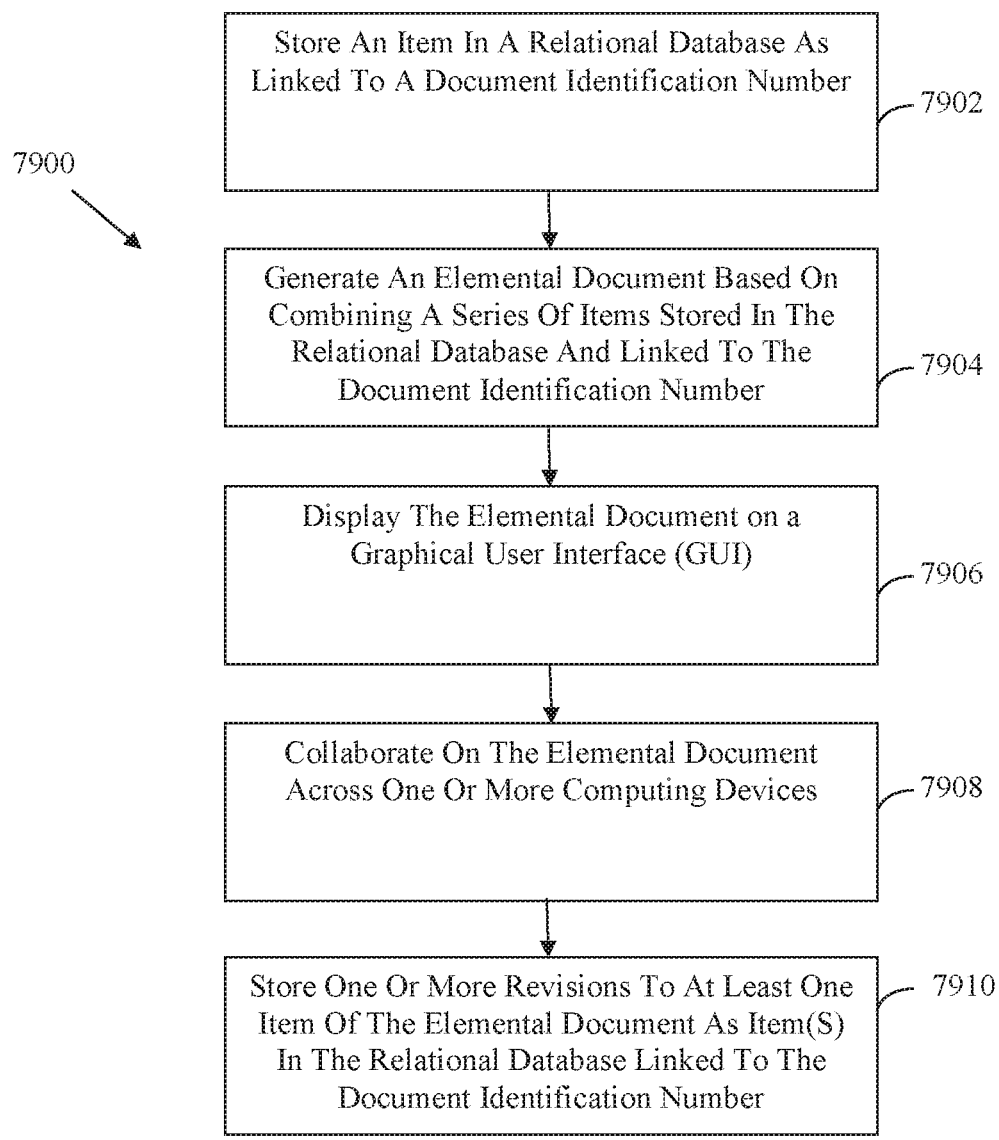
FIG. 79 illustrates an example process flow chart of the exemplary document collaboration system tool, according to one or more embodiments shown and described herein.

For example, referring to FIG. 79, steps of a process 7900 includes step 7902 to store an item in a relational database as linked to a document identification number. The item may be one of a series of items stored in the relational database and linked to the document identification number. In step 7904, an elemental document is generated based on combining the series of items that are stored in the relational database and linked to the document identification number. In step 7906, the elemental document is displayed on a GUI. In step 7608, the element document is collaborated upon across one or more computing devices. For example, as described herein, users may simultaneously collaborate on portions of the same elemental document across different computing devices. In step 7910, one or more revisions made to at least one item of the elemental document is stored as corresponding one or more items in the relational database that are item(s) linked to the document identification number.

In an embodiment, the process steps may include instructions to create an item of a document, store the item in a table of the relational database, link the item of the document to a document identification number, store the document identification number linked to the item in a table, and, in a manner similar to step 7902 of FIG. 79, create a series of stored items linked to the document identification number in the table. The process steps may further include instructions to generate an elemental document based on combining the series of stored items linked to the document identification number, as set forth in step 7904 of FIG. 79, and display the elemental document on the GUI, as set forth in step 7906 of FIG. 79.

Figure 80:
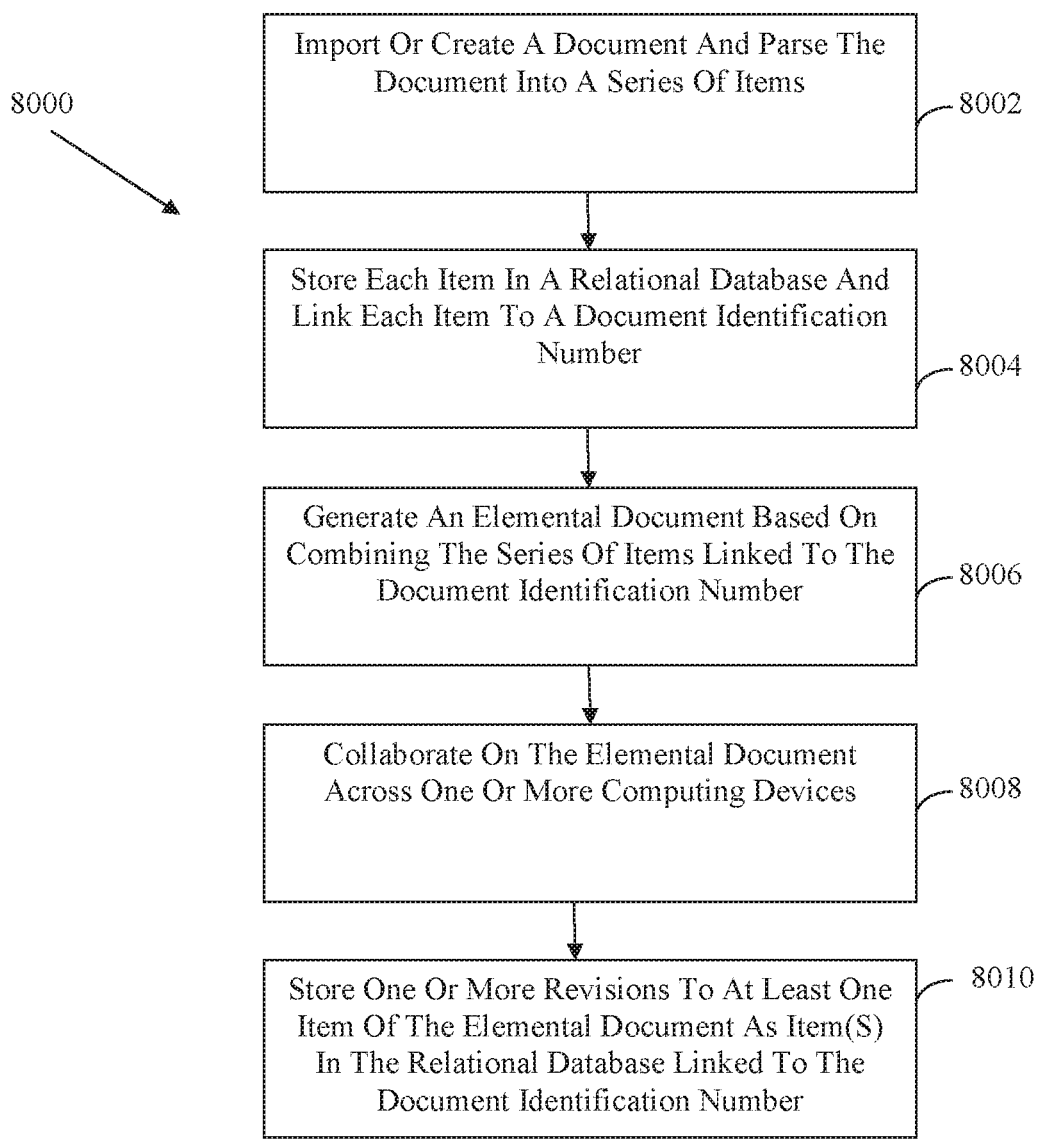
FIG. 80 illustrates another example process flow chart of the exemplary document collaboration system tool, according to one or more embodiments shown and described herein.

In another embodiment set forth in FIG. 80, steps of a process 8000 includes step 8002 to import or create a document into the tool and to parse the document into a series of items as described herein. For example, the document that may be imported into the tool for an enhancement may be a document from a presentation system, a spreadsheet system, a document form system, or an email system. In step 8004, each item is stored in a relational database and linked to a document identification number. For example, each item stored in the relational database linked to the document identification number create a series of stored items linked to the document identification number. An enhancement to the document is generated via creation of an elemental document based on combining the series of stored items linked to the document identification number. For example, in step 8006, an elemental document is generated based on combining the series of items linked to the document identification number. In step 8008, one or more uses across and through one or more computing devices collaborate on the element document such that collaboration is enabled across the one or more computing devices. Each computing device involved in the collaboration includes a GUI. One or more revisions made to at least one item of the element document through at least one GUI of a computing device is received. In step 8010, the one or more revisions to at least one item of the elemental document are stored as one or more corresponding items in the relational database as item(s) linked to the document identification number.

Figure 81:
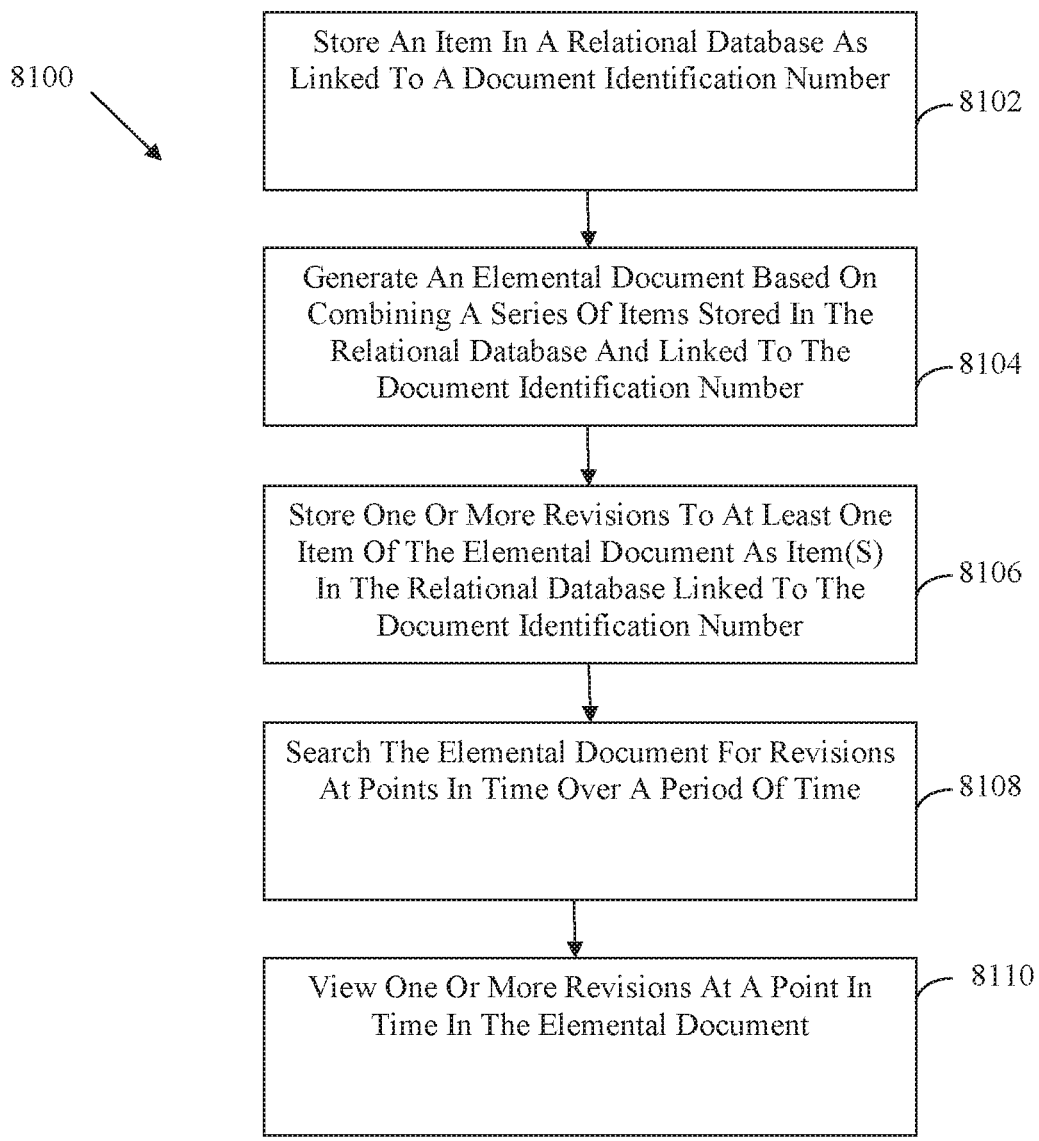
FIG. 81 illustrates yet another example process flow chart of the exemplary document collaboration system tool, according to one or more embodiments shown and described herein.

In another embodiment as set forth in FIG. 81, steps of a process 8100 includes step 8102 to store an item in a relational database as linked to a document identification number. For example, a plurality of stored items creates a series of stored items linked to the document identification number. In step 8104, the series of items stored in the relational database and linked to the document identification number are combined to generate an elemental document. One or more revisions made to at least one item of the elemental document are received through at least one GUI of one or more computing devices. In step 8106, the one or more revisions made to at least one item of the elemental document as stored as one or more corresponding items in the relational database as item(s) linked to the document identification number. In step 8108, the elemental document is searched for one or more revisions at points in time over a period of time. In step 8110, the one or more revisions searched for at a point in time is viewed on a GUI of a computing device.

Figure 82:
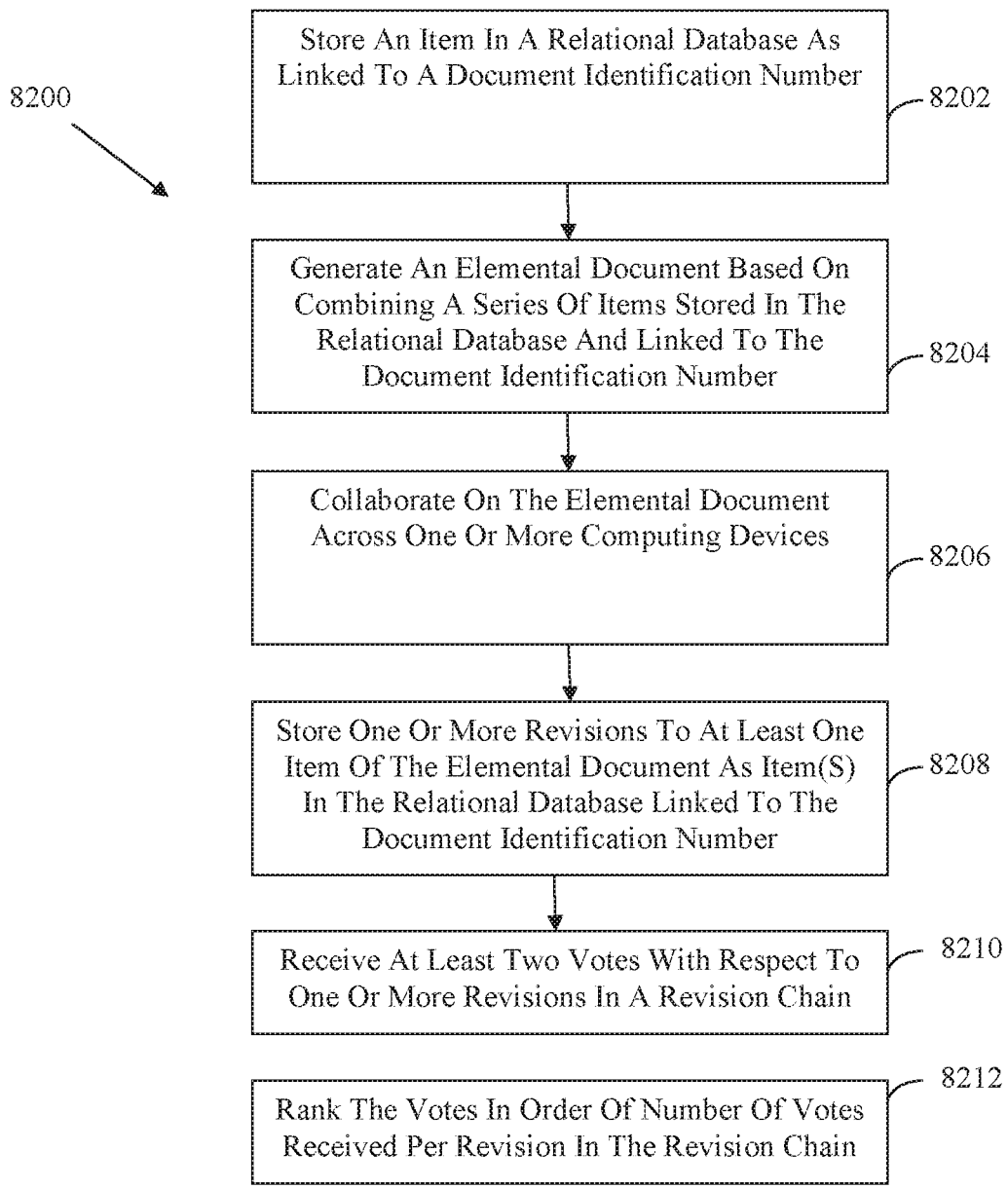
FIG. 82 illustrates one other example process flow chart of the exemplary document collaboration system tool, according to one or more embodiments shown and described herein.

In another embodiment set forth in FIG. 82, steps of a process 8000 includes step 8202 to store an item in a relational database as linked to a document identification number. In step 8204, an elemental document is generated based on combining a series of items stored in the relational database and linked to the document identification number. In step 8206, collaboration on the elemental document is enabled across one or more computing devices. In step 8208, one or more revisions made to at least one item of the elemental document is stored as corresponding one or more items in the relational database as item(s) linked to the document identification number. In step 8210, at least two votes may be received with respect to the one or more revisions in a revision chain of revisions made to an item of the elemental document. For example, a plurality of votes may be received with respect to at least two different revisions made to an item in a revision chain. In step 8212, the votes are ranked in order of a number of votes received per revision in the revision chain. The plurality of votes, for instance, may be ranked in order of the number of votes received per revision of the at least two different revisions made to the item in the revision chain. Thus, a more popular revision may be ranked as a top revision option. The more popular revision may be based on a greater amount of votes received for the more popular revision over another revision receiving a lesser amount of votes, which would be ranked as a lower revision and may be shown underneath the more popular revision(s).

Thus, the document collaboration system tool described herein provides a valuable platform for clarifying and illuminating contextual information such as intent of editors when making revisions over time and at particular points of time to reveal a living narrative of change with respect to the living document. The tool is able to create layers of edits for every item in a document, as described herein, allowing a user to move the layers internally and select a layer (as a point of time of a group of edits to one or more items of the document, for example) to be viewed by the user on a centralized display location or GUI. The tool may also allow an infinite number of versions of the document to be created from, for example, the snapshots of the document that act as markers at points of time during the document history. For example, a user may create a Version 1 of a manual for a product. The user may then create snapshot of Version 1 and edit it to create a Version 2 of the product, create another snapshot to create another version, and repeat the process as desired. This allows for rapid development of manuals and instructional materials, for example, while always retaining and linking to the base original document along with a complete revisions history. Further, a user is able to compare versions of the document while still being in the same document. The versions may be snapshots that the user compares to view changes made between the versions. For example, a user is able to compare Version 1 with Version 2, Version 1 with Version 3, or Version 3 with Version 7. Thus, users who are analyzing or have reviewed Version 1 can see how things are done differently in Version 3, viewing the versions side by side, or by seeing what changed from Version 1 to Version 3. Users may then build on their knowledge of Version 1 to rapidly learn how to use Version 3 instead of having to review an entire separate document in a less efficient process in which the users would re-learn the entire document over again instead of focusing on document changes, for example. Thus, users spend less time on such document review, which results in greater productivity and less cost to the user and/or a company employing the user, for example.

Further, a reverse binary index may be employed with the system tool to enable users to more efficiently search the content of the databases associated with the system tool such that document content may be searched more and retrieved more efficiently by the system tool. Moreover, the system tool provides an effective document collaboration tool to permit user commentary and/or annotation of one or more documents in a streamlined, efficient manner that tracks the user revision history of the one or more documents allowed for an increased security associated with the one or more documents and better record-keeping of the document history over time such that previously revision history is not inadvertently lost. User annotation may be part of a document history in the tool as effective layers of a document organized into a series of annotations per layer from groups and/or users that may be viewed based a time of annotation, for example. The security of the system tool thus revolves around the content of a document rather than one or more document files existing as separate document entities. Further, the system tool allows for revisions made to the document to be rolled back in or re-inserted into the document over time, even if not originally accepted or approved, without the need to reverting to a previously saved version of a separate existing file. Further, the revisions may be rolled-back with respect to one or more items of the document rather than throughout the entire document itself. Additionally, the contents of the document may be analyzed by performing analytics on the items of the document stored in the database tables described herein.

The system tool effectively improves upon both the technology and technical area of document collaboration and the functionality of the utilized computing devices themselves by allowing for at least the following: more efficient processing of a document from a centralized, storage location associated with the system tool rather than through multiple separate file versions, for example; an effective security platform for the entire document as well as separable document content stored with respect to the content in the centralized, storage location; a permitted definable number of users to access the document simultaneously while editing different items of the document; tracking an evidence trail of user revision history over time with respect to the document; automatic consumption of changes from a document, one or more items, and/or a snapshot into other documents; branching from a parent document into branched, child documents; providing analytics with respect to user revision history over time; and providing an overall dynamic, living document that is able to be linked to snapshots that act as viewable markers of edits made to the document over a period of time.

Thus, the tools described herein permit a user to reduce the amount of time needed to search for edits and an edit history associated with one or more documents, analyze the narrative of change associated with a document, learn from changes made between one or more document versions or snapshots, and/or collaborate on a document with other users. Moreover, the tool streamlines and automates the process of document collaboration as described herein, also allowing for increased efficiency in the process and a reduction of error in merging revisions from separate documents that may otherwise occur.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for a logical ordering of items in a relational database for elemental document creation, the method comprising:
   creating an item;
   storing the item in a table of the relational database;
   linking the item to a document identification number;
   storing the document identification number linked to the item in the table;
   creating a series of stored items linked to the document identification number in the table;
   generating an elemental document based on combining the series of stored items linked to the document identification number; and
   displaying the elemental document on a graphical user interface (GUI).

2. The method of claim 1, further comprising:
   enabling collaboration on the elemental document across one or more computing devices, each comprising a GUI;
   receiving one or more revisions made to at least one item of the elemental document through at least one GUI of a computing device of the one or more computing devices; and
   storing the one or more revisions to at least one item of the elemental document as one or more corresponding items in the relational database linked to the document identification number.

3. The method of claim 2, further comprising:
   linking the at least one item in the elemental document to a set of linked elemental documents;
   consuming at least a portion of the one or more revisions to the at least one item in the elemental document to the set of linked elemental documents.

4. The method of claim 2, further comprising:
   receiving a plurality of votes with respect to at least two revisions of a revision chain of the one or more revisions; and
   ranking the plurality of votes in order of a number of votes received per revision in the revision chain.

5. The method of claim 1, wherein the item is one of created as a separated object inserted into a template of the document and parsed from an imported document.

6. The method of claim 1, wherein the series of stored items linked to the document identification number in the table are stored in a logical linear order.

7. The method of claim 1, wherein each item comprises at least one of tables lists, images and text boxes.

8. The method of claim 1, wherein the relational database is associated with at least one of a relational database management system and an object-relational database management system and comprises at least one of a structured query language (SQL) database, an SQL including database, or a non-SQL database.

9. The method of claim 8, wherein the relational database is part of a database environment including an analytics engine comprising at least one of Hadoop, NoSQL, and Cassandra.

10. The method of claim 1, further comprising:
searching the elemental document for a revision at a point in time over a period of time; and
viewing the revision as a snapshot at the point in time in the elemental document on the GUI.

11. The method of claim 10, wherein the snapshot is part of a series of snapshots comprising a series of captured points of time associated with the elemental document that comprises a dynamic, living document.

12. The method of claim 11, further comprising:
enabling a revisions control portion of the GUI to playback through the series of snapshots through one or more controls comprising at least one of:
a backward button to display a revision from a previous point in time;
a forward bottom to advance forward from a revision from a previously displayed time;
a now button to display the elemental document at a current time;
a backward snapshot button to display a previously snapshot marked point in time; and
a forward snapshot button to advance forward to a snapshot marked point in time.

13. The method of claim 1, wherein the elemental document is part of at least one of a presentation system, a spreadsheet system, a document form system, and an email system.

14. The method of claim 1, wherein the elemental document comprises a parent document as a dynamic, living document, and further comprising:
creating a static elemental document as a child document of the parent document; and storing a plurality of items of the child document in a table of the relational database
linked to a child document identification number.

15. A method comprising:
linking an item of a document to a document identification number;
storing the item in a relational database as linked to the document identification number to create a series of stored items linked to the document identification number;
generating an enhancement to the document via creation of an elemental document based on combining the series of stored items linked to the document identification number;

receiving one or more revisions made to at least one item of the elemental document through at least one graphical user interface (GUI) of one or more computing devices;
storing the one or more revisions to at least one item of the elemental document as one or more corresponding items in the relational database linked to the document identification number;
searching the elemental document for a revision at a point in time over a period of time; and
viewing the revision at the point in time in the elemental document on the GUI.

16. The method of claim 15, further comprising:
generating a snapshot of the elemental document, wherein the snapshot is part of a series of snapshots comprising a series of captured points of time associated with the elemental document that comprises a dynamic, living document as the enhancement to the document; and
viewing the revision as the snapshot at the point in time in the elemental document on the GUI.

17. The method of claim 16, further comprising:
enabling a revisions control portion of the GUI to playback through the series of snapshots through one or more controls comprising at least one of:
a backward button to display a revision from a previous point in time;
a forward bottom to advance forward from a revision from a previously displayed time;
a now button to display the elemental document at a current time;
a backward snapshot button to display a previously snapshot marked point in time; and
a forward snapshot button to advance forward to a snapshot marked point in time.

18. A method comprising:
parsing a document into a series of items linked to a document identification number;
storing each item in a relational database as linked to the document identification number to create a series of stored items linked to the document identification number;
generating an enhancement to the document via creation of an elemental document based on combining the series of stored items linked to the document identification number;
enabling collaboration on the elemental document across one or more computing devices, each comprising a graphical user interface (GUI);
receiving one or more revisions made to at least one item of the elemental document through at least one GUI of a computing device of the one or more computing devices; and
storing the one or more revisions to at least one item of the elemental document as one or more corresponding items in the relational database linked to the document identification number.

19. The method of claim 18, wherein parsing a document into a series of items linked to a document identification number comprises:
importing the document for the enhancement, wherein the document is one of a presentation system, a spreadsheet system, a document form system, and an email system.

20. The method of claim 18, further comprising:
linking the at least one item in the elemental document to a set of linked elemental documents;

consuming at least a portion of the one or more revisions to the at least one item in the elemental document to the set of linked elemental documents.

\* \* \* \* \*